(12) United States Patent
Wang et al.

(10) Patent No.: US 11,860,573 B1
(45) Date of Patent: *Jan. 2, 2024

(54) SYSTEM AND METHOD FOR FABRICATING POLARIZATION HOLOGRAMS

(71) Applicant: Meta Platforms Technologies, LLC, Menlo Park, CA (US)

(72) Inventors: Mengfei Wang, Kirkland, WA (US); Junren Wang, Kirkland, WA (US); Yun-Han Lee, Redmond, WA (US); Stephen Choi, Seattle, WA (US); Lu Lu, Kirkland, WA (US); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/229,844

(22) Filed: Apr. 13, 2021

Related U.S. Application Data

(63) Continuation-in-part of application No. 17/103,920, filed on Nov. 24, 2020.

(51) Int. Cl.
| | |
|---|---|
| G03H 1/12 | (2006.01) |
| G03H 1/04 | (2006.01) |
| G02B 27/28 | (2006.01) |
| G03H 1/02 | (2006.01) |

(52) U.S. Cl.
CPC ......... *G03H 1/0402* (2013.01); *G02B 27/286* (2013.01); *G03H 1/0248* (2013.01); *G03H 1/0465* (2013.01); *G03H 2001/0216* (2013.01); *G03H 2001/0413* (2013.01); *G03H 2001/0439* (2013.01); *G03H 2001/0441* (2013.01); *G03H 2223/20* (2013.01); *G03H 2223/22* (2013.01); *G03H 2223/23* (2013.01); *G03H 2223/24* (2013.01); *G03H 2227/05* (2013.01)

(58) Field of Classification Search
CPC .. G03H 1/0402; G03H 1/0248; G03H 1/0465; G03H 2001/0216; G03H 2001/0413; G03H 2001/0439; G03H 2223/20; G03H 2223/22; G03H 2223/23; G03H 2223/24; G02B 27/286
USPC .................. 359/11, 10, 1; 349/115
See application file for complete search history.

(56) References Cited

U.S. PATENT DOCUMENTS

| | | | | |
|---|---|---|---|---|
| 6,803,153 | B1* | 10/2004 | Kawano | G11B 7/006 |
| 2004/0190094 | A1* | 9/2004 | Kawano | G11B 7/128 |
| 2005/0230687 | A1* | 10/2005 | Ushiro | H01S 5/028 |
| | | | | 438/22 |
| 2005/0237902 | A1* | 10/2005 | Nishiwaki | G11B 7/1353 |
| | | | | 369/120 |
| 2006/0055993 | A1 | 3/2006 | Kobayashi et al. | |
| 2006/0285470 | A1 | 12/2006 | Hayashi et al. | |
| 2007/0146473 | A1 | 6/2007 | Masuda | |

(Continued)

*Primary Examiner* — Audrey Y Chang
(74) *Attorney, Agent, or Firm* — MILLBURN IP PLLC

(57) ABSTRACT

A system includes a mask configured to forwardly diffract an input beam as a first set of two polarized beams. The system also includes a polarization conversion element configured to convert the first set of two polarized beams into a second set of two polarized beams having opposite handednesses. The two polarized beams having opposite handednesses interfere with one another to generate a polarization interference pattern.

19 Claims, 31 Drawing Sheets

(56) References Cited

U.S. PATENT DOCUMENTS

| | | | |
|---|---|---|---|
| 2007/0171494 A1* | 7/2007 | Yamatsu | G11B 7/0065 |
| 2008/0273151 A1* | 11/2008 | Kuo | G02F 1/133632 |
| | | | 349/115 |
| 2009/0128908 A1 | 5/2009 | Nakazawa et al. | |
| 2009/0185086 A1* | 7/2009 | Chen | G02F 1/1313 |
| | | | 349/8 |
| 2012/0256334 A1 | 10/2012 | Yoshinari et al. | |
| 2013/0335683 A1* | 12/2013 | Escuti | G02F 1/133528 |
| | | | 349/96 |
| 2015/0331167 A1 | 11/2015 | Escuti et al. | |
| 2018/0210396 A1 | 7/2018 | Popovich et al. | |
| 2019/0129085 A1 | 5/2019 | Waldern et al. | |
| 2020/0026074 A1 | 1/2020 | Waldern et al. | |
| 2020/0081398 A1 | 3/2020 | Yaroshchuk | |

* cited by examiner

SYSTEM AND METHOD FOR FABRICATING POLARIZATION HOLOGRAMS

CROSS REFERENCE TO RELATED APPLICATION

This application is a continuation-in-part of U.S. patent application Ser. No. 17/103,920, entitled "SYSTEM AND METHOD FOR FABRICATING POLARIZATION SELECTIVE ELEMENT," filed on Nov. 24, 2020, the content of which is incorporated herein by reference in its entirety.

TECHNICAL FIELD

The present disclosure generally relates to systems and methods and, more specifically, to a system and a method for fabricating polarization holograms.

BACKGROUND

Polarization selective optical elements ("PSOEs"), such as polarization selective lenses, gratings, and deflectors, etc., have gained increasing interests in optical device and system applications, for example, in beam steering devices, waveguides, and displays. Polarization selective optical elements may be fabricated based on isotropic or anisotropic materials, and may include suitable sub-wavelength structures, liquid crystals, photo-refractive holographic materials, or a combination thereof. PSOEs can provide a polarization selective optical response. Examples of PSOEs include polarization volume hologram ("PVH") elements, Pancharatnam-Berry phase ("PBP") elements, etc. PSOEs, such as PBP elements and PVH elements, have features such as flatness, compactness, high efficiency, high aperture ratios, absence of on-axis aberrations, possibility of switching, flexible design, simple fabrication, and low cost, etc. Thus, PBP elements and PVH elements can be implemented in various applications such as portable or wearable optical devices or systems. PSOEs, such as PVH and PBP elements, can be fabricated using various methods, e.g., polarization interference or holography, laser direct writing, and various other forms of lithography. PSOEs fabricated through polarization interference may be referred to as polarization holograms.

SUMMARY OF THE DISCLOSURE

Consistent with a disclosed embodiment of the present disclosure, a system is provided. The system includes a mask configured to forwardly diffract an input beam as a first set of two polarized beams. The system also includes a polarization conversion element configured to convert the first set of two polarized beams into a second set of two polarized beams having opposite handednesses. The two polarized beams having opposite handednesses interfere with one another to generate a polarization interference pattern.

Consistent with another aspect of the present disclosure, a method is provided. The method includes directing an input beam to a mask. The method also includes forwardly diffracting, by the mask, the input beam as a first set of two polarized beam. The method further includes converting, by a polarization conversion element, the first set of two polarized beams into a second set of two polarized beams having opposite handednesses, the two polarized beams having opposite handednesses interfering with one another to generate a polarization interference pattern.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
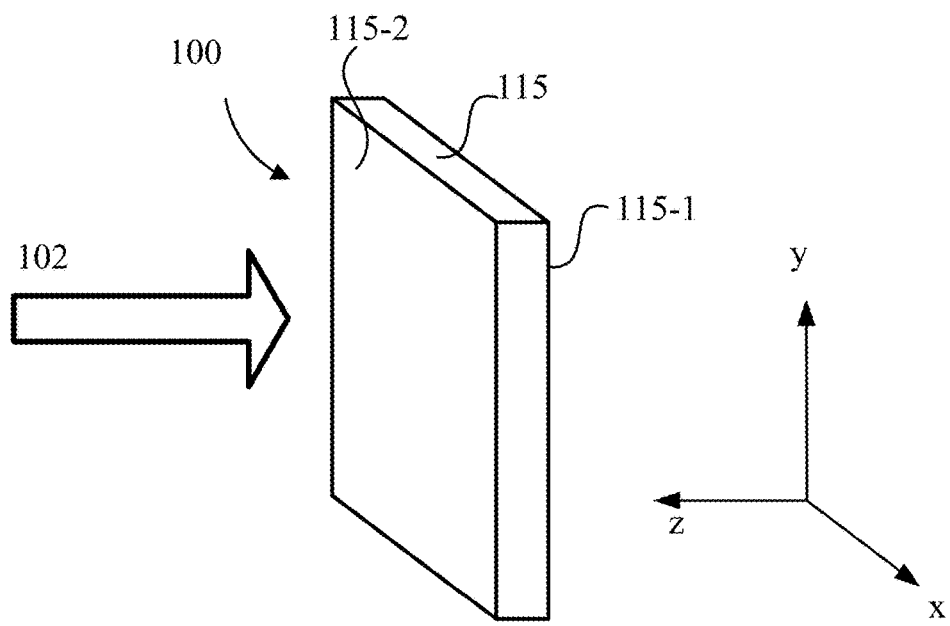
FIG. 1A schematically illustrates a three-dimensional ("3D") view of a polarization selective optical element ("PSOE"), according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light (or beam) output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film" and "layer" may include rigid or flexible, self-supporting or free-standing film, coating, or layer, which may be disposed on a supporting substrate or between substrates. The term "layer" used herein may be in any suitable form, such as coating, film, plate, etc. In some situations, the term "layer" may be interchangeable with the term "coating," "film," and/or "plate."

The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" indicates a direction that is non-parallel to the plane of the film or layer (e.g., perpendicular to the surface plane of the film or layer, e.g., perpendicular to a plane parallel to the surface plane). For example, when an "in-plane" direction refers to a direction within a surface plane, an "out-of-plane" direction may refer to a thickness direction perpendicular to the surface plane, or a direction that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights (or beams) with orthogonal polarizations or two orthogonally polarized lights may be two linearly polarized lights with polarizations in two orthogonal directions (e.g., an x-axis direction and a y-axis direction in a Cartesian coordinate system) or two circularly polarized lights with opposite handednesses (e.g., a left-handed circularly polarized light and a right-handed circularly polarized light).

In the present disclosure, an angle of a light or beam (e.g., a diffraction angle of a diffracted beam or an incidence angle of an incident beam) with respect to a normal of a surface can be defined as a positive angle or a negative angle, depending on the positional relationship between a propagation direction of the beam and the normal of the surface. For example, when the propagation direction of the beam is clockwise from the normal, the angle of the propagation direction may be defined as a positive angle, and when the propagation direction of the beam is counter-clockwise from the normal, the angle of the propagation direction may be defined as a negative angle.

Polarization holography (or polarization interference) is a process widely used to fabricate polarization holograms, such as polarization hologram elements based on liquid crystals, and those based on birefringent photo-refractive holographic materials other than liquid crystals. Polarization holograms are polarization selective optical elements ("PSOEs") fabricated via polarization holography. Polarization holograms may be fabricated to have a short in-plane pitch, e.g., within a sub-micron range and comparable to visible wavelengths. Polarization holography entails a polarization interference between two beams with different polarizations (or the same polarization) in order to generate a spatially varying polarization field or a polarization interference pattern in space. When the polarization holography is used to fabricate multiple polarization holograms with varying in-plane pitches and varying orientations (e.g., orientations of grating fringes) on a single substrate (e.g., on one or both sides of a wafer), the processes of recording the multiple polarization holograms one by one on the substrate, and precisely aligning the multiple polarization holograms during the fabrication are time consuming and challenging in conventional technologies.

In view of the limitations of conventional methods for fabricating PSOEs, the present disclosure provides a more efficient and cost-effective system and method for fabricating PSOEs, such as polarization hologram elements. The system may include a mask configured to split (e.g., forward diffract) an input beam into two polarized beams, which may be used in the polarization holography for generating a polarization interference pattern. A mask is an optical element used in the polarization holography, and configured with predetermined optical structures, such as predetermined microstructures, predetermined sub-wavelength structures, or predetermined optic axis orientation pattern, etc. In some embodiments, the mask may forwardly diffract an input beam into two diffracted polarized beams, at least one of which may carry (or may be encoded with) the optical properties or optical information of the mask. For example, the two polarized beams may be referred to as a signal beam and a reference beam. The signal beam may carry predetermined optical properties of the mask, such as those determined by the predetermined optical structures (e.g., predetermined microstructures, predetermined sub-wavelength structures, or predetermined optic axis orientation pattern, etc.). The reference beam may not carry (or may carry an insignificant amount of) the optical properties of the mask. In some embodiments, the mask may be a polarization selective optical element, such as a PVH mask, a PBP mask, a polarization selective SRG mask. In some embodiments, the mask may be a non-polarization selective optical element, such as a non-polarization selective SRG. In some embodiments of the present disclosure, a polarization conversion optical element (or polarization conversion element) may be disposed between the mask and a recording medium layer. The polarization conversion element may be configured to convert a polarization of at least one of the two polarized beams to a desirable polarization. For example, the polarization conversion element may be configured to receive the two polarized beams from the mask and output two polarized beams with the opposite handednesses, which may interference with one another in space to generate a polarization interference pattern.

The polarization interference pattern may be recorded in the recording medium layer after the recording medium layer is sufficiently exposed to the polarization interference pattern. The recording medium layer may include a surface recording medium or a volume (or bulk) recording medium. The surface recording medium and the volume recording medium may be polarization sensitive recording media. The exposed recording medium layer including the surface recording medium may be further used as a photo-alignment material ("PAM") layer for a birefringent medium layer lately disposed on the recording medium layer. The birefringent medium layer (and the recording medium layer) may form a fabricated PSOE. The exposed recording medium layer including the volume recording medium may form a fabricated PSOE itself. The optical property of the fabricated PSOE may be determined, in part, by the polarization interference pattern, which includes the optical information of the mask.

The mask used in the systems and methods of the present disclosure may be any suitable mask, such as an SRG (which may be polarization selective or polarization non-selective) mask, a PBP mask, a PVH mask, etc. The mask may be configured to forwardly diffract an input beam as two polarized beams, a signal beam and a reference beam. In some embodiments, an SRG mask may forwardly diffract an input beam as two linearly polarized beams. In some embodiments, a PVH mask may forwardly diffract an input beam as two circularly polarized beams. In some embodiments, the SRG may function or operate as an optically isotropic grating. For example, the SRG may be a polarization non-selective grating. In some embodiments, the SRG may function or operate as an optically anisotropic grating. For example, the SRG may be a polarization selective grating. In some embodiments, the SRG may be fabricated based on an inorganic material, such as metals or oxides. In some embodiments, the input beam may be a polarized beam having a wavelength $\lambda$. In some embodiments, the input beam may be decomposed into two linearly polarized components with a substantially same beam or light intensity and a suitable phase delay between the two linearly polarized components. For example, the input beam may be a linearly polarized beam, a circularly polarized beam, or an elliptically polarized beam, etc. In some embodiments, the input beam may be a collimated beam. In some embodiments, the input beam may be incident onto the SRG at an incidence angle $\theta_r$.

The SRG may be configured to substantially forwardly diffract the input beam as a $0^{th}$ order diffracted beam and a $-1^{st}$ order diffracted beam. In some embodiments, the $0^{th}$ order diffracted beam and the $-1^{st}$ order diffracted beam may have a wavelength that is substantially the same as the wavelength of the input beam. In some embodiments, the $0^{th}$ order diffracted beam and the $-1^{st}$ order diffracted beam may be linearly polarized beams having orthogonal linear polarizations. For example, the $0^{th}$ order diffracted beam may be an s-polarized beam, and the $-1^{st}$ order diffracted beam may be a p-polarized beam. In some embodiments, the $0^{th}$ order diffracted beam and the $-1^{st}$ order diffracted beam may be linearly polarized beams having a substantially same linear polarization. In some embodiments, the SRG may be configured to operate at a Littrow configuration for the input beam. Diffraction angles of the $0^{th}$ order diffracted beam and the $-1^{st}$ order diffracted beam may have a substantially same absolute value and opposite signs. The diffraction angle of the $0^{th}$ order diffracted beam may be substantially equal to the incidence angle of the input beam. An angle formed between the $0^{th}$ order diffracted beam and the $-1^{st}$ order diffracted beam may have an absolute value that is about twice the absolute value of the incidence angle of the input beam. In some embodiments, the SRG operating at the Littrow configuration may also substantially backwardly diffract the input beam into a +1st order diffracted beam. An diffraction angle of the +1st order diffracted beam may be substantially equal to the incidence angle of the input beam. That is, the $+1^{st}$ order diffracted beam may propagate in a direction opposite to the propagating direction of the input beam. In some embodiments, the $0^{th}$ order diffracted beam and the $-1^{st}$ order diffracted beam may have a substantially equal light intensity. In some embodiments, the $0^{th}$ order diffracted beam and the $-1^{st}$ order diffracted beam may have different light intensities.

The system may also include a waveplate optically coupled to the SRG and configured to receive the two linearly polarized beams (e.g., the $0^{th}$ order diffracted beam and the $-1^{st}$ order diffracted beam) from the SRG. In some embodiments, the waveplate may be directly optically coupled to the SRG without another optical element disposed therebetween. In some embodiments, the waveplate may be directly optically coupled to the SRG without a gap therebetween. In some embodiments, the waveplate may be indirectly optically coupled to the SRG with another optical element disposed therebetween, which may or may not alter at least one of the propagation direction or the polarization of the $0^{th}$ order diffracted beam and the $-1^{st}$ order diffracted beam. The waveplate may be configured to convert the two linearly polarized beams (e.g., the $0^{th}$ order diffracted beam and the $-1^{st}$ order diffracted beam) into two circularly polarized beams having orthogonal circular polarizations. In some embodiments, the waveplate may function as a quarter-wave plate ("QWP") for the $0^{th}$ order diffracted beam and the $-1^{st}$ order diffracted beam having the same wavelength as the input beam, and convert the $0^{th}$ order diffracted beam and the $-1^{st}$ order diffracted beam into two circularly polarized beams with opposite handednesses, e.g., a right-handed circularly polarized ("RHCP") beam and a left-handed circularly polarized ("LHCP") beam. In some embodiments, an angle formed between the two circularly polarized beams with opposite handednesses may be substantially equal to the angle formed between the $0^{th}$ order diffracted beam and the $-1^{st}$ order diffracted beam. In some embodiments, the two circularly polarized beams with opposite handednesses may have a substantially equal light intensity. In some embodiments, the two circularly polarized beams with opposite handednesses may have different light intensities.

The two circularly polarized beams with opposite handednesses output from the waveplate may interfere with each other to generate a polarization interference pattern, to which a polarization sensitive recording medium layer may be exposed to record the polarization interference pattern therein. The two circularly polarized beams with opposite handednesses may also be referred to as two recording beams. The two recording beams (and the input beam) may have a wavelength within an absorption band of the polarization sensitive recording medium layer, e.g., ultraviolet ("UV"), violet, blue, or green beams. In some embodiments, the two recording beams (and the input beam) may be laser beams, e.g., UV, violet, blue, or green laser beams. The superposition of the two recording beams may result in a superposed wave that has a substantially uniform intensity and a varying linear polarization. For example, the linear polarization direction of the superposed wave may spatially vary within a spatial region in which the two circularly polarized beams interfere with one another. In other words, the superposed wave may have a linear polarization with an orientation (or a polarization direction) that is spatially varying within the spatial region in which the two circularly polarized beams interfere with one another. The superposition of the two recording beams may result in a polarization interference pattern. The polarization interference pattern may also be referred to as a pattern of the spatially varying orientation (or polarization direction) of the linear polarization of the superposed wave or a pattern of the varying linear polarization of the superposed wave. In some embodiments, the orientation of the linear polarization may periodically vary within the spatial region. A pattern of the periodic, spatial variation of the orientation of the linear polarization that is recorded in the recording medium layer may define a grating pattern in the recording medium. A period of the grating pattern (or an in-plane pitch of the pattern of the spatially varying orientation of the linear polarization) may be determined by the incidence angle and the wavelength of the input beam incident onto the SRG.

In some embodiments, the polarization sensitive recording medium layer may include a photo-alignment material configured to have a photo-induced optical anisotropy when exposed to the polarization interference pattern. Thus, the polarization interference pattern (or the pattern of the spatially varying orientation of the linear polarization of the superposed wave) may be recorded at (e.g., in or on) the polarization sensitive recording medium layer to define an orientation pattern of an optic axis of the polarization sensitive recording medium layer. The defined orientation pattern of the optic axis of the polarization sensitive recording medium layer may correspond to the grating pattern. In other words, the SRG may function as a mask for recording a grating pattern into the polarization sensitive recording medium layer. SRGs with different parameters may function as respective masks for recording multiple different grating patterns into the polarization sensitive recording medium layer. For example, a first SRG may be used to generate a first polarization interference pattern (and hence a first grating pattern) that may be recorded in a first region (or portion) of the polarization sensitive recording medium layer (or a first polarization sensitive recording medium layer), and a second SRG may replace the first SRG to generate a second polarization interference pattern (and hence a second grating pattern) that may be recorded into a second region (or portion) of the polarization sensitive recording medium layer (or a second polarization sensitive recording medium layer). The first portion and the second portion may be located at the same side or different sides of the polarization sensitive recording medium layer.

In some embodiments, the system may further include a light source configured to emit a first beam having a wavelength. In some embodiments, the first beam emitted by the light source may be a diverging beam with a substantially small beam size. In some embodiments, the system may further include a beam conditioning device configured to collimate and expand the first beam as a second beam that is a collimated and expanded beam with a predetermined beam size. In some embodiments, the beam size of the second beam output from the beam conditioning device may be comparable with (e.g., larger than or substantially equal to) an aperture size of the polarization sensitive recording medium layer. An aperture of the polarization sensitive recording medium layer may refer to an opening area of the polarization sensitive recording medium layer that is exposed to the polarization interference pattern (or that may receive the illumination of the polarization interference pattern) during an exposure. An aperture size of the polarization sensitive recording medium layer may refer to a size of the aperture of the polarization sensitive recording medium layer. An aperture shape of the polarization sensitive recording medium layer may refer to a shape of the aperture of the polarization sensitive recording medium layer. In some embodiments, the size of the entire polarization sensitive recording medium layer may be larger than the aperture size of the polarization sensitive recording medium layer. Multiple grating patterns may be recorded in different regions of the polarization sensitive recording medium layer through multiple exposures, e.g., using different SRGs or the same SRG.

In some embodiments, the system may further include a light or beam deflecting element configured to deflect the second beam received from the light conditioning device to alter the propagating direction of the second beam. The second beam may propagate toward the SRG as the input beam. The light deflecting element may be any suitable element configured to alter the propagating direction of the second beam, such as a reflector, a grating, a beam splitting element, etc. For example, a mirror (a type of the reflector) may be used to alter the propagating direction of the second beam. In the following descriptions and in the figures, for discussion and illustrative purposes, a reflector is used as an example of the light deflecting element. In some embodiments, the system may further include a first movable stage coupled to the reflector. The first movable stage may be configured to adjust a position and/or an orientation (e.g., a tilting angle) of the reflector. When the orientation of the reflector is adjusted, the incidence angle of the input beam reflected by the reflector onto the SRG may be adjusted, for example, to a predetermined incidence angle. In some embodiments, the system may further include a second movable stage on which the polarization sensitive recording medium layer is disposed. The second movable stage may be translational and/or rotatable to adjust at least one of a position and an orientation of the polarization sensitive recording medium layer disposed thereon relative to the input beam incident onto the SRG, which is disposed over the polarization selective recording medium layer. In some embodiments, the system may further include a controller communicatively coupled with the first and second movable stages, and configured to control the operations of the first and second movable stages.

Multiple grating patterns may be recorded into different regions (or portions) of the polarization sensitive recording medium layer through multiple exposures. In some embodiments, the multiple grating patterns may be substantially identical, e.g., the multiple grating patterns may have the same parameters, such as the same grating period, the same grating orientation, the same aperture size, and the same aperture shape, etc. In some embodiments, at least two of the grating patterns may have at least one different parameter, such as different grating periods, different grating orientations, different aperture sizes, and/or different aperture shapes, etc.

In some embodiments, the grating period of the grating pattern recorded into the polarization sensitive recording medium layer may be at least partially determined by the incidence angle and the wavelength of the input beam incident onto the SRG, and may be variable through varying the incidence angle and/or the wavelength of the input beam incident onto the SRG. The incidence angle and the wavelength of the input beam, and the parameters (e.g., surface profile, duty cycle, etch depth, refractive index, and/or grating period, etc.) of the SRG may satisfy a predetermined relationship to achieve the Littrow configuration for the SRG. When the incidence angle and/or the wavelength of the input beam varies, the parameters (e.g., surface profile, duty cycle, etch depth, refractive index, and/or grating period, etc.) of the SRG may vary accordingly, such that the SRG may still operate at the Littrow configuration for the input beam having a different incidence angle and/or a different wavelength. In some embodiments, different SRGs with different parameters may be used as masks for recording grating patterns with different grating periods into the polarization sensitive recording medium layer.

When the incidence angle and wavelength of the input beam incident onto the SRG are fixed values, the grating orientation of the grating pattern (or orientations of grating fringes) recorded into the polarization sensitive recording medium layer may be varied through varying the orientation of the polarization sensitive recording medium layer, e.g., through rotating the polarization sensitive recording medium layer in a predetermined direction (e.g., clockwise or counter-clockwise). In some embodiments, the size of the grating pattern recorded into the polarization sensitive recording medium layer may be varied through varying the beam size of the input beam and/or the aperture size of the polarization sensitive recording medium layer. In some embodiments, the shape of the grating pattern recorded into the polarization sensitive recording medium layer may be varied through varying the beam shape of the input beam and/or the aperture shape of the polarization sensitive recording medium layer.

In some embodiments, a birefringent medium may be dispensed, e.g., coated or deposited, on the polarization sensitive recording medium layer that has been exposed to the polarization interference pattern to form a birefringent medium layer. The birefringent medium may include one or more birefringent materials having an intrinsic birefringence, such as non-polymerizable LCs or polymerizable LCs (e.g., reactive mesogens ("RMs")). The polarization sensitive recording medium layer may be configured to at least partially align optically anisotropic molecules (e.g., LC molecules, or RM molecules, etc.) in the birefringent medium to form the grating pattern. Thus, the grating pattern recorded in the polarization sensitive recording medium layer may be transferred to the birefringent medium. In some embodiments, the aligned birefringent medium may be polymerized to solidify and form the birefringent medium layer. A polarization selective grating may be obtained. In some embodiments, when multiple grating patterns are recorded in different regions of the polarization sensitive recording medium layer, the polarization sensitive recording medium layer may be configured to at least partially align optically anisotropic molecules (e.g., LC molecules, or RM molecules, etc.) disposed in corresponding regions of the birefringent medium layer to produce respective grating patterns. Multiple polarization selective gratings may be obtained after the aligned birefringent medium layer is polymerized.

In the disclosed embodiments, the SRG may function as a mask for recording a corresponding grating pattern into the polarization sensitive recording medium layer. The SRGs with different parameters may function as different masks for recording different grating patterns into the polarization sensitive recording medium layer. Compared to a conventional polarization selective grating that operates at the Littrow configuration to diffract an incident beam as two diffracted beams with different polarizations, the SRG of the present disclosure fabricated from, e.g., an inorganic material, may have a higher damage threshold than the conventional polarization selective grating. In addition, the SRG of the present disclosure may have a higher diffraction efficiency at a short grating period (e.g., 300 nm~500 nm) than the conventional polarization selective grating. Thus, the SRG of the present disclosure may provide an improved reliability and an increased power efficiency for the fabrication of the PSOEs. Fabricating PSOEs (e.g., gratings) through the SRG(s) may expedite the fabrication iteration with a more reliable inorganic mask, a finer spatial resolution, and an enhanced alignment precision, and a higher throughput. The disclosed fabrication system and method may provide a cost-effective and contactless solution for the fabrication of polarization selective gratings (e.g., PVH gratings, or PBP gratings, etc.) with any desirable 1D or 2D diffraction efficiency profile (e.g., any non-uniform diffraction efficiency profile), which may be implemented in numerous applications in a variety of technical fields. In some applications, a polarization selective grating (e.g., a PVH grating, or a PBP grating, etc.) with a non-uniform diffraction efficiency may improve the optical performance of an optical assembly or system in which the polarization selective grating is implemented.

FIG. 1A illustrates a schematic three-dimensional ("3D") view of a polarization selective optical element ("PSOE") 100 with an incident light 102 incident onto the PSOE 100 along a −z-axis, according to an embodiment of the present disclosure. Although the PSOE 100 is shown as a rectangular plate shape for illustrative purposes, the PSOE 100 may have any suitable shape, such as a circular shape. In some embodiments, one or both surfaces along the light propagating path of the incident light 102 may have curved shapes. The PSOE 100 may include suitable sub-wavelength structures, liquid crystals, photo-refractive holographic materials, or any combination thereof. In some embodiments, the PSOE 100 may be fabricated based on an isotropic or anisotropic material. In some embodiments, the PSOE 100 may be fabricated based on a birefringent medium, e.g., liquid crystal ("LC") materials, which may have an intrinsic orientational order of optically anisotropic molecules that can be locally controlled. In some embodiments, the PSOE 100 may be fabricated based on a photosensitive polymer, such as an amorphous polymer, an LC polymer, etc., which may generate an induced (e.g., photo-induced) optical anisotropy and/or an induced (e.g., photo-induced) optic axis orientation when subjected to a polarized light irradiation.

In some embodiments, the PSOE 100 may include a birefringent medium layer. The birefringent medium layer 115 may have a first surface 115-1 and a second surface 115-2 opposite to the first surface 115-1. The first surface 115-1 and the second surface 115-2 may be surfaces along the light propagating path of the incident light 102. The birefringent medium layer 115 may include optically anisotropic molecules configured with a three-dimensional ("3D") orientational pattern to provide a polarization selective optical response. In some embodiments, the birefringent medium layer 115 of the PSOE 100 may include an LC material, and an optic axis of the LC material may be configured with a spatially varying orientation in at least one in-plane direction. For example, the optic axis of the LC material may periodically or non-periodically vary in at least one in-plane linear direction, in at least one in-plane radial direction, in at least one in-plane circumferential (e.g., azimuthal) direction, or a combination thereof. The LC molecules may be configured with an in-plane orientation pattern, in which the directors of the LC molecules may periodically or non-periodically vary in the at least one in-plane direction. In some embodiments, the optic axis of the LC material may also be configured with a spatially varying orientation in an out-of-plane direction. The directors of the LC molecules may also be configured with spatially varying orientations in an out-of-plane direction. For example, the optic axis of the LC material (or directors of the LC molecules) may twist in a helical fashion in the out-of-plane direction.

Figure 1B:
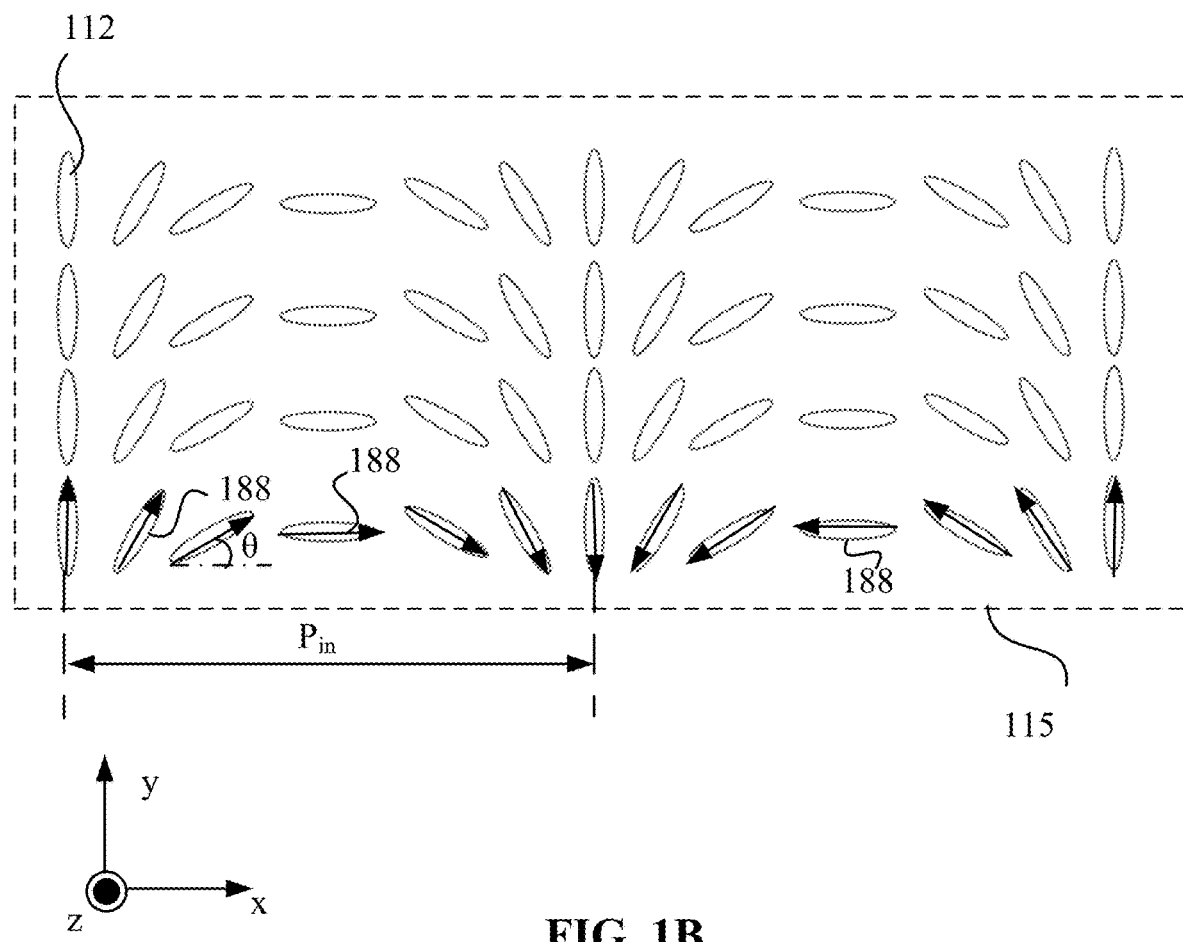
FIGS. 1B-1D schematically illustrate a portion of in-plane orientations of optically anisotropic molecules of the PSOE shown in FIG. 1A, according to various embodiments of the present disclosure.
Figure 1C:
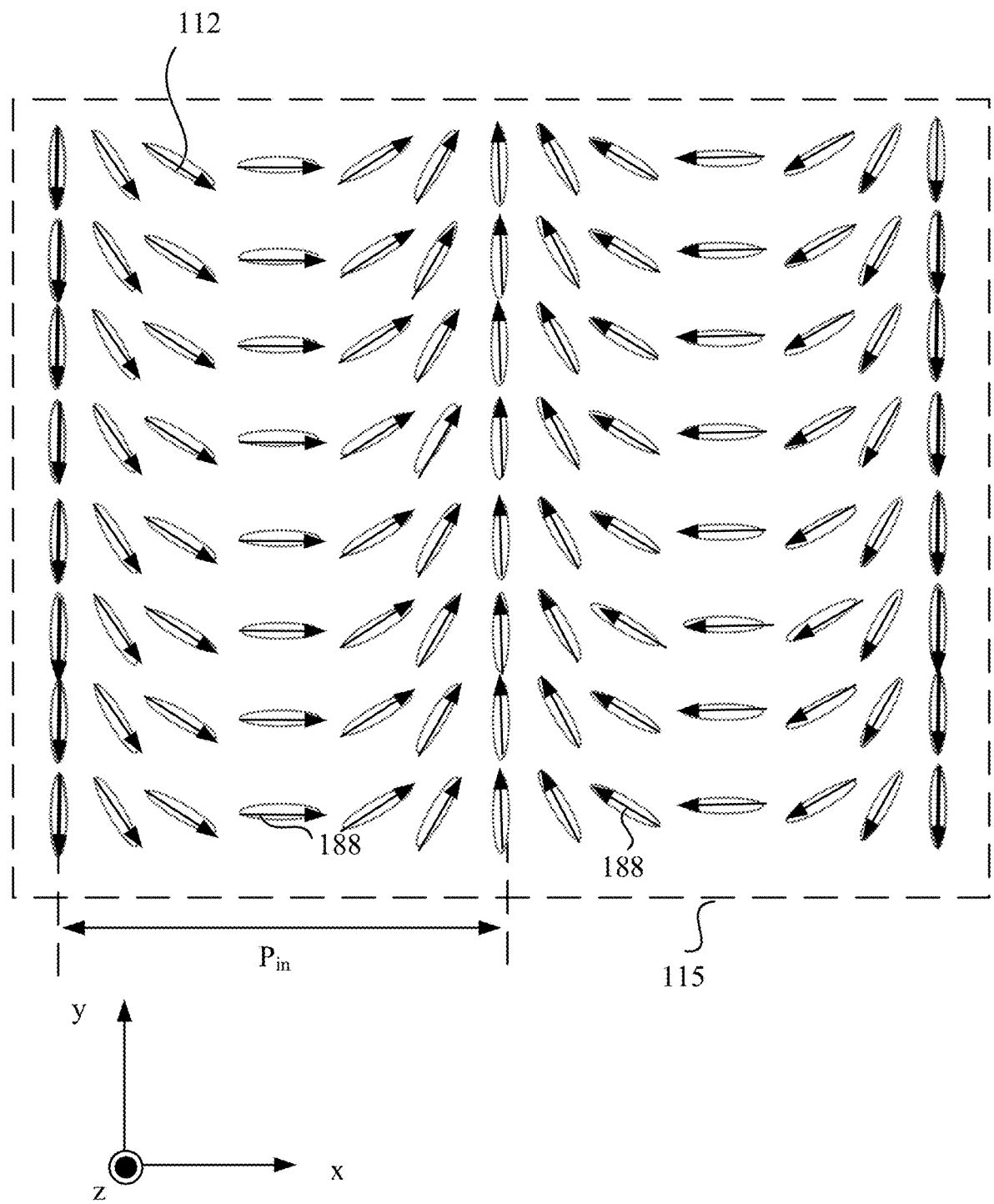
Figure 1D:
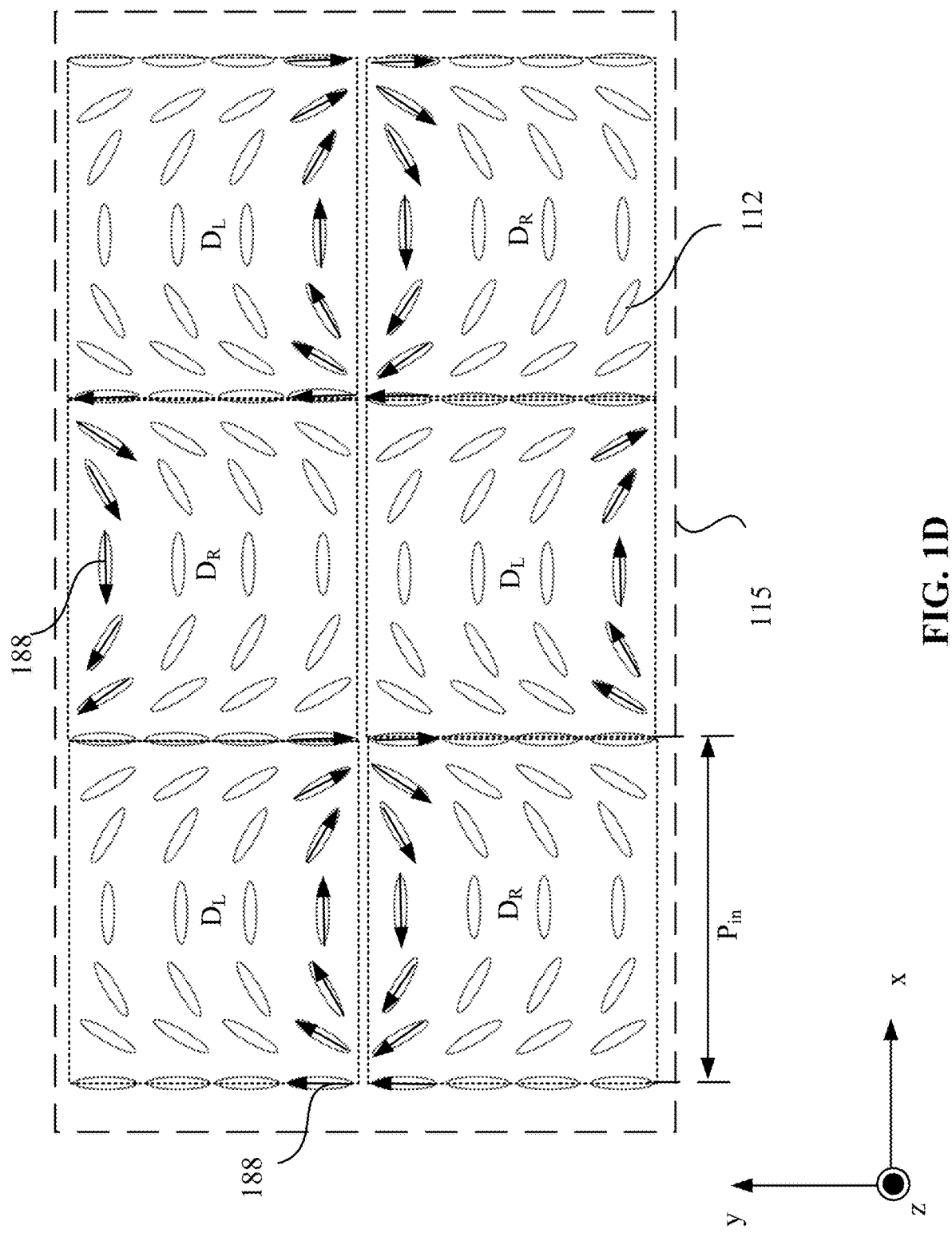

In some embodiments, the PSOE 100 may be a polarization selective grating. FIGS. 1B-1D schematically illustrate a portion of a periodic in-plane orientation pattern of optically anisotropic molecules 112 of the PSOE 100, according to various embodiments of the present disclosure. For discussion purposes, rod-like LC molecules 112 are used as examples of the optically anisotropic molecules 112 of the birefringent medium layer 115. The rod-like LC molecule 112 may have a longitudinal direction (or a length direction) and a lateral direction (or a width direction). The longitudinal direction of the LC molecule 112 may be referred to as a director of the LC molecule 112 or an LC director. An orientation of the LC director may determine a local optic axis orientation or an orientation of the optic axis at a local point of the birefringent medium layer 115. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal.

FIGS. 1B-1D schematically illustrate an x-y sectional view of a portion of the periodic in-plane orientation pattern of the LC directors (indicated by arrows 188 in FIG. 1B) of the LC molecules 112 located in close proximity to or at a surface (e.g., at least one of the first surface 115-1 or the second surface 115-2) of the birefringent medium layer 115 shown in FIG. 1A. For illustrative purposes, the LC directors of the LC molecules 112 shown in FIGS. 1B-1D are presumed to be in the surface of the birefringent medium layer 115 or in a plane parallel with the surface with substantially small tilt angles with respect to the surface. The LC directors located in close proximity to or at the surface (at least one of the first surface 115-1 or the second surface 115-2) of the birefringent medium layer 115 may rotate periodically in at least one in-plane direction (e.g., an x-axis direction).

As shown in FIG. 1B, the LC molecules 112 located in close proximity to or at a surface (e.g., at least one of the first surface 115-1 or the second surface 115-2) of the birefringent medium layer 115, may be configured with LC directors continuously rotating in a predetermined direction (e.g., an x-axis direction) along the surface (or in a plane parallel with the surface). The continuous rotation of the LC directors may form a periodic rotation pattern with a uniform (e.g., same) in-plane pitch $P_{in}$. The predetermined direction may be any suitable direction along the surface (or in a plane parallel with the surface) of the birefringent medium layer 115. For illustrative purposes, FIG. 1B shows that the predetermined direction is the x-axis direction. The predetermined direction may be referred to as an in-plane direction, the pitch $P_{in}$ along the in-plane direction may be referred to as an in-plane pitch or a horizontal pitch. The pattern with the uniform (or same) in-plane pitch $P_{in}$ may be referred to as a periodic LC director in-plane orientation pattern. The in-plane pitch $P_{in}$ is defined as a distance along the in-plane direction (e.g., the x-axis direction) over which the LC directors rotate by a predetermined value (e.g., 180°). In other words, in a region substantially close to (including at) the surface of the birefringent medium layer 115, local optic axis orientations of the birefringent medium layer 115 may vary periodically in the in-plane direction (e.g., the x-axis direction) with a pattern having the uniform (or same) in-plane pitch $P_{in}$.

In addition, at the surface (e.g., at least one of the first surface 115-1 or the second surface 115-2) of the birefringent medium layer 115, the directors of the LC molecules 112 may rotate in a predetermined rotation direction, e.g., a clockwise direction or a counter-clockwise direction. Accordingly, the rotation of the directors of the LC molecules 112 at the surface of the birefringent medium layer 115 may exhibit a handedness, e.g., right handedness or left handedness. In the embodiment shown in FIG. 1B, at the surface (e.g., at least one of the first surface 115-1 or the second surface 115-2) of the birefringent medium layer 115, the directors of the LC molecules 112 may rotate in a clockwise direction. Accordingly, the rotation of the directors of the LC molecules 112 at the surface of the birefringent medium layer 115 may exhibit a left handedness.

FIG. 1C schematically illustrates a portion of the periodic in-plane orientation pattern of the directors (indicated by arrows 188 in FIG. 1C) of the LC molecules 112 located in close proximity to or at a surface (e.g., at least one of the first surface 115-1 or the second surface 115-2) of the birefringent medium layer 115. In the embodiment shown in FIG. 1C, at the surface (e.g., at least one of the first surface 115-1 or the second surface 115-2) of the birefringent medium layer 115, the directors of the LC molecules 112 may rotate in a counter-clockwise direction. Accordingly, the rotation of the directors of the LC molecules 112 at the surface of the birefringent medium layer 115 may exhibit a right handedness. The directors of the LC molecules 112 located in close proximity to or at a surface of the birefringent medium layer 115 shown in FIG. 1B and the directors of the LC molecules 112 located in close proximity to or at a surface of the birefringent medium layer 115 shown in FIG. 1C may have mirror symmetric orientation patterns.

FIG. 1D schematically illustrates a portion of the periodic in-plane orientation pattern of the directors (indicated by arrows 188 in FIG. 1D) of the LC molecules 112 located in close proximity to or at a surface (e.g., at least one of the first surface 115-1 or the second surface 115-2) of the birefringent medium layer 115. It is noted that in FIG. 1D, only some directors are indicated by arrows 188. Arrows are not shown for all directors for the simplicity of illustration. In the embodiment shown in FIG. 1D, at the surface (e.g., at least one of the first surface 115-1 or the second surface 115-2) of the birefringent medium layer 115, domains in which the directors of the LC molecules 112 may rotate in a clockwise direction (referred to as domains DL) and domains in which the directors of the LC molecules 112 may rotate in a counter-clockwise direction (referred to as domains DR) may be alternatingly arranged in both x-axis and y-axis directions. The domains DL and the domains DR are schematically enclosed by dotted squares. In some embodiments, the domains DL and the domains DR may have substantially the same size. In some embodiments, the width of each domain may be substantially equal to the value of the in-plane pitch $P_{in}$. Although not shown, in some embodiments, the domains DL and the domains DR may be alternatingly arranged in at least one direction along the surface of the (e.g., at least one of the first surface 115-1 or the second surface 115-2) of the birefringent medium layer 115. In some embodiments, the width of each domain may be an integer multiple of the values of the in-plane pitch $P_{in}$. In some embodiments, the domains DL and the domains DR may have different sizes.

Figure 1E:
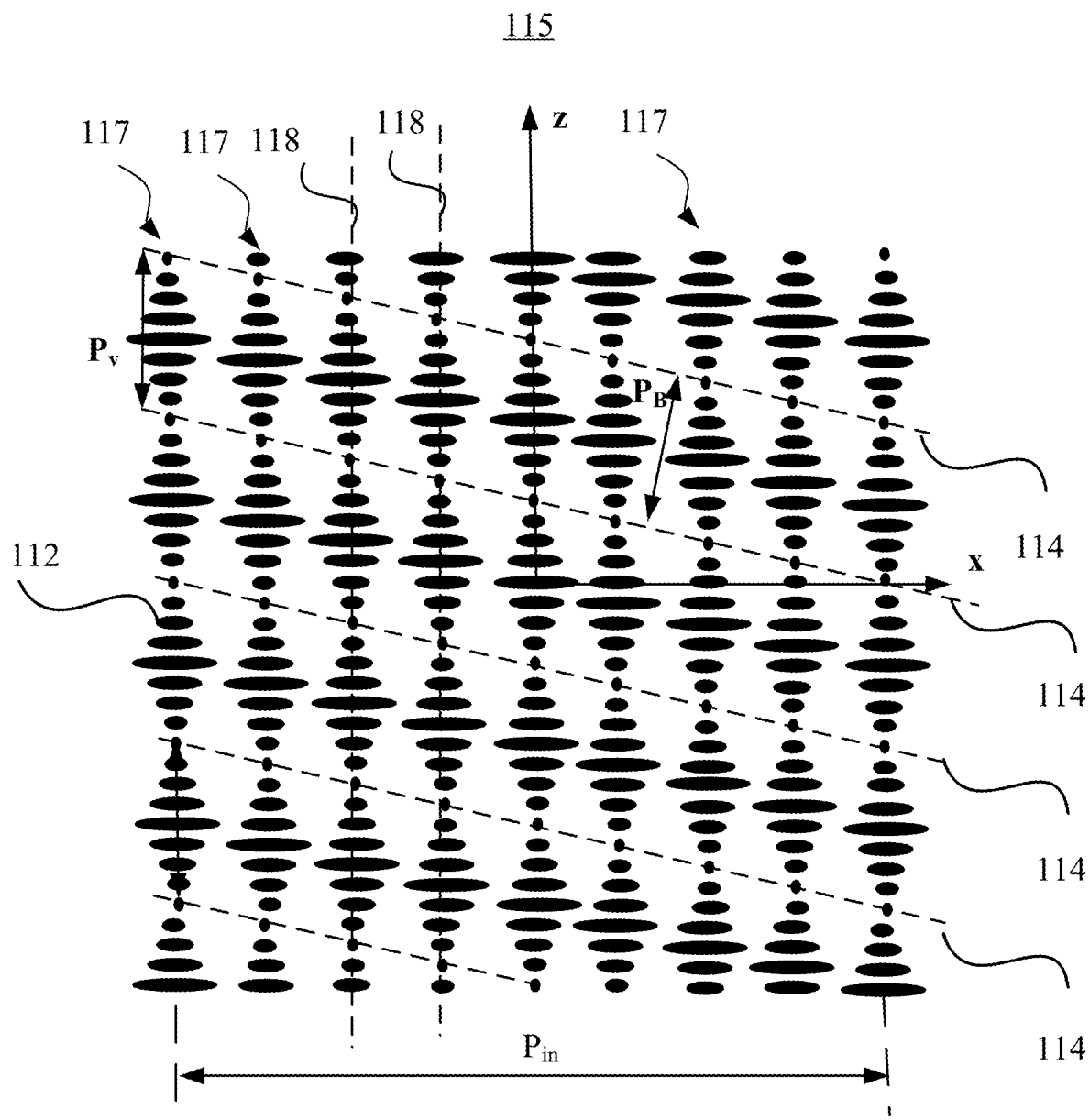
FIGS. 1E-1G schematically illustrate a portion of out-of-plane orientations of optically anisotropic molecules of the PSOE shown in FIG. 1A, according to various embodiments of the present disclosure.
Figure 1F:
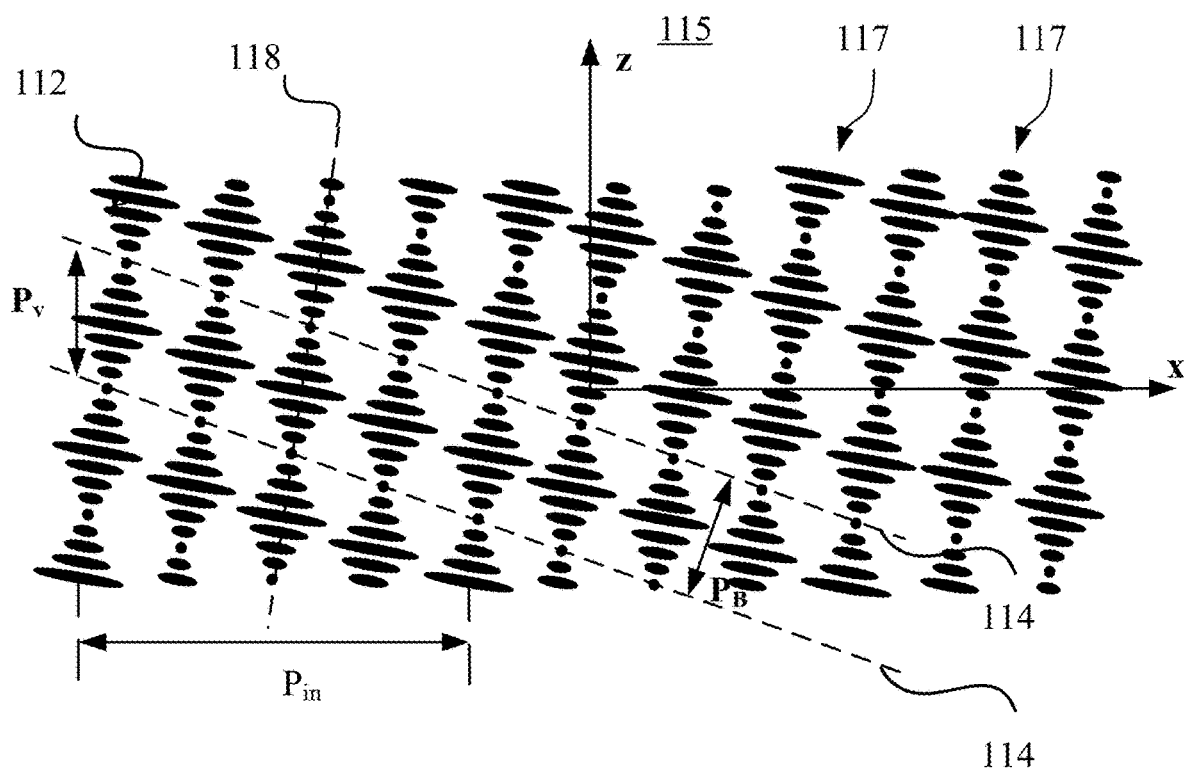
Figure 1G:
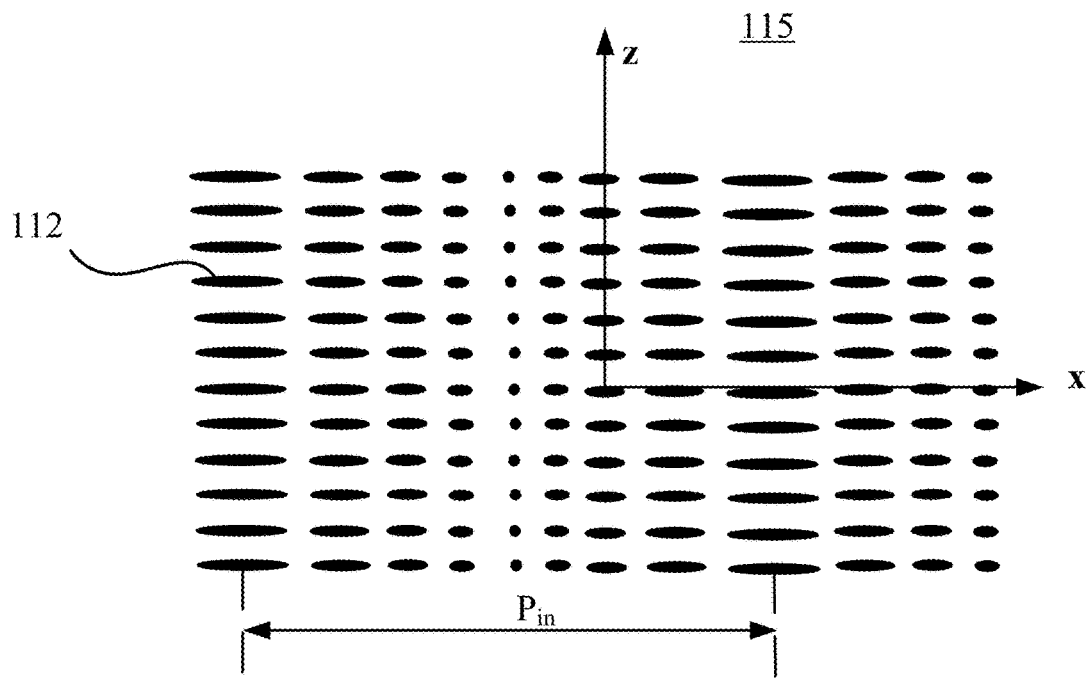

FIGS. 1E-1G schematically illustrate a y-z sectional view of a portion of out-of-plane orientations of the LC directors (indicated by arrows 188 in FIG. 1B) of the LC molecules 112 in the PSOE 100 shown in FIG. 1A, according to various embodiments of the present disclosure. As shown in FIG. 1E, inside (or within, in) a volume of the birefringent medium layer 115, the LC molecules 112 may be arranged in a plurality of helical structures 117 with a plurality of helical axes 118 and a helical pitch $P_h$ along the helical axes. The azimuthal angles of the LC molecules 112 arranged along a single helical structure 117 may continuously vary around a helical axis 118 in a predetermined rotation direction, e.g., clockwise direction or counter-clockwise direction. In other words, the LC directors of the LC molecules 112 arranged along a single helical structure 117 may continuously rotate around the helical axis 118 in a predetermined rotation direction to continuously change the azimuthal angle. Accordingly, the helical structure 117 may exhibit a handedness, e.g., right handedness or left handedness. The helical pitch $P_h$ may be defined as a distance along the helical axis 118 over which the LC directors rotate around the helical axis 118 by 360°, or the azimuthal angles of the LC molecules vary by 360°.

In the embodiment shown in FIG. 1E, the helical axes 118 may be substantially perpendicular to the first surface 115-1 and/or the second surface 115-2 of the birefringent medium layer 115. In other words, the helical axes 118 of the helical structures 117 may be in a thickness direction (e.g., a z-axis direction) of the birefringent medium layer 115. That is, the LC molecules 112 may have substantially small tilt angles (including zero degree tilt angles), and the LC directors of the LC molecules 112 may be substantially orthogonal to the helical axis 118. The birefringent medium layer 115 may have a vertical pitch $P_v$, which may be defined as a distance along the thickness direction of the birefringent medium layer 115 over which the LC directors of the LC molecules 112 rotate around the helical axis 118 by 180° (or the azimuthal angles of the LC molecules vary by 180°).

As shown in FIG. 1E, the LC molecules 112 from the plurality of helical structures 117 having a first same orientation (e.g., same tilt angle and azimuthal angle) may form a first series of slanted and parallel refractive index planes 114 periodically distributed within the volume of the birefringent medium layer 115. Although not labeled, the LC molecules 112 with a second same orientation (e.g., same tilt angle and azimuthal angle) different from the first same orientation may form a second series of slanted and parallel refractive index planes periodically distributed within the volume of the birefringent medium layer 115. Different series of slanted and parallel refractive index planes may be formed by the LC molecules 112 having different orientations. In the same series of parallel and periodically distributed, slanted refractive index planes 114, the LC molecules 112 may have the same orientation and the refractive index may be the same. Different series of slanted refractive index planes may correspond to different refractive indices. When the number of the slanted refractive index planes (or the thickness of the birefringent medium layer) increases to a sufficient value, Bragg diffraction may be established according to the principles of volume gratings. Thus, the slanted and periodically distributed refractive index planes 114 may also be referred to as Bragg planes 114. Within the birefringent medium layer 115, there may exist different series of Bragg planes. A distance (or a period) between adjacent Bragg planes 114 of the same series may be referred to as a Bragg period $P_B$. The different series of Bragg planes formed within the volume of the birefringent medium layer 115 may produce a varying refractive index profile that is periodically distributed in the volume of the birefringent medium layer 115. The birefringent medium layer 115 may diffract an input light satisfying a Bragg condition through Bragg diffraction.

In the embodiment shown in FIG. 1F, the helical axes 118 of helical structures 117 may be tilted with respect to the first surface 115-1 and/or the second surface 115-2 of the birefringent medium layer 115 (or with respect to the thickness direction of the birefringent medium layer 115). For example, the helical axes 118 of the helical structures 117 may have an acute angle or obtuse angle with respect to the first surface 115-1 and/or the second surface 115-2 of the birefringent medium layer 115. In some embodiments, the LC directors of the LC molecule 112 may be substantially orthogonal to the helical axes 118 (i.e., the tilt angle may be substantially zero degree). In some embodiments, the LC directors of the LC molecule 112 may be tilted with respect to the helical axes 118 at an acute angle. The birefringent medium layer 115 may have a vertical periodicity (or pitch) $P_v$.

For discussion purposes, FIGS. 1E and 1F show that the Bragg planes 114 within the volume of the birefringent medium layer 115 are slanted Bragg planes, which form an acute angle with respect to at least one of the first surface 115-1 or the second surface 115-2 of the birefringent medium layer 115. In some embodiments, the Bragg planes may be configured to be vertical Bragg planes, which may be substantially perpendicular to a surface (e.g., at least one of the first surface 115-1 or the second surface 115-2) of the birefringent medium layer 115. In some embodiments, the Bragg planes may be configured to be substantially horizontal Bragg planes, which are perpendicular to the surface (e.g., at least one of the first surface 115-1 or the second surface 115-2) of the birefringent medium layer 115.

In the embodiment shown in FIG. 1G, in a volume of the birefringent medium layer 115, along the thickness direction (e.g., the z-axis direction) of the birefringent medium layer 115, the directors (or the azimuth angles) of the LC molecules 112 may remain in the same orientation (or value) from the first surface 115-1 to the second surface 115-2 of the birefringent medium layer 115. In some embodiments, the thickness of the LC layer 910 may be configured as $d=\lambda/(2*\Delta n)$, where $\lambda$ is a design wavelength, $\Delta n$ is the birefringence of the LC material of the birefringent medium layer 115, and Δn=$n_e$−$n_o$, where $n_e$ and $n_o$ are the extraordinary and ordinary refractive indices of the LC material, respectively.

Referring to FIGS. 1E-1G, in some embodiments, the PSOE 100 including the birefringent medium layer 115 in which the LC directors have out-of-plane orientations shown in FIG. 1E or FIG. 1F may function as a PVH element (e.g., a PVH grating). A slant angle α of the PVH element including the birefringent medium layer 115 may be defined as α=90°−β, where β=arctan ($P_y/P_{in}$). In some embodiments, when the slant angle is within a range of 0°<α<45°, the PSOE 100 may function as a transmissive PVH element (e.g., transmissive PVH grating). In some embodiments, when the slant angle is within a range of 45°<α<90°, the PSOE 100 may function as a reflective PVH element (e.g., reflective PVH grating). The diffraction efficiency of a PVH element may be affected by various parameters, such as the thickness, the birefringence, and/or the slant angle α of the PVH element, etc. The birefringence and the slant angle α of the PVH element may be related to the material properties of a birefringent medium forming the PVH element. For example, the birefringence of the PVH element may be related to the birefringence of the birefringent medium, and the slant angle α of the PVH element may be related to a chirality of the birefringent medium. When two birefringent media having a substantially same chirality are used to form two PVH elements respectively, provided that the in-plane pitches of the two PVH elements are substantially the same, the slant angles of the two PVH elements may be substantially the same. When two birefringent media having a substantially same chirality are used to form two PVH elements respectively, provided that the in-plane pitches of the two PVH elements are different, the slant angles of the two PVH elements may be different. When two birefringent media having different chiralities are used to form two PVH elements respectively, provided that the in-plane pitches of the two PVH elements are substantially the same, the slant angles of the two PVH elements may be different. In some embodiments, the birefringent medium layer 115 in which the LC directors have out-of-plane orientations shown in FIG. 1G may function as a PBP grating. Referring to FIGS. 1B-1G, the in-plane pitch $P_{in}$ of the PSOE 100 (e.g., a PVH grating or a PBP grating) may determine, in part, the optical properties of the PSOE 100 (e.g., a PVH grating or a PBP grating). For example, the in-plane pitch $P_{in}$ may determine the diffraction angles of diffracted beams. In some embodiments, the diffraction angle of a diffracted beam with a wavelength within a predetermined wavelength range may increase as the in-plane pitch $P_{in}$ decreases.

Figure 2A:
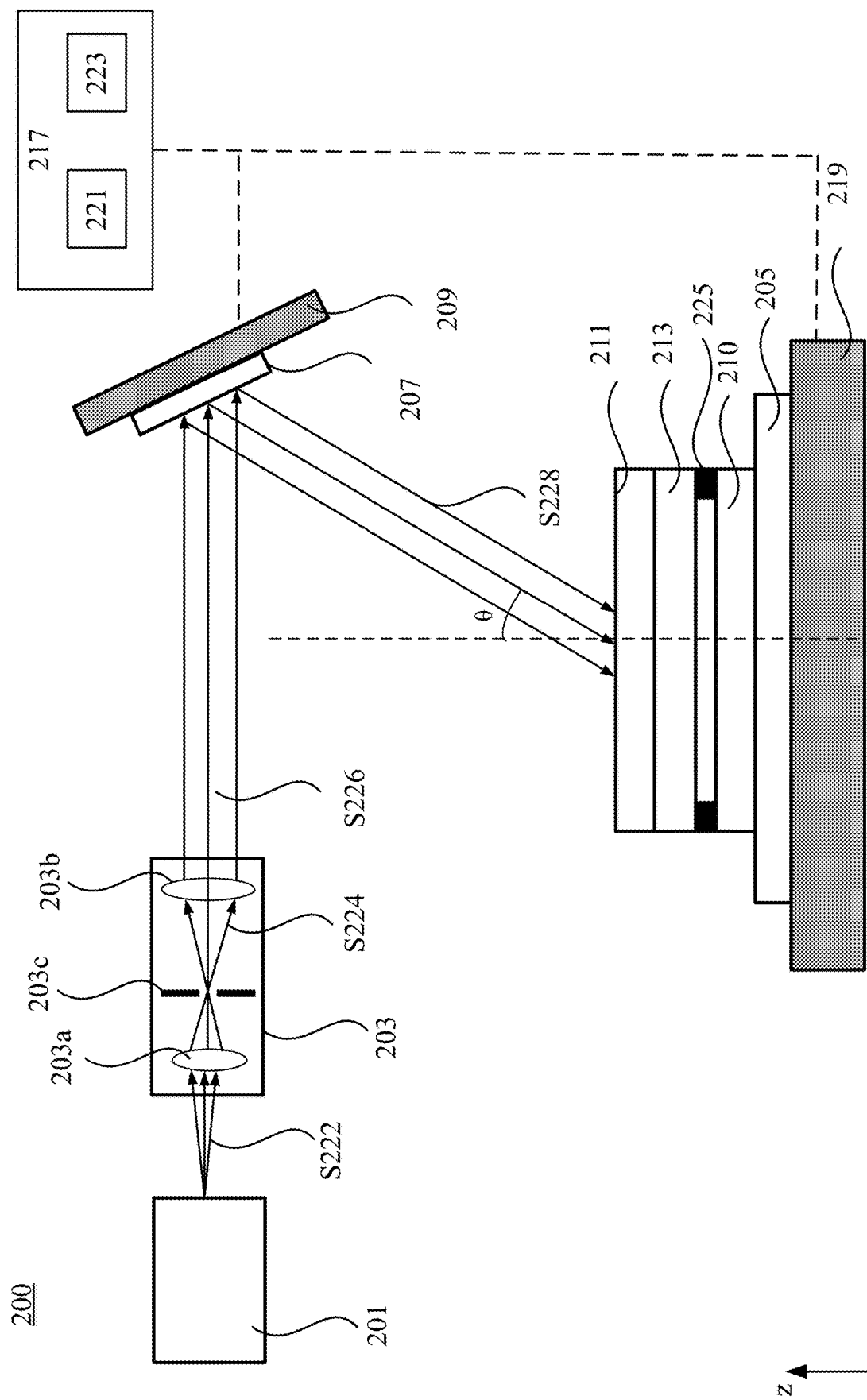
FIG. 2A schematically illustrates a system for generating a polarization interference, according to an embodiment of the present disclosure.

FIG. 2A schematically illustrates an x-z sectional view of a system 200 configured to generate a polarization interference pattern and record the polarization interference pattern in a recording medium layer 210, according to an embodiment of the present disclosure. As shown in FIG. 2A, the recording medium layer 210 may be disposed on a substrate 205. The system 200 may include a light source 201 configured to emit a beam S222 of a wavelength within an absorption band of the recording medium layer 210. For example, the beam S222 may be a UV, violet, blue, or green beam. In some embodiments, the beam S222 may be a diverging beam. In some embodiments, the light source 201 may be a laser light source, e.g., a laser diode, configured to emit a laser beam S222 (e.g., a blue laser beam with a center wavelength of about 460 nm). The system 200 may include a beam conditioning device (or spatial filtering device) 203. The beam conditioning device 203 may be configured to condition (e.g., polarize, expand, collimate, filter, remove noise from, etc.) the beam S222 received from the light source 201 to be a collimated beam S226 with a predetermined beam size and a predetermined polarization. In some embodiments, the beam conditioning device 203 may include a first lens 203a, a pinhole aperture 203c, and a second lens 203b arranged in an optical series. In some embodiments, one or more of the first lens 203a, the pinhole aperture 203c, and the second lens 203b may be mounted on a movable mechanism for adjusting the relative distances therebetween. In some embodiments, the pinhole aperture 203c may be coupled with an adjustment mechanism configured to adjust the size of the aperture. The first lens 203a may be configured to focus the diverging beam S222 to an on-axis focal point where the pinhole aperture 203c is located. When the diverging beam S222 is an input Gaussian beam S222, the first lens 203a may be configured to transform the input Gaussian beam S222 into a central Gaussian spot (on the optical axis) and side fringes representing unwanted "noise." The opening of the pinhole aperture 203c may be configured to be centered on the central Gaussian spot, and the size of the opening of the pinhole aperture 203c may be configured to pass the central Gaussian spot and block the "noise" fringes. Thus, the noise in the input Gaussian beam S222 may be filtered by the pinhole aperture 203c, and a "clean" output Gaussian beam S224 may be output by the pinhole aperture 203c and received by the second lens 203b. The second lens 203b may be configured to collimate and expand the beam S224 as the collimated beam S226 with a predetermined beam size. In some embodiments, the beam conditioning device 203 may also be referred to as a spatial filtering device.

In some embodiments, the beam conditioning device 203 may further include one or more optical elements (e.g., a polarizer, and/or a waveplate, etc.) configured to change the polarization of the beam S222 or to polarize the beam S222, and output the beam S226 with a predetermined polarization. The one or more optical elements may be disposed at suitable positions in the beam conditioning device 203, e.g., before the first lens 203a, after the second lens 203b, or between the first lens 203a and the second lens 203b. In some embodiments, the beam S226 may be an at least partially polarized beam. In some embodiments, the beam S226 may be decomposed into two linearly polarized components with a substantially equal light intensity and a suitable phase delay between the two linearly polarized components. For example, the beam S226 may be a linearly polarized beam, a circularly polarized beam, or an elliptical polarized beam, etc.

The system 200 may include light deflecting element, such as a reflector (e.g., a mirror) 207 configured to reflect the beam S226 as a beam S228 toward a mask 211. In this embodiment, an SRG 211 is used as an example of the mask 211. The SRG 211 may be disposed over a polarization conversion element 213. In this embodiment, a waveplate 213 is used as an example of the polarization conversion. The waveplate 213 may be disposed between the SRG 211 and the recording medium layer 210. Beams output from the SRG 211 may be further processed by the waveplate 213 before the beams interfere with one another to generate a polarization interference pattern for recording in the recording medium layer 210. The orientation of the reflector 207 may be adjustable to adjust the incidence angle θ of the beam S228 incident onto the SRG 211. In some embodiments, the reflector 207 may be mounted on a first movable stage 209. The first movable stage 209 may be configured to be translatable and/or rotatable. For example, in some embodiments, the first movable stage 209 may be translatable in one or more linear directions, thereby translating or moving the reflector (e.g., mirror) 207 in the one or more linear directions. In some embodiments, the first movable stage 209 may be rotatable around one or more local axes of the first movable stage 209, such as an axis of rotation passing through the center of the first movable stage 209, thereby rotating the reflector (e.g., mirror) 207 around the axis of rotation of the first movable stage 209.

In some embodiments, a controller 217 may be communicatively coupled with the first movable stage 209, and may control the operations and/or movements of the first movable stage 209. The controller 217 may include a processor or processing unit 221. The processor may by any suitable processor, such as a central processing unit ("CPU"), a graphic processing unit ("GPU"), etc. The controller 217 may include a storage device 223. The storage device 223 may be a non-transitory computer-readable medium, such as a memory, a hard disk, etc. The storage device 223 may be configured to store data or information, including computer-executable program instructions or codes, which may be executed by the processor 221 to perform various controls or functions according to the methods or processes disclosed herein.

Figure 2B:
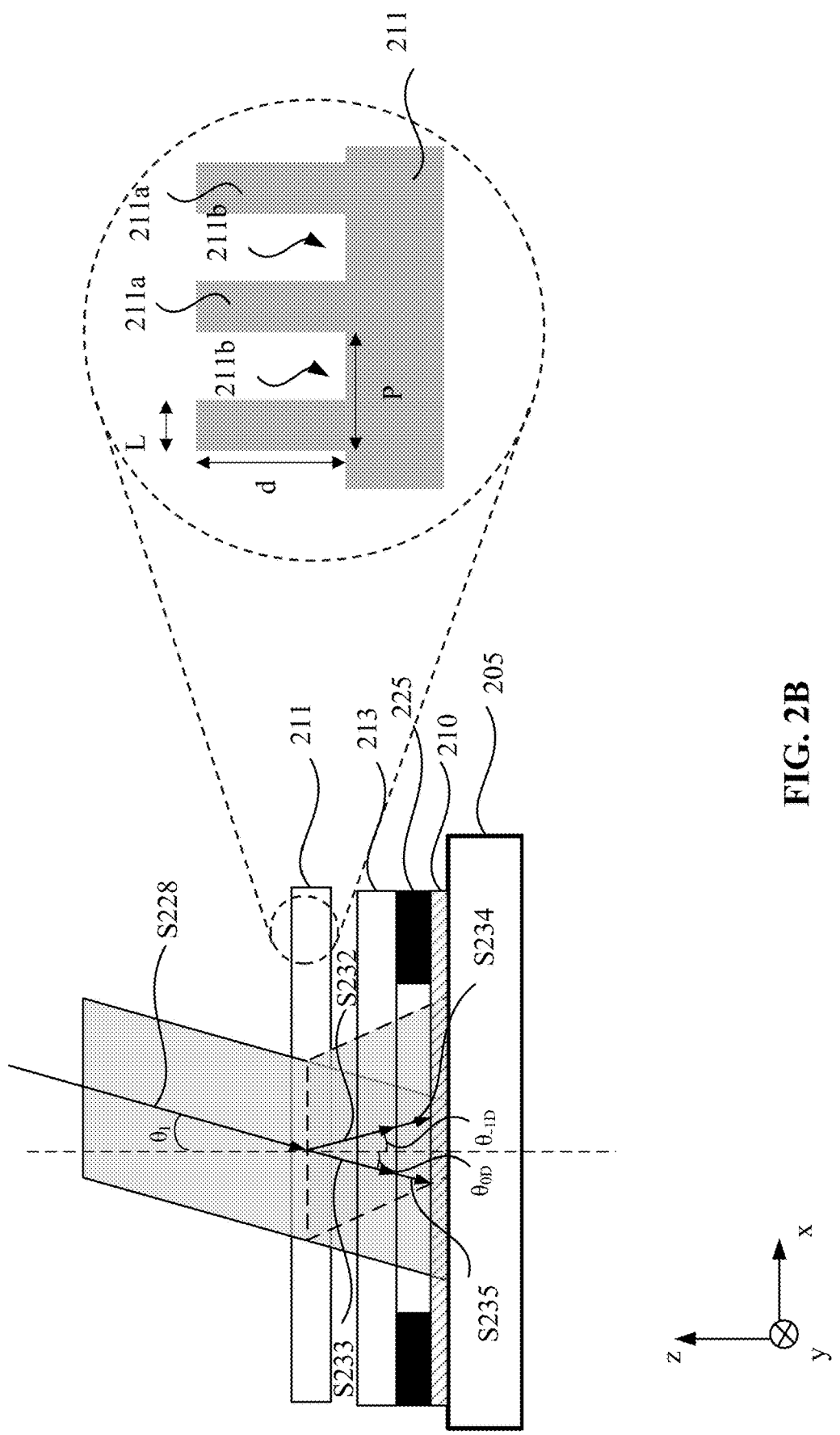
FIG. 2B schematically illustrates a diagram of a surface relief grating ("SRG") and a waveplate with an enlarged view of a portion of the SRG, which may be included in the system shown in FIG. 2A, according to an embodiment of the present disclosure.

FIG. 2B schematically illustrates the SRG 211 and the waveplate 213 included in the system 200 shown in FIG. 2A, according to an embodiment of the present disclosure. In the embodiment shown in FIG. 2B, the SRG 211 is shown as spaced apart from the waveplate 213 by a gap. In some embodiments, the SRG 211 and the waveplate 213 may be stacked without a gap. Referring to the enlarged view of a portion of the SRG 211 in FIG. 2B, the SRG 211 may include a plurality of microstructures 211a (e.g., rectangular pillars with sizes at the micron level or nano level) defining or forming a plurality of grooves 211b. The microstructures 211a are schematically illustrated as solid grey rectangular structures, and the grooves 211b are shown as spaces between the solid black portions in FIG. 2B. The SRG 211 may have the following parameters shown in the enlarged view of the portion of the SRG 211 in FIG. 2B. A grating period P of the SRG 211 may be defined as a distance between microstructures 211a (also referred to as grating lines) 211b. In some embodiments, the grating period P may be uniform or constant for all microstructures 211a. In some embodiments, at least one grating period P between two microstructures 211a may be different from another grating period P between another two microstructures 211a. That is, in some embodiments, the grating period P may vary along the SRG 211. In the following descriptions, for discussion purposes and illustrative purposes, the grating period P is presumed to be constant or uniform. An inverse of the grating period P may be referred to as a grating resolution, which may be represented by the number of grating lines per mm (lines/mm). A depth d of the SRG 211 may be defined as a depth of the grating grooves 211b or a height of the microstructures 211a. In some embodiments, the depth d of the SRG 211 may also be referred to as etch depth of the grooves 211b when the grooves 211b are formed via etching. A linewidth L of the SRG 211 may be defined as a width of a single microstructure 211a of the SRG 211. A duty cycle of the SRG 211 may be defined as a ratio between the linewidth L and the grating period P. An aspect ratio of the SRG 211 may be defined as a ratio between the depth d and the width of a grating groove 211b (the width of the grating groove 211b may be a difference between the grating period P and the linewidth L). A high aspect ratio indicates a deep grating groove. A grating profile of the SRG 211 refers to the cross-sectional shape of the grating grooves 211b or the microstructure 211a, which may be rectangular, sinusoidal, triangular, trapezoidal, or more complex shapes.

In some embodiments, the SRG 211 may be fabricated based on an organic material, such as an amorphous polymer. In some embodiments, the SRG 211 may be fabricated based on an inorganic material, such as metals or metal oxides (e.g., $Al_2O_3$) that may be used for manufacturing metasurfaces. In some embodiments, the material of the SRG 211 may be optically isotropic, and the SRG 211 may function as an optically isotropic grating. In some embodiments, the material of the SRG 211 may be optically anisotropic, and the SRG 211 may function as an optically anisotropic grating. For illustrative purposes, FIG. 2B shows the SRG 211 as a binary non-slanted grating with a periodic rectangular profile. That is, the grating profile of the SRG 211 shown in FIG. 2B may be rectangular. In some embodiments, the grating profile of the SRG 211 may be symmetric and non-rectangular, for example, sinusoidal, triangular, or trapezoidal, etc. In some embodiments, the SRG 211 may be a binary slanted grating in which the microstructures 211a are slanted.

In some embodiments, through configuring the parameters of the SRG 211, such as the grating profile, the duty cycle, the depth or etch depth, and/or the refractive index, etc., the SRG 211 may be configured to diffract an input beam that is at least partially polarized, similar to a conventional polarization selective grating operating at the Littrow configuration. In some embodiments, when the SRG 211 operates at the Littrow configuration for an incident beam S228 with an incidence angle $\theta_I$ and a wavelength $\lambda$, the +1st order diffracted beam may be reflected in the reverse direction of the incident beam S228, and the $0^{th}$ order diffracted beam S233 and the $-1^{st}$ order diffracted beam S232 may be transmitted through as linearly polarized beams. In some embodiments, the $0^{th}$ order diffracted beam S233 and the $-1^{st}$ order diffracted beam S232 may be linearly polarized beams with orthogonal polarizations. In some embodiments, the $0^{th}$ order diffracted beam S233 and the $-1^{st}$ order diffracted beam S232 may be linearly polarized beams with a substantially same polarization. The $0^{th}$ order diffracted beam S233 may be referred to as a reference beam, which may not carry, or may carry an insignificant amount of optical properties of the SRG 211 (i.e., the mask). The $-1^{st}$ order diffracted beam S232 may be referred to as a signal beam, which may carry the optical information of the SRG 211.

In some embodiments, when the SRG 211 operates at the Littrow configuration for the incident beam S228 with the incidence angle $\theta_I$ and the wavelength $\lambda$, a diffraction angle $\theta_{-1D}$ of the $-1^{st}$ order diffracted beam S232 may have a substantially same value as that of the incidence angle $\theta_I$ of the incident beam S228 and a sign opposite to that of the incidence angle $\theta_I$, i.e., $\theta_{-1D}=-\theta_I$. The diffraction angles of the $0^{th}$ order diffracted beam S233 and the $-1^{st}$ order diffracted beam S232 may have a substantially equal value and opposite signs. The diffraction angle $\theta_{OD}$ of the $0^{th}$ order diffracted beam S233 may be substantially equal to the incidence angle $\theta_I$ of the incident beam S228, i.e., $\theta_{OD}=\theta_I$. The grating equation for the Bragg or Littrow configuration may be expressed as $\lambda=2P\cdot\sin(\theta_{OD})$. An angle formed between the $0^{th}$ order diffracted beam S233 and the $-1^{st}$ order diffracted beam S232 may have a value that is twice the value of the incidence angle $\theta_I$ of the incident beam S228. When the incidence angle $\theta_I$ of the incident beam S228 is presumed to be $\theta$, the diffraction angles of the $0^{th}$ order diffracted beam S233 and the $-1^{st}$ order diffracted beam S232 may be $+\theta$ and $-\theta$, respectively. The angle formed between the $0^{th}$ order diffracted beam S233 and the $-1^{st}$ order diffracted beam S232 may be 20. In some embodiments, the SRG 211 may forwardly diffract the incident beam S228 as the $0^{th}$ order diffracted beam S233 and the $-1^{st}$ order diffracted beam S232 at a substantially same diffraction efficiency (or a substantially equal light intensity). In some embodiments, the SRG 211 may forwardly diffract the incident beam S228 as the $0^{th}$ order diffracted beam S233 and the $-1^{st}$ order diffracted beam S232 at different diffraction efficiencies (or different light intensities).

In some embodiments, when the wavelength λ of the incident beam S228 and the period P of the SRG 211 satisfy the following relationship, $\frac{2}{3} \leq \lambda/P \leq 2$, only the $0^{th}$ order diffracted beam S233 and the $-1^{st}$ order diffracted beam S232 may be transmitted, and the SRG 211 may exhibit no other diffraction orders than the $0^{th}$ order diffracted beam S233 and the $-1^{st}$ order diffracted beam S232, or the other diffraction orders are negligible. Compared to a conventional polarization selective grating that operates at the Littrow configuration to diffract an input beam as two diffracted beams with different polarizations, the SRG 211 may have a higher damage threshold, and a higher diffraction efficiency at a short grating period (e.g., 300 nm~500 nm).

The waveplate 213 may be configured to receive the $0^{th}$ order diffracted beam S233 and the −1st order diffracted beam S232 from the SRG 211. The waveplate 213 may be configured to convert the $0^{th}$ order diffracted beam S233 and the $-1^{st}$ order diffracted beam S232 into two circularly polarized beams S235 and S234 with opposite handednesses. For example, the waveplate 213 may be configured to covert the $0^{th}$ order diffracted beam S233 into the circularly polarized beam S235, which is a right-handed circularly polarized ("RHCP") beam or a left-handed circularly polarized ("LHCP") beam. The waveplate 213 may be configured to covert the $-1^{st}$ order diffracted beam S232 into the circularly polarized beam S234, which may be an LHCP beam or an RHCP beam. In some embodiments, the circularly polarized beams S235 and S234 may have a substantially equal amount of energy (or a substantially same light intensity). In some embodiments, the circularly polarized beams S235 and S234 may have different amounts of energy (or different light intensities). An angle formed between the circularly polarized beams S235 and S234 may be substantially equal to the angle formed between the $0^{th}$ order diffracted beam S233 and the $-1^{st}$ order diffracted beam S232. That is, the angle formed between the circularly polarized beams S235 and S234 may have a value of 2θ (twice of the incidence angle of the incident beam S228).

In some embodiments, the waveplate 213 may function as a quarter-wave plate ("QWP") for the $0^{th}$ order diffracted beam S233 and the −1st order diffracted beam S232 with the wavelength λ. The waveplate 213 may include a polarization axis, which may be oriented relative to the polarization directions of the $0^{th}$ order diffracted beam S233 and the $-1^{st}$ order diffracted beam S232 to covert the $0^{th}$ order diffracted beam S233 and the $-1^{st}$ order diffracted beam S232 into the circularly polarized beams S235 and S234 with opposite handednesses. In some embodiments, for an achromatic design, the waveplate 213 may include a multi-layer birefringent material (e.g., a polymer or liquid crystals) configured to produce a quarter-wave birefringence across a wide spectral range (or wavelength range). In some embodiments, for a monochrome design, an angle between the polarization axis (e.g., fast axis) of the waveplate 213 and the polarization direction of one of the $0^{th}$ order diffracted beam S233 and the $-1^{st}$ order diffracted beam S232 may be about 45°, and an angle between the polarization axis (e.g., fast axis) of the waveplate 213 and the polarization direction of the other one of the $0^{th}$ order diffracted beam S233 and the $-1^{st}$ order diffracted beam S232 may be about −45°.

In some embodiments, the relative orientation between the polarization axis (e.g., fast axis) of the waveplate 213 and the polarization direction of one of the $0^{th}$ order diffracted beam S233 and the $-1^{st}$ order diffracted beam S232 may be adjustable. For example, the relative orientation may be adjusted through rotating a rotation stage to which the waveplate 213 is mounted. For example, in some embodiments, the angle formed between the polarization axis (e.g., fast axis) of the waveplate 213 and the polarization direction of the $0^{th}$ order diffracted beam S233 may be about 45°, and the angle formed between the polarization axis (e.g., fast axis) of the waveplate 213 and the $-1^{st}$ order diffracted beam S232 may be about −45°. Accordingly, the waveplate 213 may be configured to covert the $0^{th}$ order diffracted beam S233 into the circularly polarized beam S235 (which may be an RHCP beam), and covert the $-1^{st}$ order diffracted beam S232 into the circularly polarized beam S234 (which may be an LHCP beam). In some embodiments, the angle formed between the polarization axis (e.g., fast axis) of the waveplate 213 and the polarization direction of the $0^{th}$ order diffracted beam S233 may be about −45°, and the angle formed between the polarization axis (e.g., fast axis) of the waveplate 213 and the $-1^{st}$ order diffracted beam S232 may be about 45°. Accordingly, the waveplate 213 may be configured to covert the $0^{th}$ order diffracted beam S233 into the circularly polarized beam S235 (which may be an LHCP beam), and covert the $-1^{st}$ order diffracted beam S232 into the circularly polarized beam S234 (which may be an RHCP beam).

The two circularly polarized beams S235 and S234 with opposite handednesses may interfere with each other to generate a polarization interference pattern, to which the recording medium layer 210 may be exposed. The superposition of the two circularly polarized beams S235 and S234 may result in a superposed wave that has a substantially uniform intensity and a linear polarization with a spatially periodically varying orientation (or a spatially periodically varying linear polarization orientation angle). That is, the superposition of the two circularly polarized beams S235 and S234 may result in a polarization interference pattern, which is a pattern of the spatially periodically varying orientation of the linear polarization of the superposed wave. The pattern of the spatially periodically varying orientation of the linear polarization may define a grating pattern for a polarization selective grating, such as that shown in FIG. 1B or FIG. 1C. An in-plane pitch (or grating period) $P_{R\text{-}in}$ of the grating pattern may be determined, in part, by the angle (e.g., 2θ) formed between the two circularly polarized beams S235 and S234 and the wavelength λ of the two circularly polarized beams S235 and S234 (which is also the wavelength λ of the incident beam S228).

The recording medium layer 210 may be disposed at the substrate 205. The substrate 205 may provide support and protection to various layers, films, and/or structures formed thereon. The recording medium layer 210 may include a polarization sensitive recording medium. For example, the recording medium layer 210 may include an optically recordable and polarization sensitive material (e.g., a photo-alignment material) configured to have a photo-induced optical anisotropy when exposed to a polarized light irradiation. Molecules (or fragments) and/or photo-products of the optically recordable and polarization sensitive material may be configured to generate an orientational ordering under a polarized light irradiation. In the disclosed embodiments, when exposed to the polarization interference pattern formed based on the interference of the two circularly polarized beams S235 and S234 with opposite handednesses, the recording medium layer 210 may be optically patterned with an orientation pattern of an optic axis of the recording medium layer 210. The orientation pattern of the optic axis of the recording medium layer 210 may define a grating pattern.

In some embodiments, the substrate 205 on which the recording medium layer 210 is disposed may be mounted on a second movable stage 219. The second movable stage 219 may be translatable and/or rotatable, thereby translating the substrate 205 (on which the recording medium layer 210 is disposed) in one or more directions (e.g., in the x-axis direction, y-axis direction, and/or z-axis direction), and/or rotating the substrate 205 around one or more rotation axes (e.g., the yaw, roll, and/or pitch axes defined locally with respect to the second movable stage 219. In some embodiments, the controller 217 may be communicatively coupled with the second movable stage 219, and may control the operations and/or movements of the second movable stage 219.

Referring to FIGS. 2A and 2B, in some embodiments, the relative position (e.g., distance) between the first lens 203a and the light source 201, the relative position (e.g., distance) between the first lens 203a and the pinhole aperture 203c, the relative position (e.g., distance) between the pinhole aperture 203c and the second lens 203b, and/or the relative position (e.g., distance) between the first lens 203a and the second lens 203b may be adjustable. For example, the first lens 203a, the pinhole aperture 203c, and/or the second lens 203b may be mounted at respective movable mechanisms. The movable mechanisms may be configured to translate the respectively mounted elements in a predetermined direction (e.g., an x-axis direction in FIG. 2A). The beam size of the collimated beam S226 may be adjustable through adjusting at least one of the relative positions (e.g., distances) among the light source 201, the first lens 203a, the pinhole aperture 203c, and the second lens 203b. In some embodiments, the controller 217 may be communicatively coupled with the respective movable mechanisms, and may control the operations and/or movements of the respective movable mechanisms.

In some embodiments, the beam size of the collimated beam S226 may be configured to be slightly larger than or substantially equal to an aperture size of the recording medium layer 210. In some embodiments, the aperture size of the recording medium layer 210 may be substantially the same as a size of a region of the recording medium layer 210 to be exposed during an exposure (e.g., a single exposure). For example, the size of the region of the recording medium layer 210 to be exposed during an exposure may be substantially the same as a size of a grating pattern to be recorded in the recording medium layer 210 during the exposure. In some embodiments, the aperture size and aperture shape of the recording medium layer 210 may be adjustable through an adjustable iris diaphragm 225 disposed between the recording medium layer 210 and the waveplate 213. The adjustable iris diaphragm 225 may be coupled to a suitable driving element, and may be adjusted manually or automatically through the control of the controller 217 to change the aperture size and/or aperture shape.

Figure 2C:
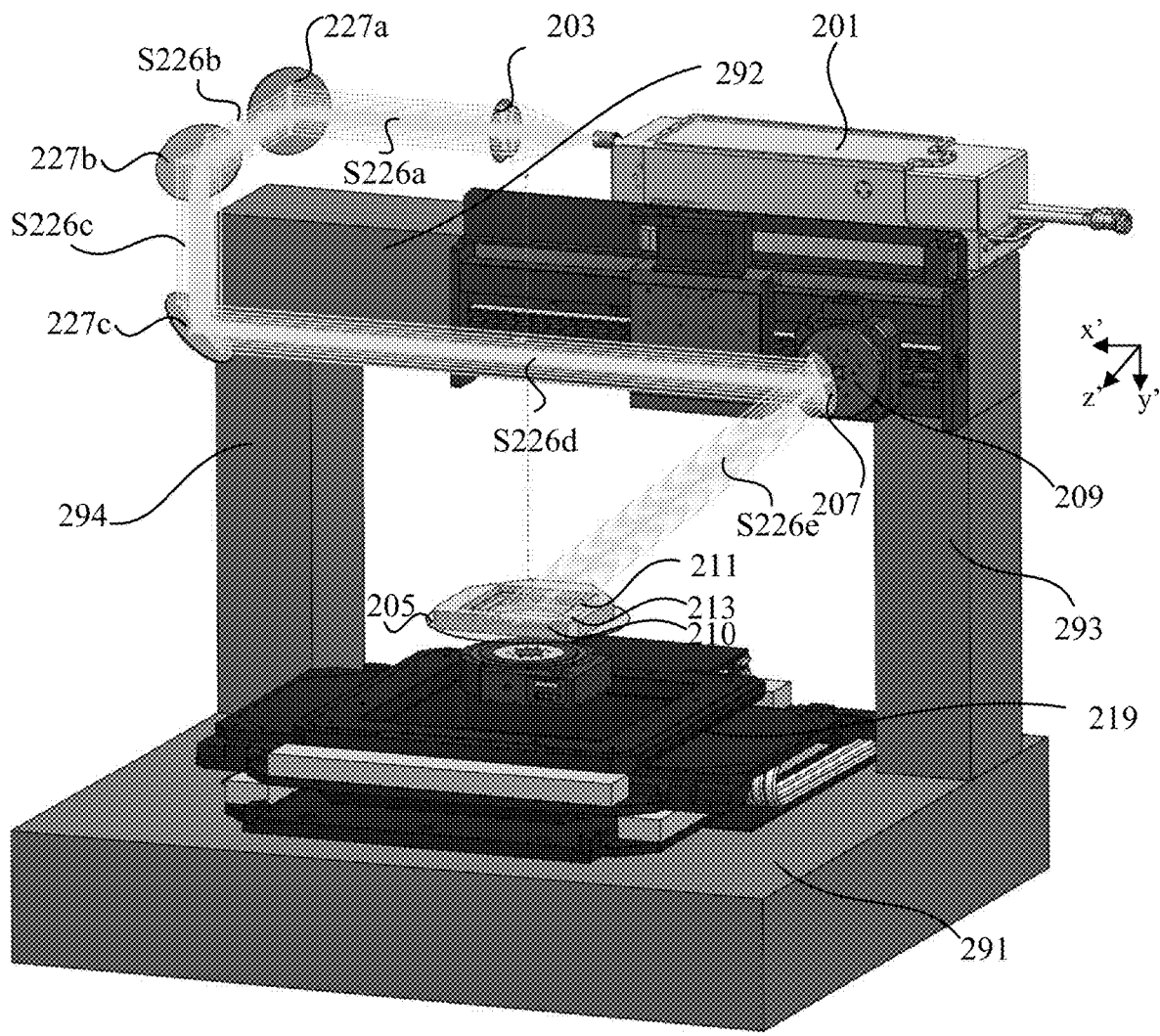
FIG. 2C schematically illustrates a three-dimensional ("3D") perspective view of a system for generating a polarization interference, according to another embodiment of the present disclosure.
Figure 2D:
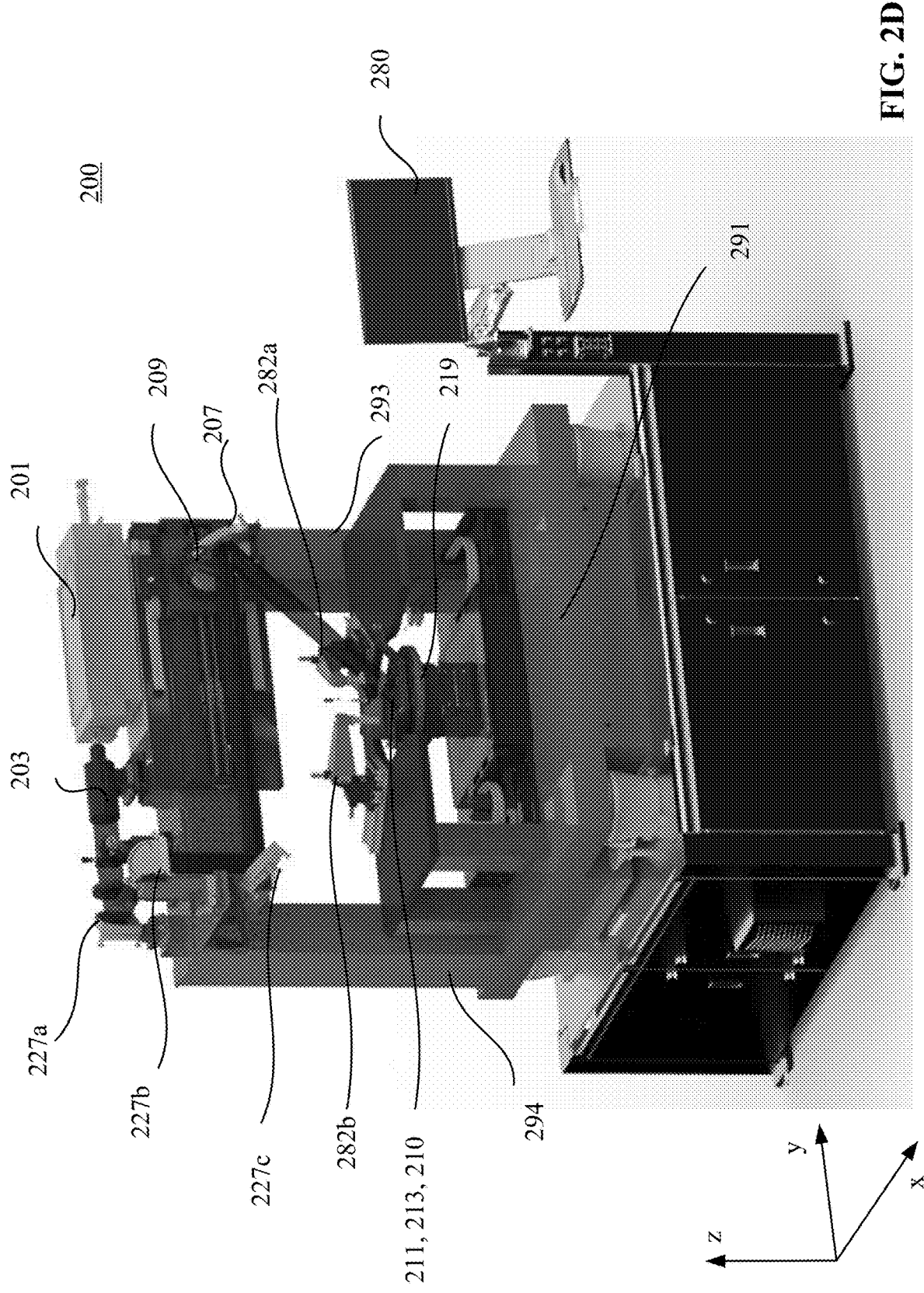
FIG. 2D schematically illustrates another 3D perspective view of the system shown in FIG. 2C with additional elements, according to another embodiment of the present disclosure.

FIGS. 2C and 2D schematically illustrate a 3D perspective view of the system 200 configured to generate a polarization interference pattern and record the polarization interference pattern in the recording medium layer 210. As shown in FIGS. 2C and 2D, the system 200 may include a base 291 and a bridge 292 mounted to the base 291 through two supporting columns 293 and 294. The light source 201, the beam conditioning device 203, the reflector (e.g., mirror) 207, and the first movable stage 209 on which the reflector (e.g., mirror) 207 is mounted, may be mounted on the bridge 292. The second movable stage 219, on which the SRG 211, the waveplate 213, the recording medium layer 210, and the substrate 205 are mounted, may be mounted on the base 291. It is understood that some elements shown in FIG. 2A, such as the detailed structure of the light conditioning device 203 and the controller 217, are not shown in FIGS. 2C and 2D. FIGS. 2C and 2D show that the system 200 may include one or more additional reflectors (e.g., mirrors), such as three reflectors 227a, 227b, and 227c. The one or more additional reflectors may be mounted on the bridge 292 and/or the supporting column 294. The one or more additional reflectors may be disposed between the beam conditioning device 203 and the reflector (e.g., mirror) 207 along a light propagation path. The combination of the reflectors 227a, 227b, and 227c may be configured to direct a collimated beam S226a output from the beam conditioning device 203 toward the reflector (e.g., mirror) 207 through a multi-fold or multi-turn light path defined by the reflectors 227a, 227b, and 227c. For example, as shown in FIGS. 2C and 2D, the reflector 227a may be configured to reflect the collimated beam S226a propagating in a first direction (e.g., −x-axis direction in FIG. 2C) as a collimated beam S226b propagating in a second direction (e.g., −y-axis direction in FIG. 2C). The reflector 227b may reflect the collimated beam S226b propagating in the second direction (e.g., −y-axis direction) as a collimated beam S226c propagating in a third direction (e.g., −z-axis direction). The reflector 227c may reflect the collimated beam S226c propagating in the third direction (e.g., −z-axis direction) as a collimated beam S226d propagating in a fourth direction (e.g., x-axis direction) toward the reflector (e.g., mirror) 207. The reflector 207 may reflect the collimated beam S226d as a collimated beam S226e toward the SRG 211 mounted on the second movable stage 219. The combination of the reflectors 227a, 227b, and 227c enables a compact design for the entire system 200. In some embodiments, the polarization state of the S226d may be the same as the polarization state of the collimated beam S226a. The reflector 207 may reflect the collimated beam S226d as a collimated beam S226e. The beam S226e may represent the beam S228 shown in FIGS. 2A and 2B, which is incident onto the SRG 211.

The first movable stage 209 may be translatable along the length direction (or the x'-axis direction) of the bridge 292, the height direction (or the y'-axis direction) of the bridge 292, and/or a direction (or the z'-axis direction) perpendicular to the plane defined by the length direction and the width direction. For example, the first movable stage 209 may include at least one of an x'-axis linear stage movable in the x'-axis direction, a y'-axis linear stage movable in the y'-axis direction, or a z'-axis linear stage movable in the z'-axis direction. In some embodiments, the first movable stage 209 may be rotatable around at least one of a yaw axis, a roll axis, or a pitch axis defined on the first movable stage 209. The translation and/or rotation of the first movable stage 209 may change the incidence angle of the beam S226e, and/or the portion of the SRG 211 which the beam S226e illuminates. When the portion of the SRG 211 which the beam S226e illuminates changes, the portion of the recording medium layer 210 that is exposed to the polarization interference pattern generated based on the beams output from the SRG 211 may also change.

The second movable stage 219 may be translatable and/or rotatable. For example, the second movable stage 219 may include at least one of an a-axis linear stage movable in the x-axis direction, a y-axis linear stage movable in the y-axis direction, or an z-axis stage movable in the z-axis direction. In some embodiments, the second movable stage 219 may be rotatable around at least one of a yaw axis, a roll axis, or a pitch axis defined on the second movable stage 219, such as on a portion of the second movable stage 219 on which the substrate 205 (or the recording medium layer 210) is mounted. When the second movable stage 219 is translated in the x-axis, y-axis, and/or z-axis directions, and/or rotated in the yaw axis, roll axis, and/or pitch axis directions, the relative position and/or relative orientation of the recording medium layer 210 (or the SRG 211) with respect to the beam S226e may change.

FIG. 2D shows that the system 200 may include tele-centric vision cameras 282a and 282b configured for aligning the SRG 211, the waveplate 213, the recording medium layer 210, and/or the substrate 205. The tele-centric vision cameras 282a and 282b may be mounted on suitable mounting and/or supporting devices. The example mounting and/or supporting devices on which the vision cameras 282a and 282b are mounted are for illustrative purposes only. FIG. 2D also shows a terminal device 280 configured for receiving input from an operator for controlling the system 200. The terminal device 280 may include a screen and/or an input/output device such as a keyboard, a mouse, etc. The terminal device 280 may include the controller 217 or may be connected with the controller 217 through a network connection, such as a wired or wireless connection.

Referring to FIGS. 2A-2D, in the system 200 for generating a polarization interference pattern and for recording the polarization interference pattern in the recording medium layer 210, the same polarization interference pattern or different polarization interference patterns may be recorded in different regions or portions of the recording medium layer 210 through multiple exposures. In some embodiments, the same polarization interference pattern may be recorded at different portions of the recording medium layer 210. In some embodiments, different polarization interference patterns may be recorded at different portions of the recording medium layer 210. For example, between two exposures, the recording portions may be changed by changing the position and/or the orientation of the recording medium layer 210 relative to the beam S226e. For example, the second movable stage 219 may be controlled by the controller 217 to translate and/or rotate to change the position and/or the orientation of the recording medium layer 210 relative to the beam S226e.

In some embodiments, between two exposures, the polarization interference pattern may be changed. In some embodiments, changing the polarization interference pattern may include changing the SRG 211 from a first SRG to a second, different SRG. In some embodiments, changing the polarization interference pattern may include changing the wavelength of the beam S226e. For example, the light source 201 may be changed or controlled to emit a beam of a different wavelength. In some embodiments, changing the polarization interference pattern may include changing the incidence angle of the beam S226e onto the SRG 211. For example, the incidence angle of the beam S226e onto the SRG 211 may be changeable through changing the relative positions and/or relative orientations between the recording medium layer 210 and the beam S226e reflected by the reflector 207 and incident onto the SRG 211.

In some embodiments, the first movable stage 209 on which the reflector 207 is mounted, may be controlled by the controller 217 to translate and/or rotate to change the orientation of the beam S226e relative to the recording medium layer 210. In some embodiments, the second movable stage 219 may be controlled by the controller 217 to translate and/or rotate to change the orientation of the recording medium layer 210 relative to the beam S226e.

In some embodiments, changing the polarization interference pattern may include changing a beam size of S226e. For example, the controller 217 may control a moving mechanism (not shown), on which the first lens 203a, the pinhole aperture 203c, and the second lens 203b are mounted, to adjust the relative position (e.g., distance) between the first lens 203a and the light source 201, the relative position (e.g., distance) between the first lens 203a and the pinhole aperture 203c, the relative position (e.g., distance) between the pinhole aperture 203c and the second lens 203b, and/or the relative position (e.g., distance) between the first lens 203a and the second lens 203b, and/or control the size of the pinhole aperture 203c to change the beam size of the collimated beam S226a. Accordingly, the beam size of S226e may be changeable.

In some embodiments, the controller 217 may control an adjustment mechanism coupled with the iris diaphragm 225 to adjust the opening area of the iris diaphragm 225, thereby adjusting a size and/or a shape of the polarization interference pattern that is recorded into the recording medium layer 210. In some embodiments, changing the polarization interference pattern may include changing a gap between the SRG 211 and the waveplate 213. In some embodiments, increasing the gap may reduce the size of the polarization interference pattern that is recorded into the recording medium layer 210.

In some embodiments, an orientation of the polarization interference pattern relative to the recording medium layer 210 may be changeable through changing the relative orientation between the recording medium layer 210 and the beam S226e. For example, the second movable stage 219 may be controlled by the controller 217 to rotate (e.g., around the z-axis) to change the relative orientation between the recording medium layer 210 and the beam S226e. Each polarization interference pattern (or pattern of the spatially varying orientation of the linear polarization) may define an orientation pattern of the optic axis of the recording medium layer 210 in the respective recording region/portion. Different orientation patterns of the optic axis of the recording medium layer 210 in different regions/portions may correspond to grating patterns with different sizes, periods, orientations, positions, and/or shapes. For example, the grating period of the grating pattern may be adjustable through adjusting the angle formed between the two circularly polarized beams S235 and S234 and/or the predetermined wavelength λ of the two circularly polarized beams S235 and S234. In some embodiments, the grating period of the grating pattern may be within a sub-micron range, e.g., may be within a visible wavelength range (e.g., 380 nm to 700 nm).

The orientation of the grating pattern (or grating fringes) may be adjustable through rotating the substrate 205, on which the recording medium layer 210 is disposed, around a predetermined rotation axis (e.g., the z-axis). That is, the orientation of the grating pattern (or grating fringes) may be adjustable through adjusting the rotation angle of the substrate 205 that supports the recording medium layer 210 around a predetermined axis (e.g., the z-axis). The position of the grating pattern may be adjustable through adjusting the location of the substrate 205 (and hence the location of the recording medium layer 210) with respect to the SRG 211 and the waveplate 213. In some embodiments, the size of the grating pattern may be adjustable through adjusting the relative position (e.g., distance) between the first lens 203a and the light source 201, the relative position (e.g., distance) between the first lens 203a and the pinhole aperture 203c, the relative position (e.g., distance) between the pinhole aperture 203c and the second lens 203b, and/or the relative position (e.g., distance) between the first lens 203a and the second lens 203b. In some embodiments, the size and/or the shape of the grating pattern may be adjustable through adjusting the opening area of the iris diaphragm 225.

In some embodiments, both sides of the recording medium layer 210 may be recorded with the polarization interference pattern. For example, a first side of the recording medium layer 210 may be recorded with one or more polarization interference patterns in one or more recording regions. Then the recording medium layer 210 may be flipped, and the second side of the recording medium layer 210 may be recorded with one or more polarization interference patterns in one or more recording regions. When recording different polarization interference patterns to the second side, the SRG 211 may be replaced with a different SRG, and/or the optical properties (e.g., wavelength, incidence angle, beam size, etc.) of the beam S226e may be changed.

Figure 3A:
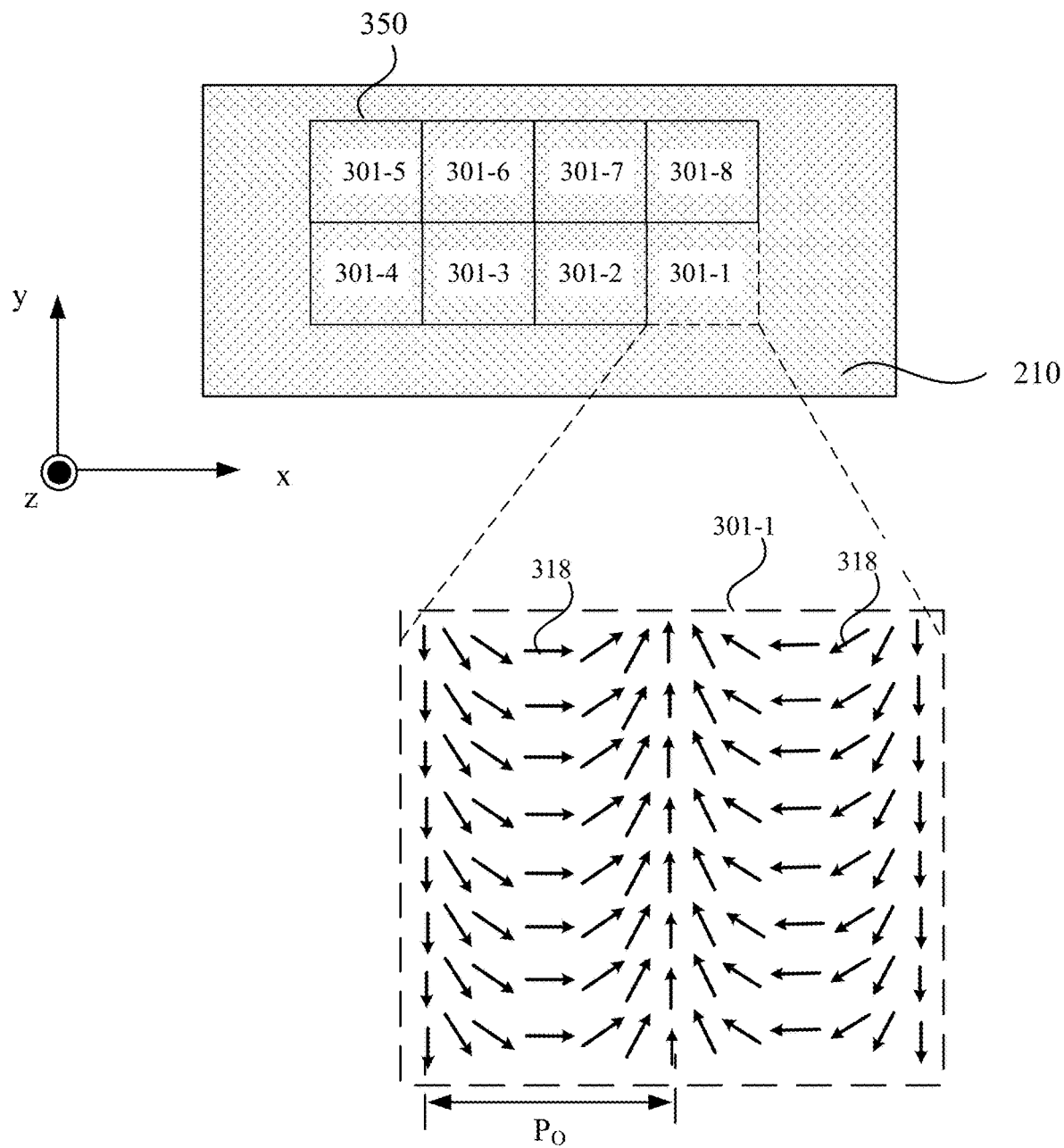
FIGS. 3A-3C schematically illustrate patterns of spatially varying orientations of a linear polarization recorded in different portions of a recording medium layer, according to various embodiments of the present disclosure.
Figure 3B:
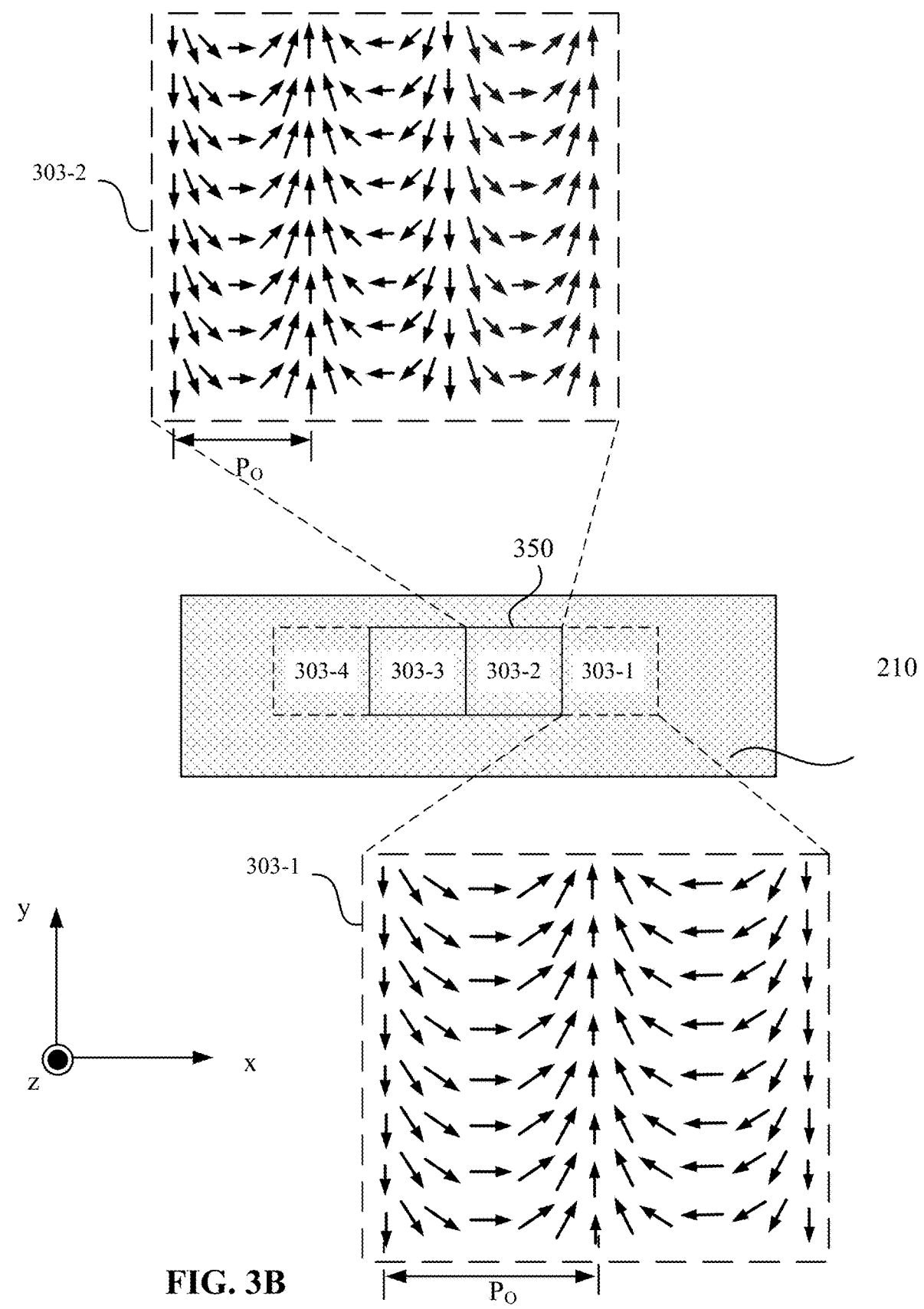
Figure 3C:
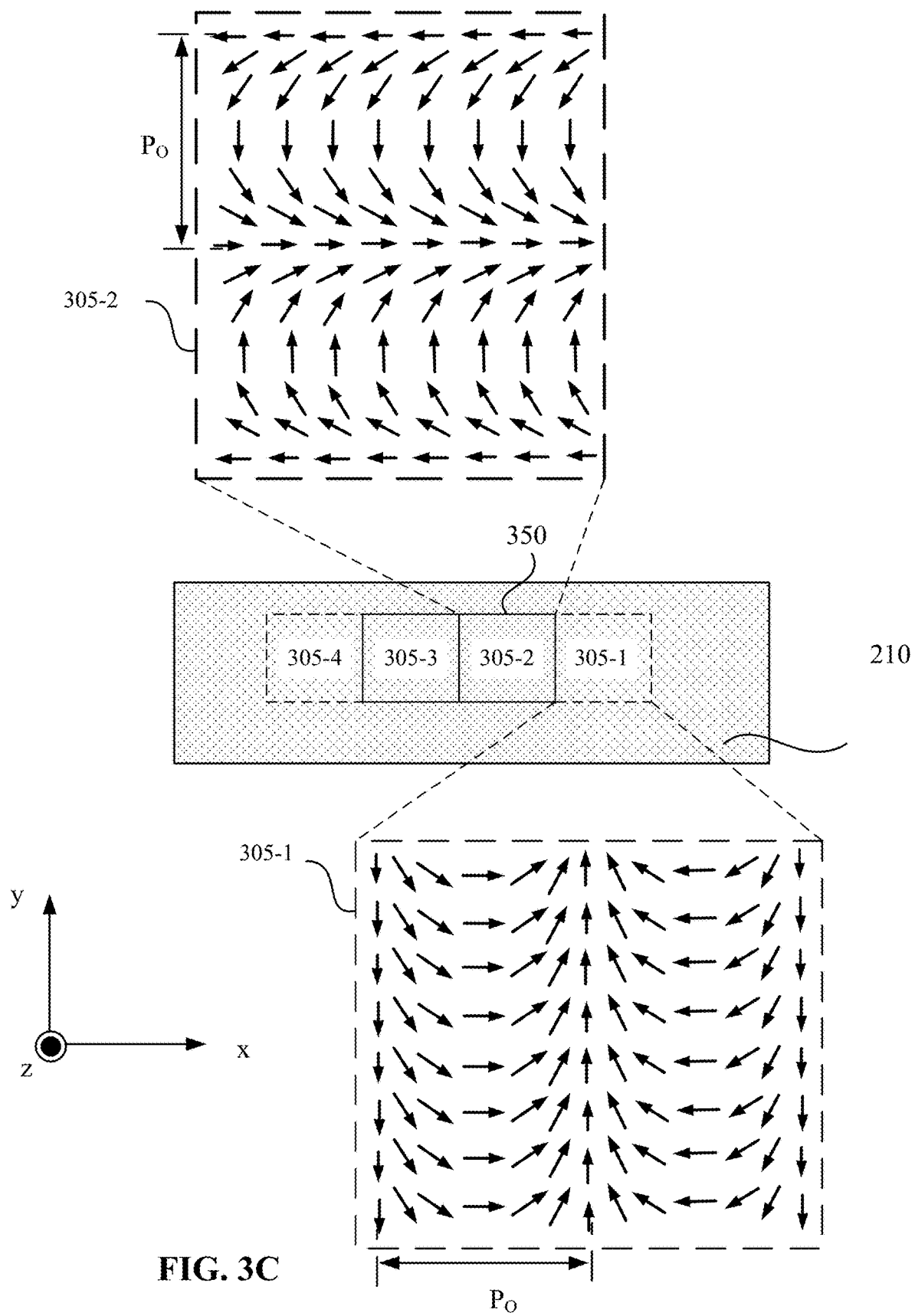

FIGS. 3A-3C schematically illustrate x-y sectional views of orientation patterns of the optic axis of the recording medium layer 210 defined in different portions of the recording medium layer 210 via the system 200 shown in FIGS. 2A, 2C, and 2D, according to various embodiments of the present disclosure. For discussion purposes, in FIGS. 3A-3C, an aperture size of the recording medium layer 210 may be substantially the same as a size of a predetermined region 350 of the recording medium layer 210 that is exposed to the polarization interference pattern during an exposure. An aperture shape of the recording medium layer 210 may be a shape of the predetermined region 350, e.g., a square shape, a rectangular shape, a circular shape, etc. For discussion purposes, FIGS. 3A-3C schematically illustrate the periodic variation of the orientations of the optic axis of the recording medium layer 210 in one or two portions of the of the recording medium layer 210. In FIGS. 3A-3C, the arrows 318 represent the optic axis and the orientations of the optic axis.

FIG. 3A shows a plurality of orientation patterns of the optic axis of the recording medium layer 210 defined in a plurality of different portions of the recording medium layer 210 through multiple exposures. The plurality of orientation patterns of the optic axis of the recording medium layer 210 in different portions of the recording medium layer 210 may correspond to a plurality of same grating patterns having the same grating period and the same grating orientation. For example, as shown in FIG. 3A, eight orientation patterns 301-1 to 301-8 of the optic axis of the recording medium layer 210 may be defined and/or recorded in eight different portions of the recording medium layer 210 through eight exposures. For different exposures, the substrate 205 on which the recording medium layer 210 is disposed may be translated by the second movable stage 219 in the x-axis direction and y-axis direction. The eight patterns 301-1 to 301-8 may be arranged in a 2D array. For illustrative purposes, FIG. 3A merely shows the periodic variation of the orientation of the optic axis in the orientation pattern 301-1. For example, the orientations of the optic axis may periodically vary in an in-plane direction, e.g., the x-axis direction. In some embodiments, a pitch $P_O$ of the orientation pattern 301-1 may be referred to as a distance in the in-plane direction, over which the orientation of the optic axis rotates by a predetermined angle (e.g., 180°). In some embodiments, the pitch $P_O$ of the orientation pattern 301-1 may correspond to the in-plane pitch $P_{in}$ of a corresponding grating pattern. The eight orientation patterns 301-1 to 301-8 may correspond to eight grating patterns have the same size, the same in-plan pitch (or grating period), and the same grating orientation.

FIG. 3B shows a plurality of orientation patterns of the optic axis of the recording medium layer 210 defined and/or recorded in a plurality of different portions of the recording medium layer 210 through multiple exposures. The plurality of orientation patterns of the optic axis defined in different portions of the recording medium layer 210 may correspond to a plurality of grating patterns having different in-plane pitches (or grating periods) and the same grating orientation. For example, as shown in FIG. 3B, four orientation patterns 303-1 to 303-4 of the optic axis of the recording medium layer 210 may be defined in four different portions of the recording medium layer 210 through four exposures. For each exposure, the substrate 205 on which the recording medium layer 210 is disposed may be translated by the second movable stage 219 in the x-axis direction. The four orientation patterns 303-1 to 303-4 may be arranged in a 1D array. At least two of the four orientation patterns 303-1 to 303-4 may have different periods $P_O$. For illustrative purposes, FIG. 3B merely shows the periodic variation of the orientations of the optic axis in the orientation pattern 303-1 and the orientation pattern 303-2. A period $P_O$ of the orientation pattern 303-1 may be different from (e.g., larger than) a period $P_O$ of the orientation pattern 303-2. Accordingly, the in-plane pitch of the grating pattern corresponding to the orientation pattern 303-1 may be different from (e.g., larger than) the in-plane pitch of the grating pattern corresponding to the orientation pattern 303-2.

FIG. 3C shows a plurality of orientation patterns of the optic axis of the recording medium layer 210 defined and/or recorded in a plurality of different portions of the recording medium layer 210 through multiple exposures. The plurality of orientation patterns of the optic axis defined in different portions (or regions) of the recording medium layer 210 may correspond to a plurality of grating patterns having different grating orientations and the same in-plane pitch (or grating period). For example, as shown in FIG. 3B, four orientation patterns 305-1 to 305-4 of the optic axis of the recording medium layer 210 may be defined in four different portions of the recording medium layer 210 through four exposures. For each exposure, the substrate 205 on which the recoding medium layer 210 is disposed may be translated by the second movable stage 219 in the x-axis direction. The four orientation patterns 305-1 to 305-4 may be arranged in a 1D array. At least two of the four orientation patterns 305-1 to 305-4 may have orientations of the optic axis periodically vary in different in-plane directions. The in-plane direction in which the orientations of the optic axis periodically vary may correspond to a grating orientation of a corresponding grating pattern. For illustrative purposes, FIG. 3C merely shows the periodic variations of the orientations of the optic axis in the orientation pattern 305-1 and the orientation pattern 305-2. For example, the orientation pattern 305-1 may have the orientation of the optic axis periodically vary in a first in-plane direction, e.g., the x-axis direction, and the orientation pattern 305-2 may have the orientation of the optic axis periodically vary in a second, different in-plane direction, e.g., the y-axis direction. Accordingly, the grating orientation of the grating pattern corresponding to the orientation pattern 305-1 may be different from the grating orientation of the grating pattern corresponding to the orientation pattern 305-2.

FIGS. 4A-4D schematically illustrate processes for fabricating a PSOE through a disclosed system, e.g., the system 200 shown in FIGS. 2A, 2C, and 2D. The fabrication process shown in FIGS. 4A-4D may include holographic recording of an alignment pattern in a photo-aligning film and alignment of an anisotropic material (e.g., an LC material) by the photo-aligning film. This alignment process may be referred to as a surface-mediated photo-alignment. In some embodiments, the PSOE fabricated based on the fabrication processes shown in FIGS. 4A-4D may be a polarization selective grating, such as a PVH grating, or a PBP grating, etc. For illustrative purposes, the substrate and different layers, films, or structures formed thereon are shown as having flat surfaces. In some embodiments, the substrate and different layers or films or structures may have curved surfaces.

Figure 4A:
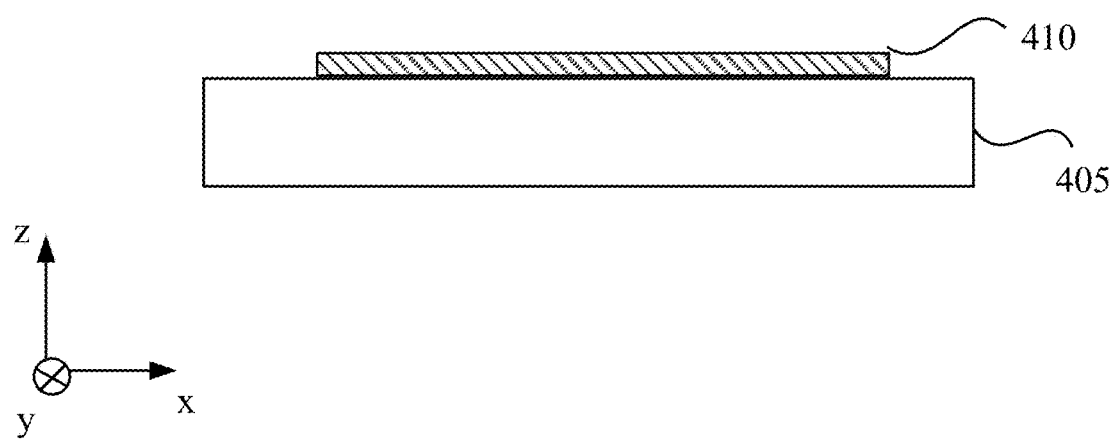
FIGS. 4A-4D schematically illustrate processes for fabricating a PSOE, according to an embodiment of the present disclosure.

As shown in FIG. 4A, a recording medium layer 410 may be formed on a surface (e.g., a top surface) of a substrate 405 by dispensing, e.g., coating or depositing, a polarization sensitive material on the surface of the substrate 405. Thus, the recording medium layer 410 may be referred to as a polarization sensitive recording medium layer. The polarization sensitive material included in the recording medium layer 410 may be an optically recordable and polarization sensitive material (e.g., a photo-alignment material) configured to have a photo-induced optical anisotropy when exposed to a polarized light irradiation. Molecules (or fragments) and/or photo-products of the optically recordable and polarization sensitive material may be configured to generate an orientational ordering under a polarized light irradiation. In some embodiments, the polarization sensitive material may be dissolved in a solvent to form a solution. The solution may be dispensed on the substrate 405 using any suitable solution coating process, e.g., spin coating, slot coating, blade coating, spray coating, or jet (ink-jet) coating or printing. The solvent may be removed from the coated solution using a suitable process, e.g., drying, or heating, leaving the polarization sensitive material on the substrate 405 to form the recording medium layer 410.

The substrate 405 may provide support and protection to various layers, films, and/or structures formed thereon. In some embodiments, the substrate 405 may be at least partially transparent in at least the visible wavelength band (e.g., about 380 nm to about 700 nm). In some embodiments, the substrate 405 may be at least partially transparent in at least a portion of the infrared ("IR") band (e.g., about 700 nm to about 4 mm). The substrate 405 may include a suitable material that is at least partially transparent to lights of the above-listed wavelength ranges, such as, a glass, a plastic, a sapphire, or a combination thereof, etc. The substrate 405 may be rigid, semi-rigid, flexible, or semi-flexible. The substrate 405 may include a flat surface or a curved surface, on which the different layers or films may be formed. In some embodiments, the substrate 405 may be a part of another optical element or device (e.g., another opto-electrical element or device). For example, the substrate 405 may be a solid optical lens, a part of a solid optical lens, or a light guide (or waveguide), etc. In some embodiments, the substrate 405 may be a part of a functional device, such as a display screen. In some embodiments, the substrate 405 may be used to fabricate, store, or transport the fabricated PSOE. In some embodiments, the substrate 405 may be detachable or removable from the fabricated PSOE after the PSOE is fabricated or transported to another place or device. That is, the substrate 405 may be used in fabrication, transportation, and/or storage to support the PSOE provided on the substrate 405, and may be separated or removed from the PSOE when the fabrication of the PSOE is completed, or when the PSOE is to be implemented in an optical device. In some embodiments, the substrate 405 may not be separated from the PSOE.

Figure 4B:
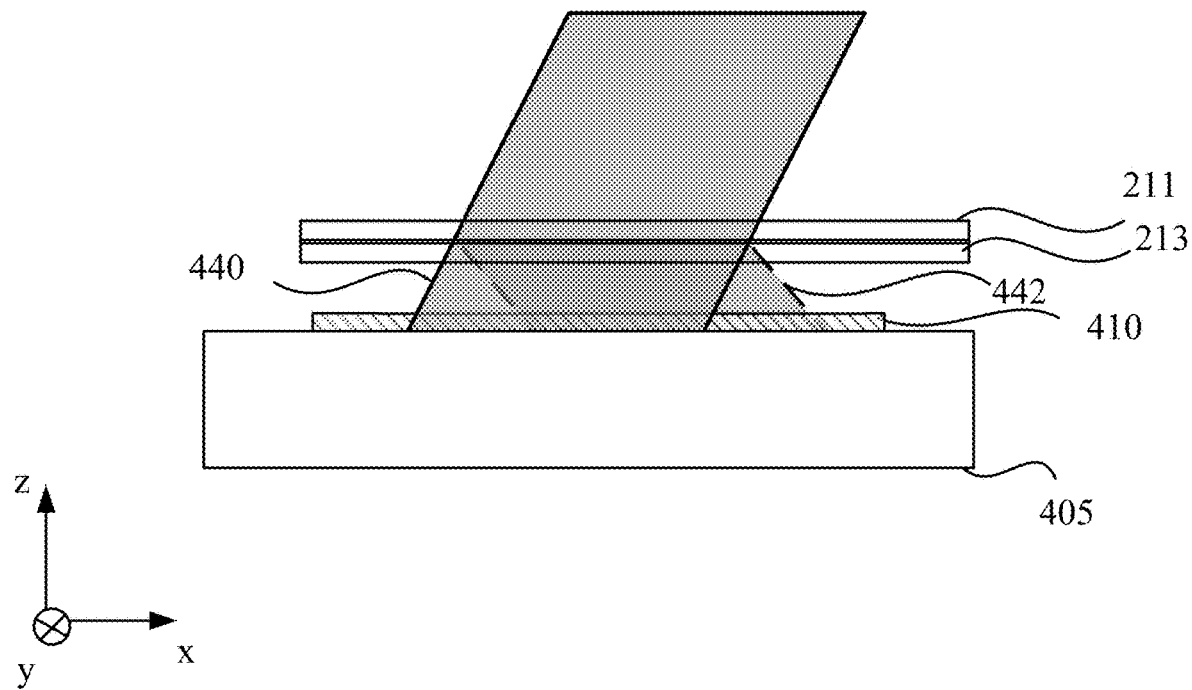

After the recording medium layer 410 is formed on the substrate 405, as shown in FIG. 4B, the recording medium layer 410 may be exposed to a polarization interference pattern generated based on two recording beams 440 and 442 (also referred to as a first recording beam 440 or a reference beam 440, and a second recording beam 442 or a signal beam 442). The two recording beams 440 and 442 may be two coherent circularly polarized beams with opposite handednesses. In some embodiments, the two recording beams 440 and 442 may represent, respectively, the beam S235 and the beam S234 output from the stack of the SRG 211 operating at the Littrow configuration and the waveplate 213 shown in FIG. 2B. The recording medium layer 410 may be optically patterned when exposed to the polarization interference pattern generated based on the two recording beams 440 and 442 during the polarization interference exposure process. An orientation pattern of an optic axis of the recording medium layer 410 in an exposed region may be defined by the polarization interference pattern under which the recording medium layer 410 is exposed during the polarization interference exposure process. In some embodiments, different regions of the recording medium layer 410 may be exposed to the same or different polarization interference patterns. The same or different orientation patterns of the optic axis of the recording medium 410 may be defined in respective exposed regions during the respective polarization interference exposure processes.

In some embodiments, the recording medium layer 410 may include elongated anisotropic photo-sensitive units (e.g., small molecules or fragments of polymeric molecules). After being subjected to a sufficient exposure of the polarization interference pattern generated based on the two recording lights 440 and 442, local alignment directions of the anisotropic photo-sensitive units may be induced in the recording medium layer 410 by the polarization interference pattern, resulting in an alignment pattern (or in-plane modulation) of an optic axis of the recording medium layer 410 due to a photo-alignment of the anisotropic photo-sensitive units. In some embodiments, the in-plane modulation of the optic axis of the recording medium layer 410 in the exposed region may correspond to a grating pattern, which may be similar to that shown in FIG. 1B or FIG. 1C. In some embodiments, multiple alignment patterns (which may be the same or different) may be recorded in different portions or regions of the recording medium layer 410 through multiple polarization interference exposure processes. The multiple alignment patterns may correspond to multiple grating patterns with the same or different sizes, shapes, grating periods, grating orientations, and/or handednesses of the in-plane modulation. In some embodiments, the handedness of the in-plane modulation (or alignment pattern) of the optic axis of the recording medium layer 410 in the exposed region may be controllable by controlling the handednesses of the recording beams 440 and 442. For example, when the recording beam 440 is an RHCP beam and the recording beam 442 is an LHCP beam, the handedness of the in-plane modulation (or alignment pattern) of the optic axis of the recording medium layer 410 in the exposed region may be right-handed. When the recording beam 440 is an LHCP beam and the recording beam 442 is an RHCP beam, the handedness of the in-plane modulation (or alignment pattern) of the optic axis of the recording medium layer 410 in the exposed region may be left-handed. After the recording medium layer 410 is optically patterned, the recording medium layer 410 may be referred to as a patterned recording medium layer with an alignment pattern.

Figure 4C:
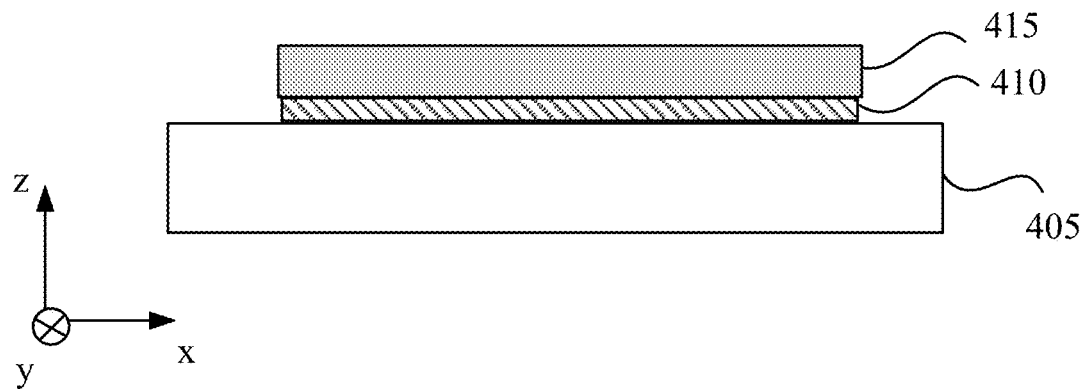

In some embodiments, as shown in FIG. 4C, a birefringent medium layer 415 may be formed on the patterned recording medium layer 410 by dispensing, e.g., coating or depositing, a birefringent medium onto the patterned recording medium layer 410. The birefringent medium may include one or more birefringent materials having an intrinsic birefringence, such as non-polymerizable LCs or polymerizable LCs (e.g., RMs). For discussion purposes, in the following descriptions, the term "liquid crystal(s)" or "LC(s)" may encompass both mesogenic and LC materials. In some embodiments, the birefringent medium may also include or be mixed with other ingredients, such as solvents, initiators (e.g., photo-initiators or thermal initiators), chiral dopants, or surfactants, etc. In some embodiments, the birefringent medium may not have an intrinsic or induced chirality. In some embodiments, the birefringent medium may have an intrinsic or induced chirality. For example, in some embodiments, the birefringent medium may include a host birefringent material and a chiral dopant doped into the host birefringent material at a predetermined concentration. The chirality may be introduced by the chiral dopant doped into the host birefringent material, e.g., chiral dopant doped into nematic LCs, or chiral reactive mesogens ("RMs") doped into achiral RMs. RMs may be also referred to as a polymerizable mesogenic or liquid-crystalline compound, or polymerizable LCs. In some embodiments, the birefringent medium may include a birefringent material having an intrinsic molecular chirality, and chiral dopants may not be doped into the birefringent material. The chirality of the birefringent medium may result from the intrinsic molecular chirality of the birefringent material. For example, the birefringent material may include chiral liquid crystal molecules, or molecules having one or more chiral functional groups. In some embodiments, the birefringent material may include twist-bend nematic LCs (or LCs in twist-bend nematic phase), in which LC directors may exhibit periodic twist and bend deformations forming a conical helix with doubly degenerate domains having opposite handednesses. The LC directors of twist-bend nematic LCs may be tilted with respect to the helical axis. Thus, the twist-bend nematic phase may be considered as the generalized case of the conventional nematic phase in which the LC directors are perpendicular to the helical axis.

In some embodiments, a birefringent medium may be dissolved in a solvent to form a solution. A suitable amount of the solution may be dispensed (e.g., coated, or sprayed, etc.) on the patterned recording medium layer 410 to form the birefringent medium layer 415. In some embodiments, the solution containing the birefringent medium may be coated on the patterned recording medium layer 410 using a suitable process, e.g., spin coating, slot coating, blade coating, spray coating, or jet (ink-jet) coating or printing. In some embodiments, the birefringent medium may be heated to remove the remaining solvent. This process may be referred to as a pre-exposure heating. The patterned recording medium layer 410 may be configured to provide a surface alignment (e.g., planar alignment, or homeotropic alignment, etc.) to optically anisotropic molecules (e.g., LC molecules, RM molecules, etc.) in the birefringent medium. For example, the patterned recording medium layer 410 may at least partially align the LC molecules or RM molecules in the birefringent medium that are in contact with the patterned recording medium layer 410 in the grating pattern. In other words, the LC molecules or RM molecules in the birefringent medium may be at least partially aligned along the local alignment directions of the anisotropic photo-sensitive units in the patterned recording medium layer 410 to form the grating pattern. Thus, the grating pattern recorded in the patterned recording medium layer 410 (or the in-plane orientation pattern of the optic axis of the recording medium layer 410) may be transferred to the birefringent medium, and hence to the birefringent medium layer 415. That is, the patterned recording medium layer 410 may function as a photo-alignment material ("PAM") layer for the LCs or RMs in the birefringent medium. Such an alignment procedure may be referred to as a surface-mediated photo-alignment.

In some embodiments, after the LCs or RMs in the birefringent medium are aligned by the patterned recording medium layer 410, the birefringent medium may be heat treated (e.g., annealed) in a temperature range corresponding to a nematic phase of the LCs or RMs in birefringent medium to enhance the alignments (or orientation pattern) of the LCs and/or RMs (not shown in FIG. 4C). This process may be referred to as a post-exposure heat treatment (e.g., annealing). In some embodiments, the process of heat treating (e.g., annealing) the birefringent medium may be omitted.

Figure 4D:
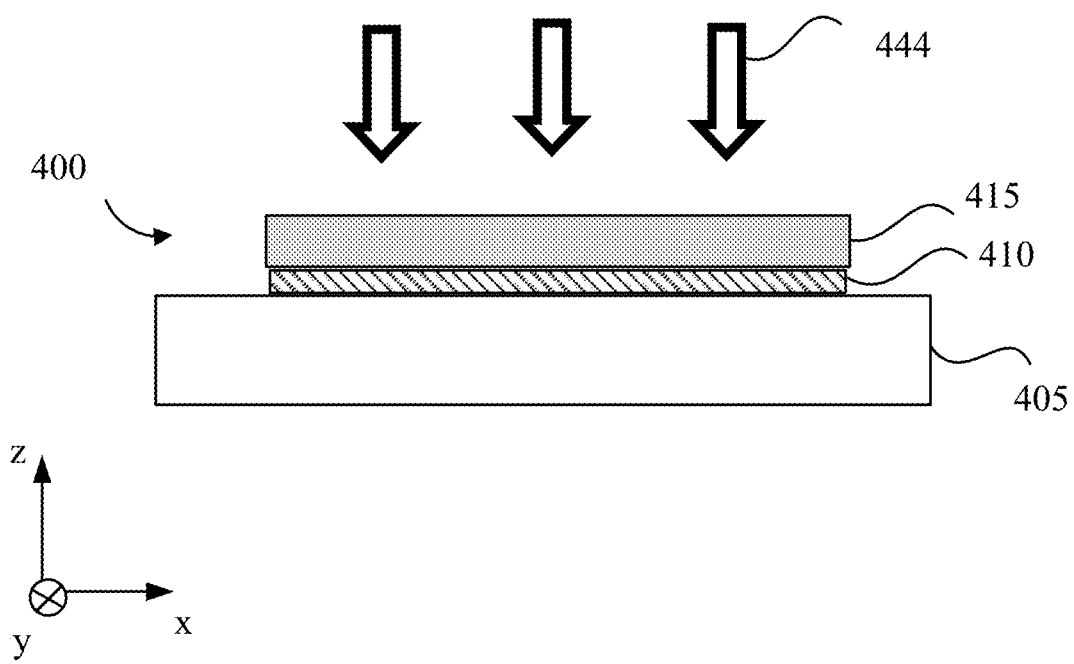

In some embodiments, when the birefringent medium includes polymerizable LCs (e.g., RMs), after the RMs are aligned by the patterned recording medium layer 410, the RMs may be polymerized, e.g., thermally polymerized or photo-polymerized, to solidify and stabilize the orientational pattern of the optic axis of the birefringent medium, thereby forming the birefringent medium layer 415. In some embodiments, as shown in FIG. 4D, the birefringent medium may be irradiated with, e.g., a UV light 444. Under a sufficient UV light irradiation, the birefringent medium may be polymerized to stabilize the orientational pattern of the optic axis of the birefringent medium. In some embodiments, the polymerization of the birefringent medium under the UV light irradiation may be carried out in air, in an inert atmosphere formed, for example, by nitrogen, argon, carbon-dioxide, or in vacuum. Thus, a polarization selective grating 400 may be obtained based on the polarization interference exposure process and surface-mediated photo-alignment. In some embodiments, the process of thermo- or photo-polymerization of the birefringent medium may be omitted. In some embodiments, the polarization selective grating 400 fabricated based on the fabrication processes shown in FIGS. 4A-4D may be a passive polarization selective grating, such as a passive PBP grating or a passive PVH grating.

In some embodiments, as shown in FIG. 4D, the substrate 405 and/or the recording medium layer 410 may be used to fabricate, store, or transport the polarization selective grating 400. In some embodiments, the substrate 405 and/or the recording medium layer 410 may be detachable or removable from other portions of the polarization selective grating 400 after the other portions of the polarization selective grating 400 are fabricated or transported to another place or device. That is, the substrate 405 and/or the patterned recording medium layer 410 may be used in fabrication, transportation, and/or storage to support the birefringent medium layer 415, and may be separated or removed from the birefringent medium layer 415 when the fabrication of the polarization selective grating 400 is completed, or when the polarization selective grating 400 is to be implemented in an optical device. In some embodiments, the substrate 405 and/or the recording medium layer 410 may not be separated from the polarization selective grating 400.

Figure 5A:
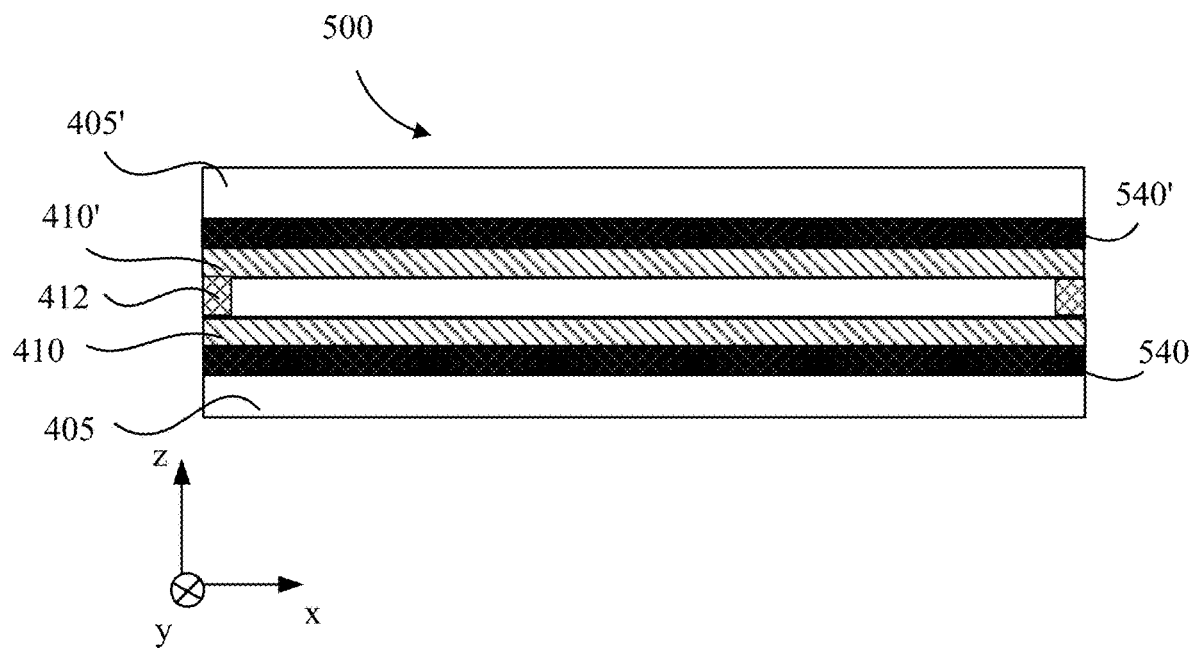
FIGS. 5A and 5B schematically illustrate processes for fabricating a PSOE and a fabricated PSOE, according to an embodiment of the present disclosure.
Figure 5B:
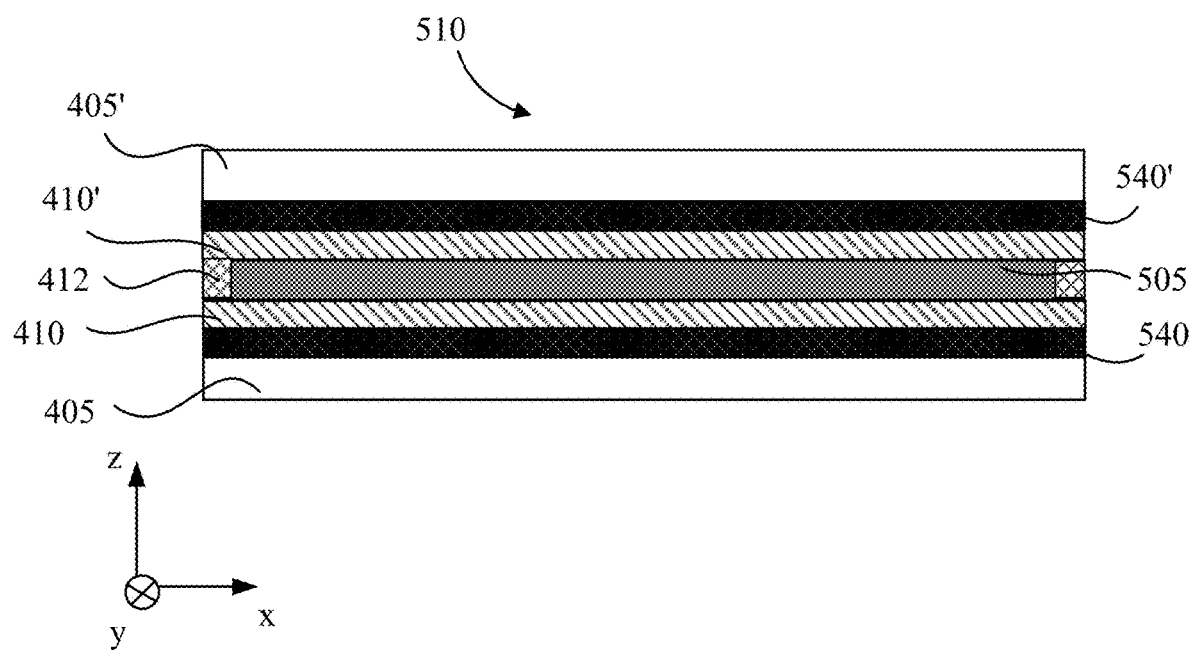

FIGS. 5A and 5B schematically illustrate processes for fabricating a PSOE, according to another embodiment of the present disclosure. The fabrication processes shown in FIGS. 5A and 5B may include steps or processes similar to those shown in FIGS. 4A-4D. The PSOE fabricated based on the processes shown in FIGS. 5A and 5B may include elements similar to those included in the PSOE fabricated based on the processes shown in FIGS. 4A-4D. Descriptions of the similar steps and similar elements can refer to the descriptions rendered above in connection with FIGS. 4A-4D. The PSOE fabricated based on the fabrication processes shown in FIGS. 5A and 5B may be an active PSOE, such as an active PBP grating or an active PVH grating, etc. Although the substrate and layers are shown as having flat surfaces, in some embodiments, the substrate and layers formed thereon may have curved surfaces.

As shown in FIG. 5A, two substrates 405 and 405' (referred to as a first substrate 405 and a second substrate 405') may be assembled to form an LC cell 500. For example, the two substrates 405 and 405' may be bonded to each other via an adhesive 412 (e.g., optical adhesive 412) to form the LC cell 500. At least one (e.g., each) of the two substrates 405 and 405' may be provided with one or more conductive electrode layers and a patterned recording medium layer. For example, two conductive electrode layers 540 and 540' may be formed at opposing surfaces of the substrates 405 and 405', and two patterned recording medium layer 410 and 410' may be formed on opposing surfaces of the two conductive electrode layers 540 and 540'. The patterned recording medium layers 410 and 410' may be fabricated at the opposing surfaces of the conductive electrode layers 540 and 540' following steps or processes similar to those shown in FIGS. 4A and 4B. The conductive electrode layer 540 or 540' may be transmissive and/or reflective at least in the same spectrum band as the substrate 405 or 405'. The conductive electrode layer 540 or 540' may be a planar continuous electrode layer or a patterned electrode layer. As shown in FIG. 5A, a gap or space may exist between the patterned recording medium layers 410 and 410'.

After the LC cell 500 is assembled, as shown in FIG. 5B, active LCs that are reorientable by an external field, e.g., an electric field, may be filled into the space formed between the patterned recording medium layers 410 and 410' within the LC cell 500 to form an active LC layer 505. The patterned recording medium layer 410 or 410' may function as a PAM layer for the active LCs filled into the LC cell 500, such that the active LCs may be at least partially aligned by the patterned recording medium layer 410 or 410' according to an grating pattern to form the active LC layer 505. Thus, the patterned recording medium layer 410 or 410' may also be referred to as PAM layers 410 and 410'. The LC cell 500 filled with the active LCs may be sealed via, e.g., the adhesive 412, and an active PSOE (e.g., polarization selective grating) 510 may be obtained. The active PSOE (e.g., polarization selective grating) 510 may be switchable by a voltage applied to the conductive electrode layers 540 and 540'. The switching of the active PSOE 510 may be controlled by a controller (not shown) similar to the controller 217 shown in FIG. 2A.

For illustrative purposes, FIGS. 5A and 5B show that the patterned recording medium layers 410 and 410' (or PAM layers 410 and 410') may be disposed at opposing inner surfaces of the two substrates 405 and 405'. In some embodiments, each of the PAM layers 410 and 410' disposed at the two substates 405 and 405' may be configured to provide a planar alignment (or an alignment with a small pretilt angle). The PAM layers 410 and 410' may provide parallel or anti-parallel surface alignments. In some embodiments, the PAM layers 410 and 410' disposed at the two substates 405 and 405' may be configured to provide hybrid surface alignments. For example, the PAM layer 410 disposed at the substate 405 may be configured to provide a planar alignment (or an alignment with a small pretilt angle), and the PAM layer 410' disposed at the other substate 405' may be configured to provide a homeotropic alignment. Although not shown, in some embodiments, only one of the substrates 405 and 405' may be provided with the PAM layer 410 or 410'.

For illustrative purposes, FIGS. 5A and 5B show that conductive electrode layers 540 and 540' may be disposed at the two substrates 405 and 405'. The conductive electrode layer (540 or 540') may be disposed between the patterned recording medium layer (410 or 410') and the substrate (405 or 405'). In the embodiment shown in FIGS. 5A and 5B, each of the conductive electrode layers 540 and 540' may be a continuous planar electrode layer. A driving voltage may be applied to the conductive electrode layers 540 and 540' to generate a vertical electric field to reorient the LC molecules, thereby switching the optical properties of the active PSOE (e.g., polarization selective grating) 510. As shown in FIG. 5B, the conductive electrode layers 540 and 540' may be disposed at two sides of the active LC layer 505.

Figure 5C:
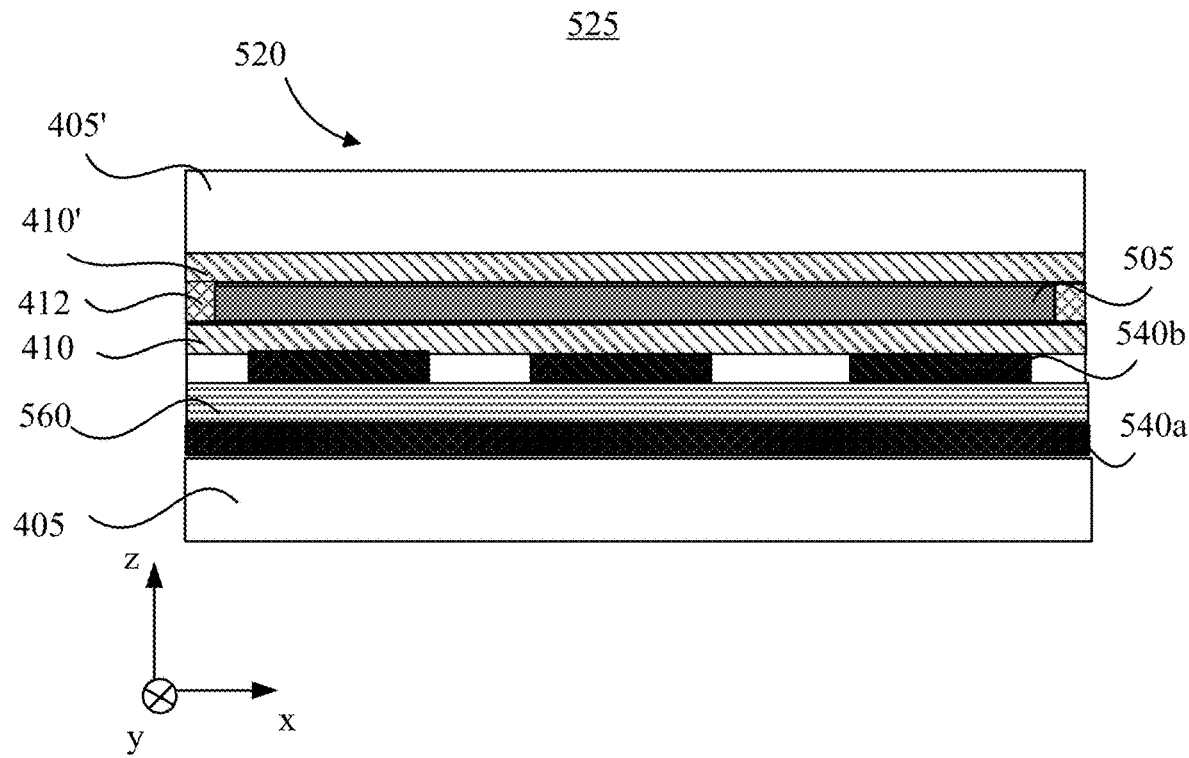
FIG. 5C schematically illustrates processes for fabricating a PSOE and a fabricated PSOE, according to an embodiment of the present disclosure.

In some embodiments, the two conductive electrode layers 540 and 540' may be disposed at the same side of the active LC layer 505. For example, as shown in FIG. 5C, two substates 405 and 405' may be assembled to form an LC cell 520. One substrate 405' (e.g., an upper substrate) may not be provided with a conductive electrode layer, while the other substrate 405 (e.g., a lower substrate) may be provide with two conductive electrode layers (e.g., 540a and 540b) and an electrically insulating layer 560 disposed between the two conductive electrode layers. In other words, the two conductive electrode layers 540a and 540b may be disposed at the same side of the active LC layer 505. The two conductive electrode layers 540a and 540b may be a continuous planar electrode layer 540a and a patterned electrode layer 540b. The patterned electrode layer 540b may include a plurality of striped electrodes arranged in parallel in an interleaved manner. After the LC cell 520 is filled with active LCs to form the active LC layer 505, an active PSOE (e.g., polarization selective grating) 525 may be obtained. A voltage may be applied between the continuous planar electrode layer 540a and the patterned electrode layer 540b disposed at the same side of the active LC layer 505 to generate a horizontal electric field to reorient the LC molecules, thereby switching the optical properties of the fabricated active PSOE 525 (e.g., polarization selective grating).

Figure 5D:
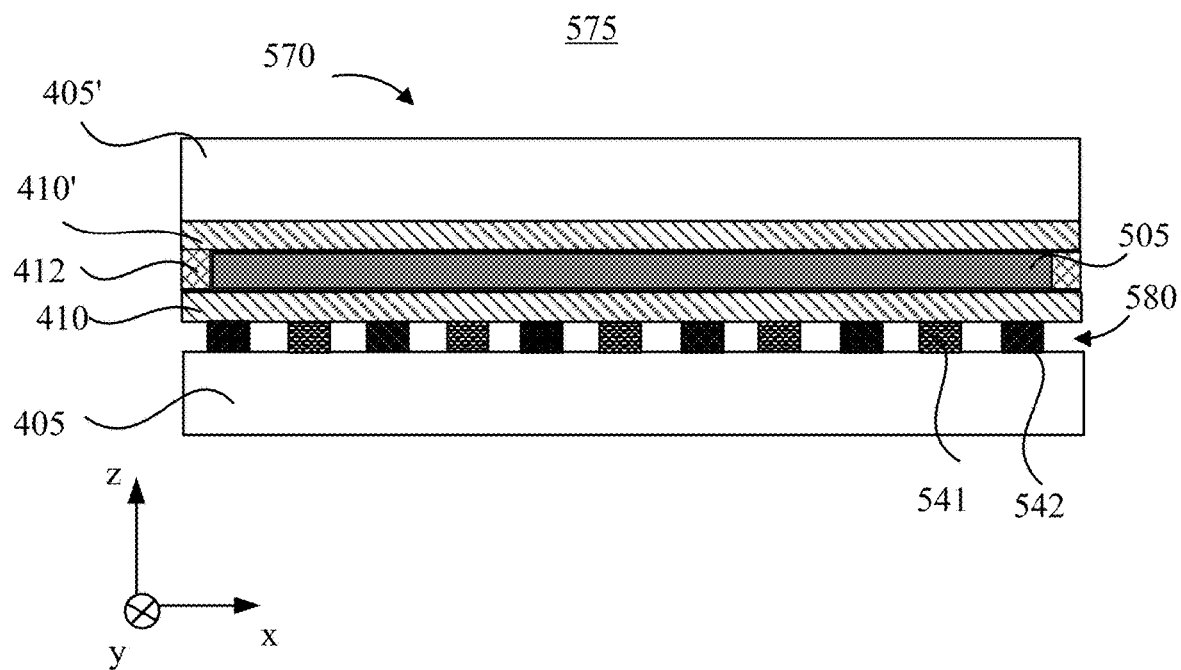
FIG. 5D schematically illustrates processes for fabricating a PSOE and a fabricated PSOE, according to another embodiment of the present disclosure.

In some embodiments, as shown in FIG. 5D, two substates 405 and 405' may be assembled to form an LC cell 570. One substrate 405' (e.g., an upper substrate) may not be provided with a conductive electrode layer, while the other substrate 405 (e.g., a lower substrate) may be provide with a conductive electrode layer 580. The conductive electrode layer 580 may include interdigitated electrodes, which may include two individually addressable comb-like electrode structures (or arrays) 541 and 542. After the LC cell 560 is filled with active LCs to form the active LC layer 505, an active PSOE (e.g., polarization selective grating) 575 may be obtained. A voltage may be applied between the comb-like electrode structures 541 and 542 disposed at the same side of the active LC layer 505 to generate a horizontal electric field to reorient the LC molecules in the active LC layer 505, thereby switching the optical properties of the fabricated active PSOE 575 (e.g., active polarization selective grating).

Referring back to FIGS. 5A-5D, in some embodiments, the recording medium layer(s) may not be optically patterned before the LC cell is assembled. Instead, the recording medium layer(s) may be optically patterned after the LC cell is assembled. For example, two substrates 405 and 405' may be assembled to form an LC cell. At least one of the two substrates 405 and 405' may be provided with one or more conductive electrode layers and a recording medium layer (that has not been optically patterned yet). Then the LC cell may be exposed to a polarization interference pattern, which may be similar to that shown in FIG. 4B. Accordingly, the recording medium layer disposed at the substrate may be optically patterned to provide an alignment pattern corresponding to a grating pattern. After the LC cell is filled with active LCs and sealed, an active PSOE (e.g., polarization selective grating) may be obtained.

Figure 6A:
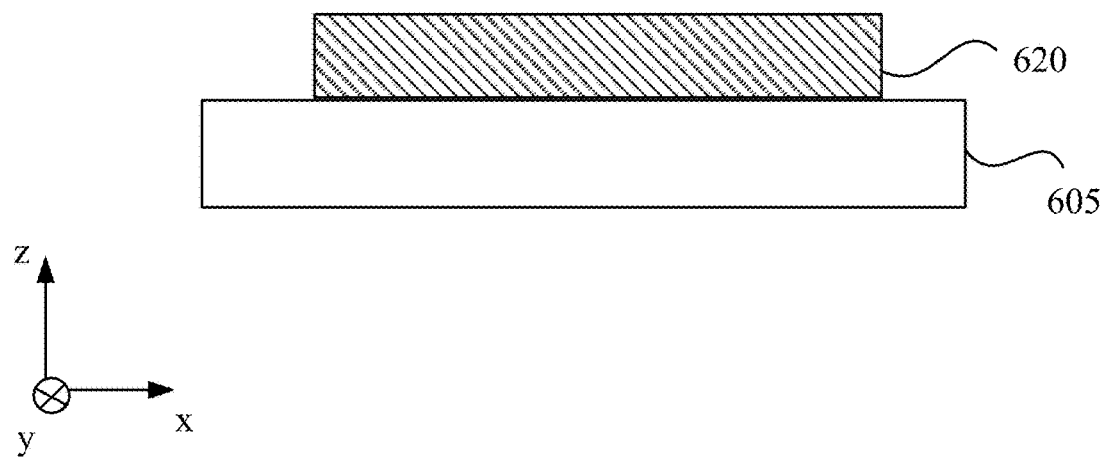
FIGS. 6A and 6B schematically illustrate processes for fabricating a PSOE, according to another embodiment of the present disclosure.
Figure 6B:
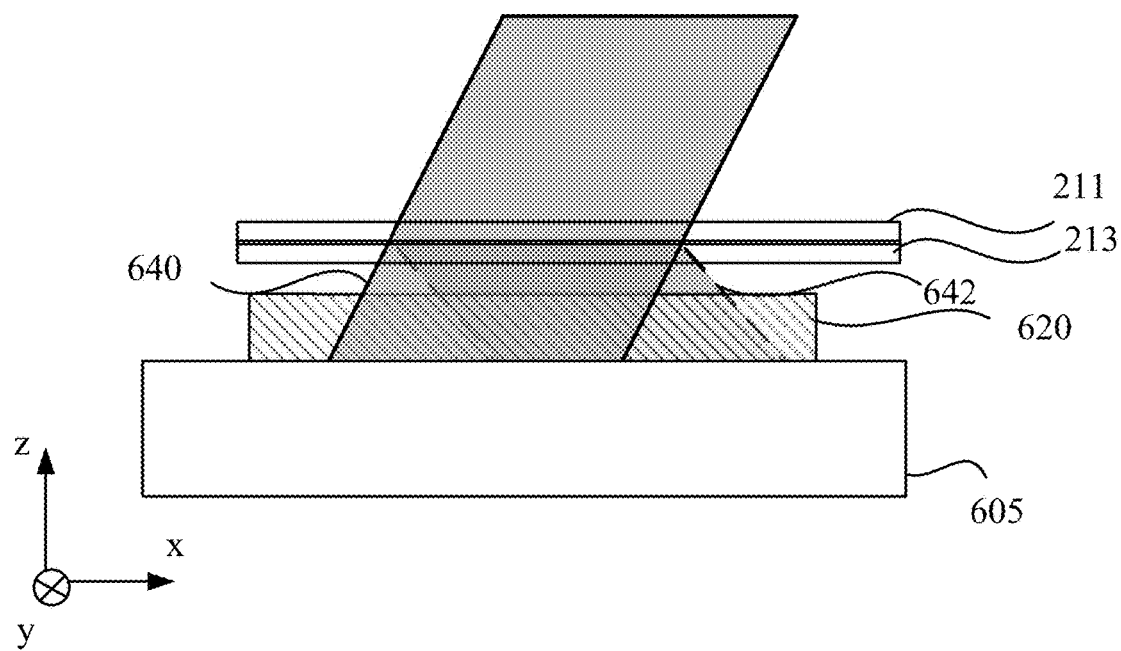

FIGS. 6A and 6B schematically illustrate processes for fabricating a PSOE (e.g., a polarization selective grating), according to another embodiment of the present disclosure. The fabrication processes may include holographic recording and bulk-mediated photo-alignment. The fabrication processes shown in FIGS. 6A and 6B may include steps similar to those shown in FIGS. 4A and 4B. The PSOE (e.g., polarization selective grating) fabricated based on the processes shown in FIGS. 6A and 6B may include elements similar to the PSOE (e.g., polarization selective grating) fabricated based on the processes shown in FIGS. 4A and 4B. Descriptions of the similar steps and similar elements, structures, or functions can refer to the descriptions rendered above in connection with FIGS. 4A and 4B. The PSOE (e.g., polarization selective grating) fabricated based on the fabrication processes shown in FIGS. 6A and 6B may be a passive PSOE (e.g., a passive polarization selective grating). Although the substrate and layers are shown as having flat surfaces, in some embodiments, the substrate and layers formed thereon may have curved surfaces.

Similar to the embodiment shown in FIGS. 4A and 4B, the processes shown in FIGS. 6A and 6B may include dispensing (e.g., coating, depositing, etc.) a recording medium on a surface (e.g., a top surface) of a substrate 605 to form a recording medium layer 620. The recording medium may be a polarization sensitive recording medium. The recording medium may include an optically recordable and polarization sensitive material (e.g., a photo-alignment material) configured to have a photoinduced optical anisotropy when exposed to a polarized light irradiation. Molecules (or fragments) and/or photo-products of the optically recordable and polarization sensitive material may generate anisotropic angular distributions in a film plane of a layer of the recording medium under a polarized light irradiation. In some embodiments, the recording medium may include or be mixed with other ingredients, such as a solvent in which the optically recordable and polarization sensitive materials may be dissolved to form a solution, and photo-sensitizers. The solution may be dispensed on the substrate 605 using a suitable process, e.g., spin coating, slot coating, blade coating, spray coating, or jet (ink-jet) coating or printing. The solvent may be removed from the coated solution using a suitable process, e.g., drying, or heating, leaving the recording medium on the substrate 605.

After the recording medium layer 620 is formed on the substrate 605, as shown in FIG. 6B, the recording medium layer 620 may be exposed to a polarization interference pattern generated based on two recording beams 640 and 642. The two recording beams 640 and 642 may be referred to as the reference beam and the signal beam, respectively. The two recording beams 640 and 642 may be two coherent circularly polarized beams with opposite handednesses. In some embodiments, the two recording beams 640 and 642 may represent, respectively, the beam S235 and the beam S234 output from the SRG 211 operating at the Littrow configuration and the waveplate 213 shown in FIG. 2B. The recording medium layer 620 may be optically patterned when exposed to the polarization interference pattern generated based on the two recording beams 640 and 642 during the polarization interference exposure process. An orientation pattern of an optic axis of the recording medium layer 620 in an exposed region may be defined during the polarization interference exposure process.

In the embodiment shown in FIGS. 6A and 6B, the recording medium may include a photo-sensitive polymer. Molecules of the photo-sensitive polymer may include one or more polarization sensitive photo-reactive groups embedded in a main polymer chain or a side polymer chain. During the polarization interference exposure process of the recording medium layer 620, a photo-alignment of the polarization sensitive photo-reactive groups may occur within (or in, inside) a volume of the recording medium layer 620. That is, a 3D polarization field generated by the interface of the two recording beams 640 and 642 may be directly recorded within (or in, inside) the volume of the recording medium layer 620. Such an alignment procedure shown in FIG. 6B may be referred to as a bulk-mediated photo-alignment. In the embodiment shown in FIGS. 6A and 6B, an in-plane orientation pattern of the optic axis may be directly recorded in the recording medium layer 620 via the bulk-mediated photo-alignment in an exposed region. In some embodiments, the in-plane orientation pattern of the optic axis may correspond to a grating pattern. A step of disposing an additional birefringent medium layer on the patterned recording medium layer 620 may be omitted. The patterned recording medium layer 620 may function as a PSOE (e.g., polarization selective grating) 600. In some embodiments, multiple in-plane orientation patterns of the optic axis (or multiple grating patterns) may be recorded in different regions of the recording medium layer 620 through multiple polarization interference exposure processes. The multiple grating patterns may correspond to multiple grating patterns with the same or different sizes, shapes, grating periods, grating orientations, and/or handedness of the in-plane modulation.

In some embodiments, the photo-sensitive polymer included in the recording medium layer 620 may include an amorphous polymer, an LC polymer, etc. The molecules of the photo-sensitive polymer may include one or more polarization sensitive photo-reactive groups embedded in a main polymer chain or a side polymer chain. In some embodiments, the polarization sensitive photo-reactive group may include an azobenzene group, a cinnamate group, or a coumarin group, etc. In some embodiments, the photo-sensitive polymer may be an amorphous polymer, which may be initially optically isotropic prior to undergoing the polarization interference exposure process, and may exhibit an induced (e.g., photo-induced) optical anisotropy after being subjected to the polarization interference exposure process. In some embodiments, the photo-sensitive polymer may be an LC polymer, in which the birefringence and in-plane orientation pattern may be recorded due to an effect of photo-induced optical anisotropy. In some embodiments, the photo-sensitive polymer may be an LC polymer with a polarization sensitive cinnamate group embedded in a side polymer chain. An example of the LC polymer with a polarization sensitive cinnamate group embedded in a side polymer chain is an LC polymer M1. The LC polymer M1 has a nematic mesophase in a temperature range of about 65° C. to about 400° C. An optical anisotropy may be induced by irradiating a film of the LC polymer M1 with a polarized UV light (e.g., a laser light with a wavelength of 425 nm or 455 nm). In some embodiments, the induced optical anisotropy may be subsequently enhanced by more than an order of magnitude by annealing the patterned recording medium layer 620 at a temperature range of about 65° C. to about 400° C. In some embodiments, the annealing of the patterned recording medium layer 620 may be omitted.

The LC polymer M1 is an example of an LC polymer with a polarization sensitive cinnamate group embedded in a side polymer chain. The dependence of the photo-induced birefringence on exposure energy is qualitatively similar for other materials from liquid crystalline polymers of M series. Liquid crystalline polymers of M series are discussed in U.S. Patent Application Publication No. US 2020/0081398, which is incorporated by reference for all purposes (including the descriptions of the M series). In some embodiments, when the recording medium layer 620 includes an LC polymer, the patterned recording medium layer 620 may be heat treated (e.g., annealed) in a temperature range corresponding to a liquid crystalline state of the LC polymer to enhance the photo-induced optical anisotropy of the LC polymer (not shown in FIG. 6B). The recording medium layer 620 for a bulk-mediated photo-alignment shown in FIG. 6B may be relatively thicker than the recording medium layer 410 for a surface-mediated photo-alignment shown in FIGS. 4B-4D.

The substrate 605 may be similar to the substrate 405 shown in FIGS. 4A-4D. In some embodiments, the substrate 605 may be used to fabricate, store, or transport the PSOE (e.g., polarization selective grating) 600. In some embodiments, the substrate 605 may be detachable or removable from the PSOE 600 after the PSOE 600 is fabricated or transported to another place or device. That is, the substrate 605 may be used in fabrication, transportation, and/or storage to support the PSOE 600 provided on the substrate 605, and may be separated or removed from the PSOE 600 when the fabrication of the PSOE 600 is completed, or when the PSOE 600 is to be implemented in an optical device. In some embodiments, the substrate 605 may not be separated from the PSOE 600.

Figure 10:
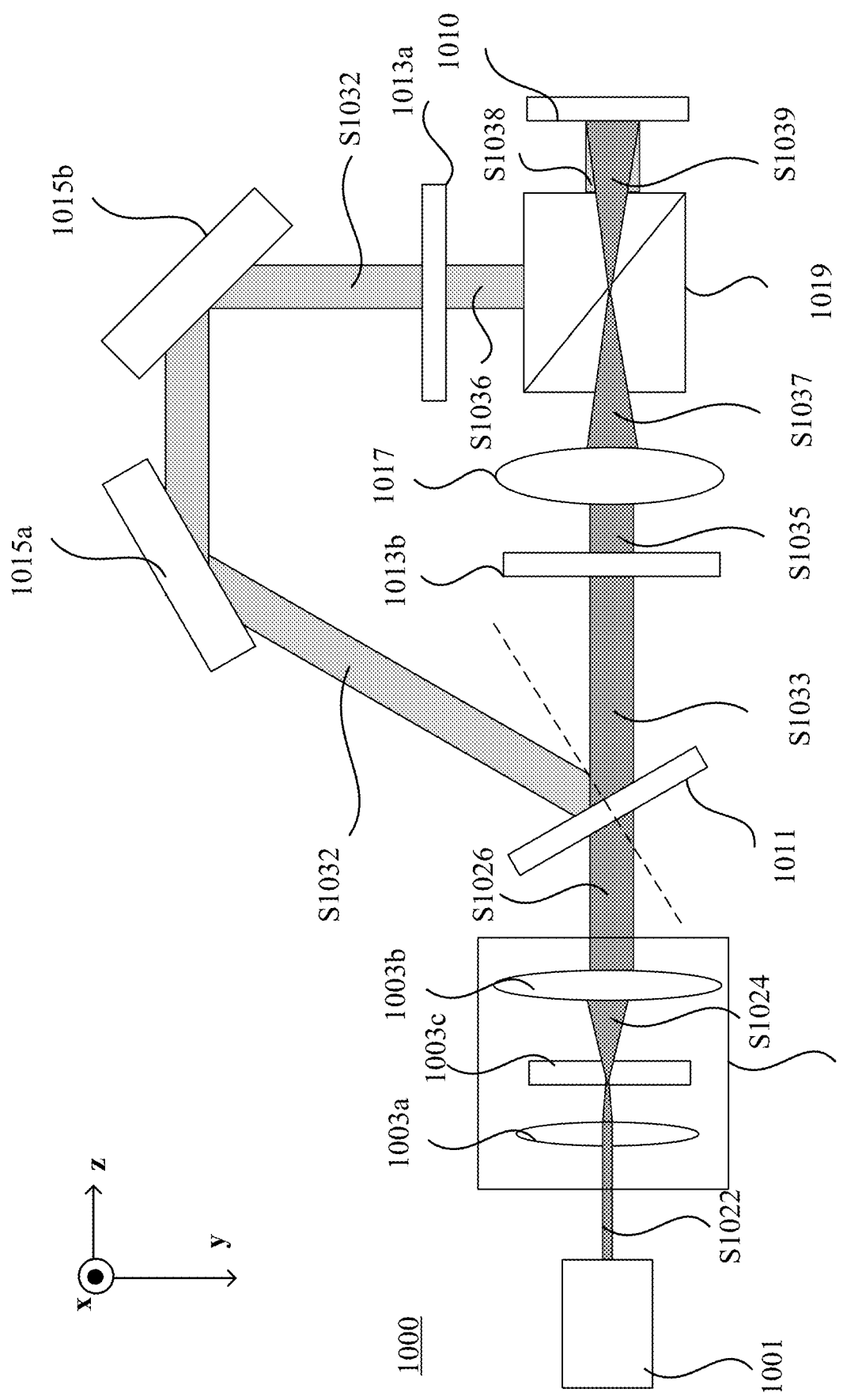
FIG. 10 schematically illustrates a system for generating a polarization interference, according to another embodiment of the present disclosure.

FIG. 10 schematically illustrates a system 1000 configured to generate a polarization interference pattern that may be recorded in a recording medium layer 1010, according to an embodiment of the present disclosure. The system 1000 may include elements, structures, and/or functions that are the same as or similar to those included in the system 200 shown in FIGS. 2A-2D. Descriptions of the same or similar elements, structures, and/or functions can refer to the above descriptions rendered in connection with FIGS. 2A-2D. The recording medium layer 1010 may be similar to the recording medium layer 210 shown in FIGS. 2A-2D.

As shown in FIG. 10, the system 1000 may include a light source 1001, a beam conditioning device 1003, and an SRG 1011, which may be similar to the light source 1001, the beam conditioning device 203, and the SRG 211 shown in FIGS. 2A-2D, respectively. In some embodiments, the beam conditioning device 1003 may include a first lens 1003a, a pinhole aperture 1003c, and a second lens 1003b arranged in an optical series, which may be similar to the first lens 203a, the pinhole aperture 203c, and the second lens 203b shown in FIG. 2A. For example, the beam conditioning device 1003 may be configured to condition (e.g., polarize, expand, collimate, remove noise from, etc.) a beam S1022 emitted from the light source 1001, and output a collimated beam S226 with a predetermined beam size and a predetermined polarization.

The SRG 1011 may be orientated with respect to the optical axis of the beam conditioning device 1003 or a propagation direction of the beam S226, such that the beam S226 may be incident onto the SRG 1011 at a predetermined incidence angle (which is non-zero). In some embodiments, the system 1000 may include a movable stage, on which the SRG 1011 may be mounted. The movable stage may be similar to the movable stage 219 shown in FIGS. 2A, 2C, and 2D. The movable stage may be configured to translate and/or rotate the SRG 1011, thereby adjusting the orientation and/or position of the SRG 1011 relative to the propagation direction of the beam S226. When the orientation and/or position of the SRG 1011 is adjusted, the incidence angle of the beam S226 relative to the SRG 1011 may be adjustable.

The SRG 1011 may be configured to operate at the Littrow configuration for the beam S226 having an incidence angle and a wavelength. The SRG 1011 may be configured to forwardly diffract the beam S226 substantially evenly into two paths: a first beam S1032 in a first path (e.g., a reference path) and a second beam S1033 in a second path (e.g., a signal path). In some embodiments, the first beam S1032 and the second beam S1033 may be a $-1^{st}$ order diffracted beam S1032 and a $0^{th}$ order diffracted beam S1033, respectively. In some embodiments, the $-1^{st}$ order diffracted beam S1032 and the $0^{th}$ order diffracted beam S1033 may be two linearly polarized beams having orthogonal polarizations. In some embodiments, the $-1^{st}$ order diffracted beam S1032 and the $0^{th}$ order diffracted beam S1033 may be two linearly polarized beams having a substantially same polarization. In some embodiments, the $-1^{st}$ order diffracted beam S1032 and the $0^{th}$ order diffracted beam S1033 may have a substantially same light intensity. In some embodiments, the $-1^{st}$ order diffracted beam S1032 and the $0^{th}$ order diffracted beam S1033 may have different light intensities. Diffraction angles of the −1st order diffracted beam S1032 and the $0^{th}$ order diffracted beam S1033 may have a substantially same value and opposite signs.

In some embodiments, the system 1000 may include one or more reflectors (e.g., mirrors) 1015a and 1015b configured to change the propagating direction of the first beam S1032 by reflecting the first beam S1032 in different directions. The combination of the reflectors 1015a and 1015b may add multiple turns in the first path, such that the first beam S1032 propagates in a direction substantially perpendicular to a propagation direction of the second beam S1033 propagating in the second path. That is, a direction of the first path may be changed by the reflectors 1015a and 1015b, such that the first path becomes perpendicular to the second path at a non-polarizing beam splitter ("NPBS") 1019.

In some embodiments, the system 1000 may include a first waveplate 1013a disposed in the first path along which the first beam S1032 propagates, and a second waveplate 1013b disposed in the second path along which the second beam S1033 propagates. The first waveplate 1013a and the second waveplate 1013b may be similar to the waveplate 213 shown in FIGS. 2A-2D. The first waveplate 1013a and the second waveplate 1013b may be configured to convert the first beam S1032 and the second beam S1033 into circularly polarized beams with orthogonal polarizations (e.g., opposite handednesses), respectively. For example, the first waveplate 1013*a* and the second waveplate 1013*b* may be QWPs. A polarization axis of the first waveplate 1013*a* may be oriented relative to the polarization direction of the first beam S1032 to covert the first beam S1032 into a circularly polarized beam S1036 having a first handedness. The beam S1036 may be a collimated beam having a planar wavefront. A polarization axis of the second waveplate 1013*b* may be oriented relative to the polarization direction of the second beam S1033 to covert the second beam S1033 into a circularly polarized beam S1035 having a second handedness that is opposite to the first handedness.

In some embodiments, the system 1000 may include a third lens (e.g., a focusing lens) 1017 disposed in the second path between the second waveplate 1013*b* and the recoding medium layer 1010. The beam S1035 (which may be a collimated beam having a planar wavefront) may be transmitted through the third lens 1017 as a beam S1037 having a parabolic wavefront. In some embodiments, a distance between the third lens 1017 and the recoding medium layer 1010 may be about twice the focal length of the third lens 1017. In some embodiments, the non-polarizing beam splitter ("NPBS") 1019 may be disposed in the second path between the third lens 1017 and the recoding medium layer 1010. The NPBS 1019 may be configured to combine the first beam S1032 (which has become S1036) propagating along the first path), and the beam S1033 (which has become S1037 having a non-planar (e.g., parabolic) wavefront output propagating in the second path). For example, the NPBS 1019 may be configured to substantially transmit the beam S1037 as a beam S1039 propagating in the +z-axis direction (or along the direction of the second path), and substantially reflect the beam S1036 propagating in the +y-axis direction as a beam S1038 propagating in the +z-axis direction (or along the direction of the second path). The beam S1039 and the beam S1038 output from the NPBS 1019 may interfere with each other to generate a polarization interference pattern, which may be recorded in the recording medium layer 1010. After a sufficient exposure, the polarization interference pattern may be recorded in the recording medium layer 1010 to define an orientation pattern of an optic axis of the recording medium layer 1010.

In some embodiments, the orientation of the optic axis of the recording medium layer 1010 may spatially vary in at least one in-plane direction (e.g., a plurality of radial directions) with a varying pitch. In some embodiments, the orientation pattern of the optic axis of the recording medium layer 1010 may correspond to a lens pattern. A polarization selective lens may be fabricated based on the exposed (or optically patterned) recording medium layer 1010. For example, in some embodiments, the exposed (or optically patterned) recording medium layer 1010 may function as a polarization selective lens (e.g., a PBP lens or a PVH lens, etc.). In some embodiments, a birefringent medium may be disposed at (e.g., on) the exposed (or optically patterned) recording medium layer 1010, similar to the process shown in FIG. 4C. Optically anisotropic molecules (e.g., LC molecules) in the birefringent medium may be at least partially aligned by the exposed (or optically patterned) recording medium layer 1010 according to the lens pattern. In some embodiments, the birefringent medium disposed on the exposed (or optically patterned) recording medium layer 1010 may be further polymerized, similar to the process shown in FIG. 4D. The polymerized birefringent medium may form a passive polarization selective lens (e.g., a passive PBP lens or a passive PVH lens, etc.). In some embodiments, two substrates each provided with the exposed (or optically patterned) recording medium layer 1010 may be arranged in parallel to form a cell with a space. A birefringent medium (e.g., active LCs) may be filled into the space of the cell. In some embodiments, at least one of the two substrates may include two electrodes configured to provide a driving voltage to the birefringent medium (e.g., active LCs). The cell filled with the birefringent medium (e.g., active LCs) may function as an active polarization selective lens (e.g., an active PBP lens, or an active PVH lens, etc.).

Polarization selective gratings (e.g., PVH or PBP gratings, PVH or PBP lens, etc.) fabricated based on the fabrication processes and systems disclosed herein have various applications in a number of technical fields. Some exemplary applications in augmented reality ("AR"), virtual reality ("VR"), and mixed reality ("MR") fields or some combinations thereof will be explained below. Near-eye displays ("NEDs") have been widely used in a wide variety of applications, such as aviation, engineering, scientific research, medical devices, computer games, videos, sports, training, and simulations. NEDs can function as a VR device, an AR device, and/or an MR device. When functioning as AR and/or MR devices, NEDs are at least partially transparent from the perspective of a user, enabling the user to view a surrounding real world environment. Such NEDs are also referred to as optically see-through NEDs. When functioning as VR devices, NEDs are opaque such that the user is substantially immersed in the VR imagery provided via the NEDs. An NED may be switchable between functioning as an optically see-through device and functioning as a VR device.

Pupil-replication (or pupil-expansion) waveguide display systems with diffractive coupling structures have been implemented in NEDs, which can potentially offer eye-glass form factors, a moderately large field of view ("FOV"), a high transmittance, and a large eyebox. A pupil-replication waveguide display system includes a display element (e.g., an electronic display) configured to generate an image light, and an optical waveguide configured to guide the image light to an eyebox provided by the waveguide display system. Diffraction gratings may be coupled with the optical waveguide, and may function as in-coupling and out-coupling diffractive elements. The optical waveguide may also function as an AR and/or MR combiner to combine the image light and a light from the real world environment, such that virtual images generated by the display element may be superimposed on real-world images or see-through images. In a pupil-replication waveguide display system, a waveguide coupled with the in-coupling and out-coupling diffractive elements may expand the exit pupil along a light propagation direction of a light propagating in and along the waveguide. As the light propagating in and along the waveguide is repeatedly diffracted out of the waveguide by the out-coupling diffractive element, with a portion of the light exiting the waveguide at each location of the waveguide, the illuminance (or light intensity) of the light exiting the waveguide may decrease (i.e., become weaker) along the light propagating direction. Thus, the illuminance (or light intensity) of the light output from the waveguide may be non-uniform along the waveguide. A uniform illuminance over an expanded exit pupil may be desirable for a pupil-replication waveguide display system to maintain a wide FOV.

Figure 7A:
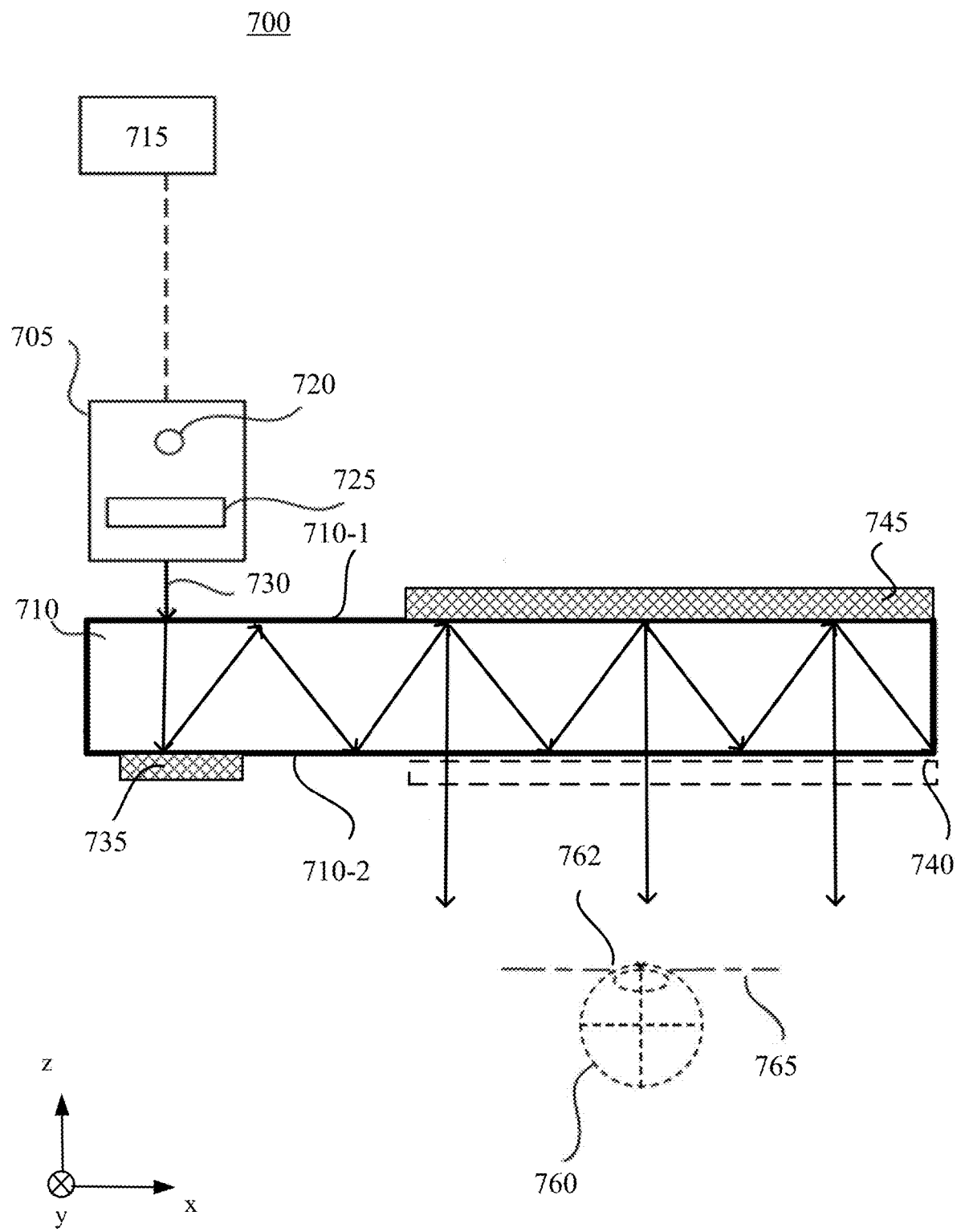
FIG. 7A illustrates a schematic diagram of a waveguide display system, according to an embodiment of the present disclosure.

FIG. 7A illustrates a schematic diagram of a waveguide display system 700, according to an embodiment of the present disclosure. The waveguide display system 700 may provide pupil replication (or pupil expansion). The waveguide display system 700 may be implemented in NEDs for VR, AR, and/or MR applications. The waveguide display system 700 may include an out-coupling diffractive element 745 (or out-coupling element 745) including a polarization selective grating (e.g., a PVH grating) fabricated based on the disclosed methods and systems. In some embodiments, the polarization selective grating (e.g., the PVH grating) may be fabricated to provide a predetermined non-uniform diffraction efficiency profile (any suitable diffraction efficiency variation profile) in one or more dimensions. For example, the one or more dimensions may be the x-axis dimension, the y-axis dimension, or both. The predetermined non-uniform diffraction efficiency profile may provide a predetermined illuminance distribution (or profile) along the one or more dimensions of the expanded exit pupil.

In some embodiments, with the predetermined non-uniform diffraction efficiency profile, the polarization selective grating (e.g., the PVH grating) may provide a predetermined illuminance distribution with an improved uniformity over an expanded exit pupil. The predetermined illuminance distribution may be any suitable illuminance distribution profile in the one or more dimensions, such as a Gaussian distribution or any other desirable distribution. In some embodiments, the predetermined illuminance distribution may not be uniform depending on the application need.

As shown in FIG. 7A, the waveguide display system 700 may include a light source assembly 705, a waveguide 710, and a controller 715. The light source assembly 705 may include a light source 720 and an light conditioning system 725. In some embodiments, the light source 720 may be a light source configured to generate an at least partially coherent light. The light source 720 may include, e.g., a laser diode, a vertical cavity surface emitting laser, a light emitting diode, or a combination thereof. In some embodiments, the light source 720 may be a display panel, such as a liquid crystal display ("LCD") panel, a liquid-crystal-on-silicon ("LCoS") display panel, an organic light-emitting diode ("OLED") display panel, a micro light-emitting diode ("micro-LED") display panel, a laser scanning display panel, a digital light processing ("DLP") display panel, or a combination thereof. In some embodiments, the light source 720 may be a self-emissive panel, such as an OLED display panel or a micro-LED display panel. In some embodiments, the light source 720 may be a display panel that is illuminated by an external source, such as an LCD panel, an LCoS display panel, or a DLP display panel. Examples of an external source may include a laser, an LED, an OLED, or a combination thereof. The light conditioning system 725 may include one or more optical components configured to condition the light from the light source 720. For example, the controller 715 may control the light conditioning system 725 to condition the light from the light source 720, which may include, e.g., transmitting, attenuating, expanding, collimating, and/or adjusting orientation of the light.

The light source assembly 705 may generate an image light 730 and output the image light 730 to an in-coupling element 735 disposed at a first portion of the waveguide 710. The waveguide 710 may direct the image light 730 to an out-coupling element 745 disposed at a second portion of the waveguide 710. The out-coupling element 745 may couple the image light 730 out of the waveguide 710 to an eye 760 positioned in an eye-box 765 of the waveguide display system 700. An exit pupil 762 may be a location where the eye 760 is positioned in the eye-box 165. Although one exit pupil 762 is shown for illustrative purposes, the waveguide display system 700 may provide a plurality of exit pupils. The in-coupling element 735 may couple the image light 730 into the waveguide 710 at an angle such that the image light 730 may propagate through total internal reflection ("TIR") inside and along the waveguide 710 toward the out-coupling element 745. The first portion and the second portion may be located at different ends of the waveguide 710. The out-coupling element 745 may be configured to couple the image light 730 out of the waveguide 710 toward the eye 760. In some embodiments, the in-coupling element 735 may couple the image light 730 into a TIR path inside the waveguide 710. The image light 730 may propagate inside the waveguide 710 through TIR along the TIR path.

The waveguide 710 may include a first surface or side 710-1 facing the real-world environment and an opposing second surface or side 710-2 facing the eye 760. In some embodiments, as shown in FIG. 7A, the in-coupling element 735 may be disposed at the second surface 710-2 of the waveguide 710. In some embodiments, the in-coupling element 735 may be integrally formed as a part of the waveguide 710 at the second surface 710-2. In some embodiments, the in-coupling element 735 may be separately formed, and may be disposed at (e.g., affixed to) the second surface 710-2 of the waveguide 710. In some embodiments, the in-coupling element 735 may be disposed at the first surface 710-1 of the waveguide 710. In some embodiments, the in-coupling element 735 may be integrally formed as a part of the waveguide 710 at the first surface 710-1. In some embodiments, the in-coupling element 735 may be separately formed and disposed at (e.g., affixed to) the first surface 710-1 of the waveguide 710. In some embodiments, the in-coupling element 735 may include one or more diffraction gratings, one or more cascaded reflectors, one or more prismatic surface elements, and/or an array of holographic reflectors, or any combination thereof. In some embodiments, the in-coupling element 735 may include one or more diffraction gratings, such as a surface relief grating, a volume hologram, a polarization selective grating, a polarization volume hologram, a metasurface grating, another type of diffractive element, or any combination thereof. A pitch of the diffraction grating may be configured to enable total internal reflection ("TIR") of the image light 730 within the waveguide 710. As a result, the image light 730 may propagate internally within the waveguide 710 through TIR.

The out-coupling element 745 may be disposed at the first surface 710-1 or the second surface 710-2 of the waveguide 710. For example, as shown in FIG. 7A, the out-coupling element 745 may be disposed at the first surface 710-1 of the waveguide 710. In some embodiments, the out-coupling element 745 may be integrally formed as a part of the waveguide 710, for example, at the first surface 710-1. In some embodiments, the out-coupling element 745 may be separately formed and dispose at (e.g., affixed to) the first surface 710-1 of the waveguide 710. In some embodiments, the out-coupling element 745 may be disposed at the second surface 710-2 of the waveguide 710. For example, in some embodiments, the out-coupling element 745 may be integrally formed as a part of the waveguide 710 at the second surface 710-2. In some embodiments, the out-coupling element 745 may be separately formed and disposed at (e.g., affixed to) the second surface 710-2 of the waveguide 710. In some embodiments, the out-coupling element 745 may include one or more diffraction gratings, one or more cascaded reflectors, one or more prismatic surface elements, and/or an array of holographic reflectors, or any combination thereof. In some embodiments, the out-coupling element 745 may include one or more diffraction gratings. A pitch of the diffraction grating may be configured to cause the incident image light 730 to exit the waveguide 710, i.e., redirecting the image light 730 so that the TIR no longer occurs. In other words, the diffraction grating of the out-coupling element 745 may couple the image light 730 that has been propagating inside and along the waveguide 710 through TIR out of the waveguide 710 via diffraction. In some embodiments, the out-coupling element 745 may also be referred to as an out-coupling grating 745.

In some embodiments, the out-coupling element 745 may include a polarization selective grating (e.g., a PVH grating) fabricated based on the disclosed fabrication processes and systems. In some embodiments, the PVH grating may be fabricated to have a predetermined slant angle variation in one or more dimensions, e.g., within a plane perpendicular to a thickness direction of the PVH grating. The PVH grating included in the out-coupling element 745 may be configured to provide a predetermined (e.g., a non-uniform) diffraction efficiency profile, e.g., a predetermined 1D or 2D diffraction efficiency profile in an x-y plane, to image lights incident onto different portions of the surface of the PVH grating at predetermined incidence angles, with predetermined incidence wavelengths and predetermined polarizations. In some embodiments, the PVH grating included in the out-coupling element 745 may diffract the image lights out of the waveguide 710 at different diffraction efficiencies at different positions along the propagation direction of the image light (e.g., along the x-axis direction of the waveguide 710).

As discussed above, in a conventional pupil-replication waveguide display system, the waveguide may expand the exit pupil in the propagation direction of the image light propagating along and inside the waveguide. As the image light propagates along the waveguide, a portion of the image light may be diffracted out of the waveguide by the out-coupling element 745. Thus, the intensity of the image light diffracted out of the waveguide 710 may decrease (e.g., become weaker) in the propagating direction. Accordingly, the illuminance of the image light output from the waveguide may be non-uniform (e.g., may decrease) along the propagation direction of the image light (or the direction in which the exit pupil is expanded). In the waveguide display system 700 according to the present disclosure, through implementing a PVH grating that provides a non-uniform diffraction efficiency profile, different diffraction efficiencies may be provided at different locations along the waveguide for diffracting the image light 730 out of the waveguide. For example, the slant angle of the PVH grating may be configured to vary at least along the +x-axis direction in the embodiment shown in FIG. 7A, resulting in a varying (e.g., non-uniform) diffraction efficiency of the PVH at least along the +x-axis direction in FIG. 7A. In some embodiments, the diffraction efficiency of the PVH may increase along the +x-axis direction. As a result, when the intensity of the image light 730 decreases as the image light 730 propagates along the propagating direction, the illuminance of the light output from the waveguide 710 may be uniform due to the increasing diffraction efficiency along the propagating direction. Thus, the uniformity of the illuminance of the image light 730 output from the waveguide at least along the +x-axis direction (or the exit pupil expansion direction) may be improved.

Although not shown in FIG. 7A, in some embodiments, when the image light 730 propagating along and inside the waveguide 710 is diffracted by the PVH grating included in the out-coupling element 745 out of the waveguide 710, the out-coupling element 745 may be configured to provide a uniform illuminance in two dimensions (e.g., the x-axis direction and the y-axis direction) of the expanded exit pupil. In addition, the PVH grating may diffract an image light toward regions outside of the eyebox 760 with a relatively small (e.g., negligible) diffraction efficiency, and diffract an image light toward regions inside the eyebox 760 with a relatively large diffraction efficiency. Thus, the loss of the image light directed to regions outside of the eyebox 760 may be reduced. As a result, the power consumption of the light source assembly 705 may be significantly reduced, while the power efficiency of the waveguide display system 700 may be significantly improved.

The waveguide 710 may include one or more materials configured to facilitate the total internal reflection of the image light 730. The waveguide 710 may include, for example, a plastic, a glass, and/or polymers. In some embodiments, the waveguide 710 may have a relatively small form factor. For example, the waveguide 710 may be about 50 mm wide along the x-dimension, 30 mm long along the y-dimension, and 0.5-1 mm thick along the z-dimension.

The controller 715 may be communicatively coupled with the light source assembly 705, and may control the operations of the light source assembly 705. In some embodiments, the waveguide 710 may include additional elements configured to redirect, fold, and/or expand the pupil of the light source assembly 705. For example, as shown in FIG. 7A, a directing element 740 may be coupled to the waveguide 710. The directing element 740 may be configured to redirect the received input image light 730 to the out-coupling element 745, such that the received input image light 730 is coupled out of the waveguide 710 via the out-coupling element 745. In some embodiments, the directing element 740 may be arranged at a location of the waveguide 710 opposing the location of the out-coupling element 745. In some embodiments, the directing element 740 may be disposed at the second surface 710-2 of the waveguide 710. For example, in some embodiments, the directing element 740 may be integrally formed as a part of the waveguide 710 at the second surface 710-2. In some embodiments, the directing element 740 may be separately formed and disposed at (e.g., affixed to) the second surface 710-2 of the waveguide 710. In some embodiments, the directing element 740 may be disposed at the first surface 710-1 of the waveguide 710. For example, in some embodiments, the directing element 740 may be integrally formed as a part of the waveguide 710 at the first surface 710-1. In some embodiments, the directing element 740 may be separately formed and disposed at (e.g., affixed to) the first surface 710-1 of the waveguide 710.

In some embodiments, the directing element 740 and the out-coupling element 745 may have a similar structure. In some embodiments, the directing element 740 may include one or more diffraction gratings, one or more cascaded reflectors, one or more prismatic surface elements, and/or an array of holographic reflectors, or any combination thereof. In some embodiments, the directing element 740 may include one or more diffraction gratings, such as a surface relief grating, a volume hologram, a polarization selective grating, a polarization volume hologram, a metasurface grating, another type of diffractive element, or any combination thereof. The directing element 740 may also be referred to as a folding grating 740 or a directing grating 740. In some embodiments, the directing element 740 may include one or more polarization selective gratings (e.g., PVH gratings) fabricated based on disclosed fabrication processes and systems. The PVH grating included in the directing element 740 may provide a predetermined, non-uniform diffraction efficiency profile in at least one dimension within a plane perpendicular to a thickness direction of the PVH. For example, the PVH grating may include a slant angle variation in one or more dimensions within the plane perpendicular to the thickness direction of the PVH. In some embodiments, multiple functions, e.g., redirecting, folding, and/or expanding the pupil of the light generated by the light source assembly 705 may be combined into a single grating, e.g., the out-coupling grating 745. In such embodiments, the directing element 740 may be omitted.

In some embodiments, the waveguide display system 700 may include a plurality of waveguides 710 disposed in a stacked configuration (not shown in FIG. 7A). At least one (e.g., each) of the plurality of waveguides 710 may be coupled with or include one or more diffractive elements (e.g., in-coupling element, out-coupling element, and/or directing element), which may be configured to direct the image light 730 toward the eye 760. In some embodiments, the plurality of waveguides 710 disposed in the stacked configuration may be configured to output an expanded polychromatic image light (e.g., a full-color image light). In some embodiments, the waveguide display system 700 may include one or more light source assemblies 705 and/or one or more waveguides 710. In some embodiments, at least one (e.g., each) of the light source assemblies 705 may be configured to emit a monochromatic image light of a specific wavelength band corresponding to a primary color (e.g., red, green, or blue) and a predetermined FOV (or a predetermined portion of an FOV). In some embodiments, the waveguide display system 700 may include three different waveguides 710 configured to deliver component color images (e.g., primary color images) by in-coupling and subsequently out-coupling, e.g., red, green, and blue lights, respectively, in any suitable order. In some embodiments, the waveguide display assembly 700 may include two different waveguides configured to deliver component color images (e.g., primary color images) by in-coupling and subsequently out-coupling, e.g., a combination of red and green lights, and a combination of green and blue lights, respectively, in any suitable order. In some embodiments, at least one (e.g., each) of the light source assemblies 705 may be configured to emit a polychromatic image light (e.g., a full-color image light).

Figure 7B:
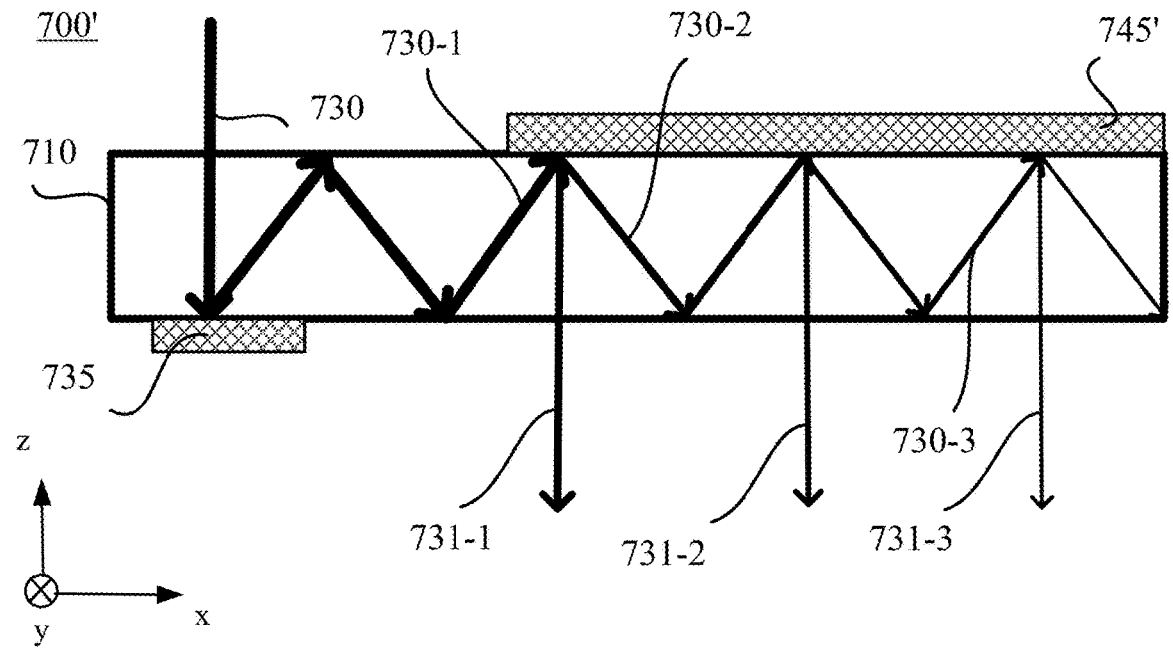
FIG. 7B illustrates a schematic diagram of diffraction of an image light using a conventional waveguide display system including an out-coupling diffractive element with a uniform diffraction efficiency.

FIG. 7B illustrates a conventional waveguide display system 700' in which an out-coupling element 745' including one or more diffraction elements (e.g., one or more PVH gratings) having a uniform diffraction efficiency in the x-axis direction. As shown in FIG. 7B, when the image light 730 propagates inside and along the waveguide 710 through TIR, as portions of the image light 730 are diffracted out of the waveguide 710 by the out-coupling element 745' at different locations, the intensity of the image light 730 becomes lower in the light propagating direction, as schematically indicated by the gradually reducing thickness of the lines 730-1, 730-2, and 730-3. As a result, the intensity (or illuminance) of output lights 731-1, 731-2, and 731-3 output from the waveguide 710 gradually decreases. Thus, the conventional waveguide display system 700' with diffraction elements providing a uniform diffraction efficiency in the x-axis direction may provide a non-uniform illuminance for the output lights (or the replicated pupils).

Figure 7C:
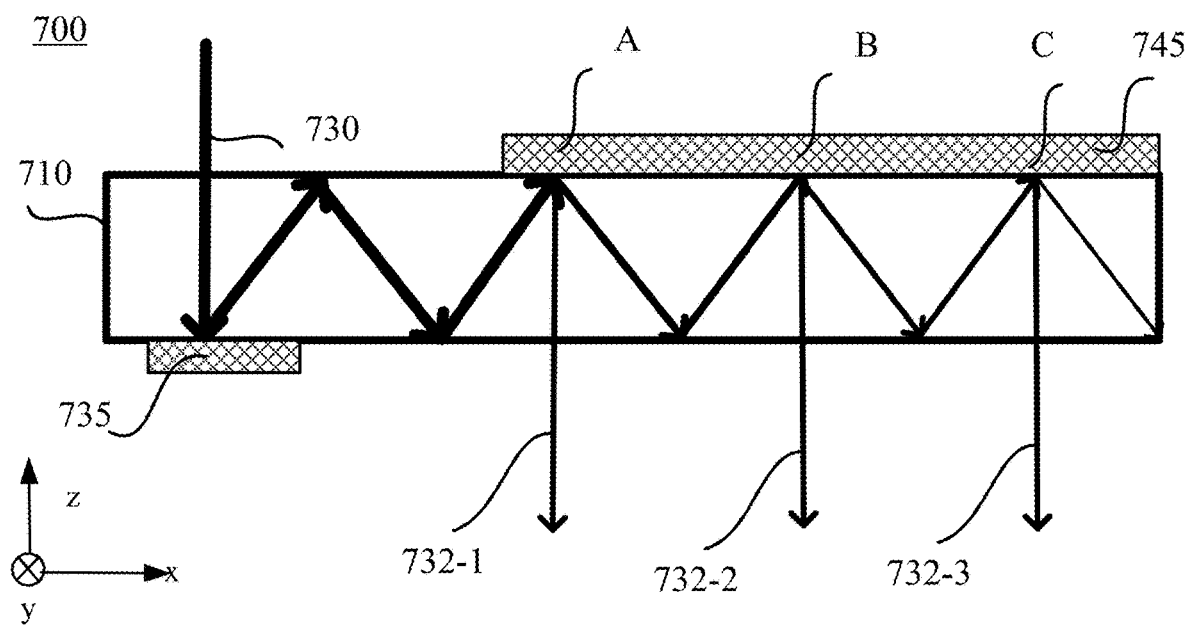
FIG. 7C illustrates a schematic diagram of diffraction of an image light using a disclosed waveguide display system, according to an embodiment of the present disclosure.

According to an embodiment of the present disclosure, the PVH grating with a non-uniform diffraction efficiency fabricated based on the disclosed processes and systems may improve the uniformity of the output illuminance of the output image light. FIG. 7C illustrates the diffraction of the image light by the out-coupling element 745 including a PVH grating having a non-uniform diffraction efficiency, according to an embodiment of the present disclosure. FIG. 7C shows that in the disclosed waveguide display system 700 shown in FIG. 7A, the PVH grating included in the out-coupling element 745 may be configured to have a gradually increasing diffraction efficiency along the x-axis direction. For example, at three exemplary diffraction points A, B, and C, the diffraction efficiency of the PVH may gradually increase. Thus, at point A where the intensity of the image light 730 is the largest, the diffraction efficiency may be the smallest. At point B, the intensity of the image light 730 may be lower than the intensity at point A. Hence, the diffraction efficiency at point B may be higher than the diffraction efficiency at point A. At point C, the intensity of the image light 730 may be further reduced. Thus, at point C, the diffraction efficiency may be further increased as compared to the diffraction efficiency at point B, and the diffraction efficiency at point C may be the highest. As a result of the non-uniform diffraction efficiency provided at different portions of the PVH grating, the illuminance (or intensity) of the image light 732-1, 732-2, and 732-3 output from the waveguide 710 may become more uniform as compared with the conventional configuration shown in FIG. 7B. For discussion purposes, in FIG. 7C, the diffraction efficiency of the PVH grating is presumed to be non-uniform in one dimension. It is understood that the diffraction efficiency of the PVH grating may be non-uniform in two dimensions, i.e., the x-axis direction and the y-axis direction. The PVH grating may have any suitable diffraction efficiency distribution profile(s) in one dimension or two dimensions.

Figure 8A:
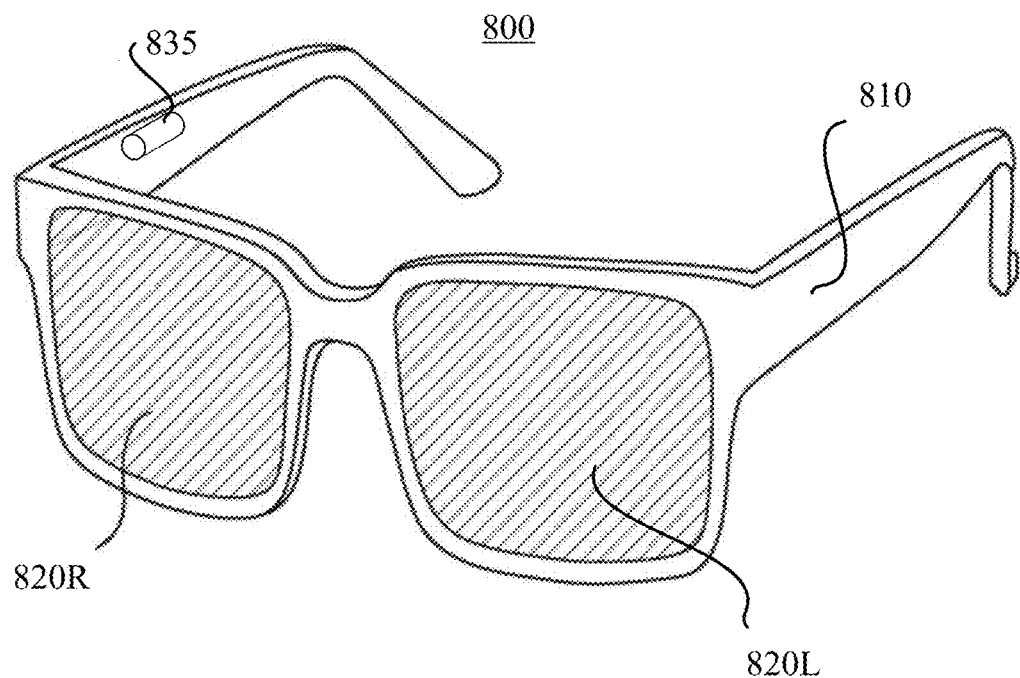
FIG. 8A illustrates a schematic diagram of a near-eye display ("NED"), according to an embodiment of the present disclosure.

FIG. 8A illustrates a schematic diagram of an optical system 800 according to an embodiment of the present disclosure. For illustrative purposes, a near-eye display ("NED") is used as an example of the optical system 800, in which one or more PSOE (e.g., PVH gratings) fabricated based on the disclosed processes and systems may be implemented. For the convenience of discussion, the optical system 800 may also be referred to as the NED 800. In some embodiments, the NED 800 may be referred to as a head-mounted display ("HMD"). The NED 800 may present media content to a user, such as one or more images, videos, audios, or a combination thereof. In some embodiments, an audio may be presented to the user via an external device (e.g., a speaker and/or a headphone). The NED 800 may operate as a VR device, an AR device, an MR device, or a combination thereof. In some embodiments, when the NED 800 operates as an AR and/or MR device, a portion of the NED 800 may be at least partially transparent, and internal components of the NED 800 may be at least partially visible.

As shown in FIG. 8A, the NED 800 may include a frame 810, a right display system 820R, and a left display system 820L. In some embodiments, certain device(s) shown in FIG. 8A may be omitted. In some embodiments, additional devices or components not shown in FIG. 8A may also be included in the NED 800. The frame 810 may include a suitable mounting structure configured to mount the right display system 820R and the left display system 820L to a body part (e.g. a head) of the user (e.g., adjacent a user's eyes). The frame 810 may be coupled to one or more optical elements, which may be configured to display media to users. In some embodiments, the frame 810 may represent a frame of eye-wear glasses. The right display system 820R and the left display system 820L may be configured to enable the user to view content presented by the NED 800 and/or to view images of real-world objects (e.g., each of the right display system 820R and the left display system 820L may include a see-through optical element). In some embodiments, the right display system 820R and the left display system 820L may include any suitable display assembly (not shown) configured to generate a light (e.g., an image light corresponding to a virtual image) and to direct the image light to an eye of the user. In some embodiments, the NED 800 may include a projection system. For illustrative purposes, FIG. 8A shows the projection system may include a projector 835 coupled to the frame 810.

Figure 8B:
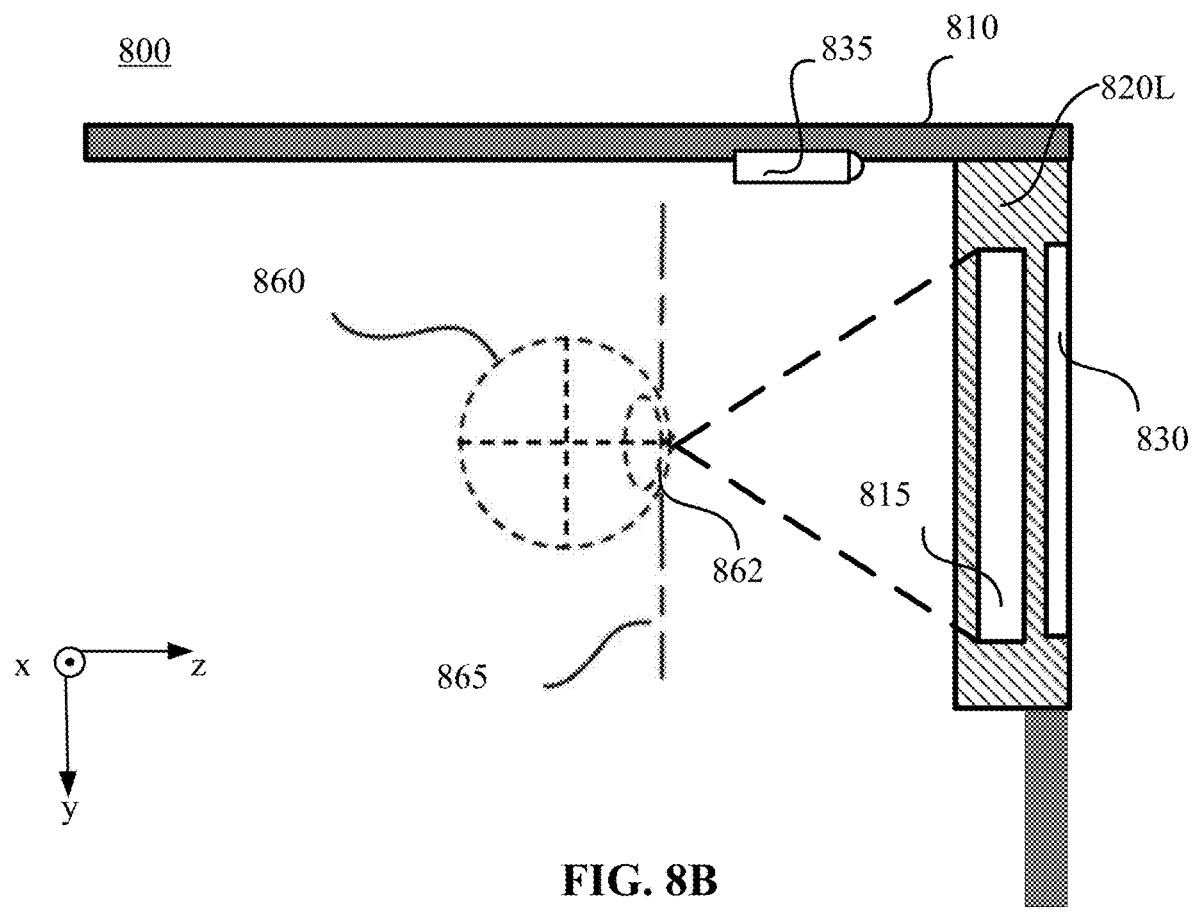
FIG. 8B illustrates a schematic cross sectional view of half of the NED shown in FIG. 8A, according to an embodiment of the present disclosure.

FIG. 8B is a cross-section view of half of the NED 800 shown in FIG. 8A in accordance with an embodiment of the present disclosure. For the purposes of illustration, FIG. 8B shows the cross-sectional view associated with the left display system 820L. As shown in FIG. 8B, the left display system 820L may include a waveguide display assembly 815 for an eye 860 of the user. The waveguide display assembly 815 may be an embodiment of the waveguide display system 700 shown in FIG. 7A. That is, the waveguide display assembly 815 may include one or more polarization selective gratings (e.g., PVH gratings) fabricated based on the disclosed processes and systems. The PVH gratings may serve as or be included in an in-coupling element and/or an out-coupling element. In some embodiments, the PVH grating may include a non-uniform diffraction efficiency in at least one dimension of the PVH grating. The illuminance of the image light diffracted out of a waveguide by the PVH at different locations (or pupils) may have an improved uniformity. The waveguide display assembly 815 may include a waveguide or a stack of waveguides. An exit pupil 862 may be a location where an eye 860 may be positioned in an eye-box 865 when the user wears the NED 800. Although one exit pupil 862 is shown for illustrative purposes, the NED 800 may provide a plurality of exit pupils within the eyebox 865. For the purposes of illustration, FIG. 8B shows the cross section view associated with a single eye 860 and a single waveguide display assembly 815. In some embodiments, another waveguide display assembly that is separate from and similar to the waveguide display assembly 815 shown in FIG. 8B may provide an image light to an eye-box located at an exit pupil of another eye of the user.

The waveguide display assembly 815 may include one or more materials (e.g., a plastic, a glass, etc.) with one or more refractive indices. In FIG. 8B, the waveguide display assembly 815 is shown as a component of the NED 800. In some embodiments, the waveguide display assembly 815 may be a component of some other NED or system that directs an image light to a particular location. As shown in FIG. 8B, the waveguide display assembly 815 may be provided for one eye 860 of the user. The waveguide display assembly 815 for one eye may be at least partially separated from the waveguide display assembly 815 for the other eye. In some embodiments, a single waveguide display assembly 815 may be included for both eyes 860 of the user.

In some embodiments, the NED 800 may include one or more optical elements disposed between the waveguide display assembly 815 and the eye 860. The optical elements may be configured to, e.g., correct aberrations in an image light output from the waveguide display assembly 815, magnify an image light output from the waveguide display assembly 815, or perform another type of optical adjustment of an image light output from the waveguide display assembly 815. Examples of the one or more optical elements may include an aperture, a Fresnel lens, a convex lens, a concave lens, a filter, any other suitable optical element that affects an image light, or a combination thereof. In some embodiments, the waveguide display assembly 815 may include a stack of waveguide displays (each waveguide display may include a waveguide, a light source assembly, an in-coupling element, and/or an out-coupling element). In some embodiments, the stacked waveguide displays may include a polychromatic display (e.g., a red-green-blue ("RGB") display) formed by stacking waveguide displays whose respective monochromatic light sources are configured to emit lights of different colors. For example, the stacked waveguide displays may include a polychromatic display configured to project image lights onto multiple planes (e.g., multi-focus colored display). In some embodiments, the stacked waveguide displays may include a monochromatic display configured to project image lights onto multiple planes (e.g., multi-focus monochromatic display). In some embodiments, the NED 800 may include an adaptive dimming element 830, which may dynamically adjust (when controlled by a controller, such as controller 715) the transmittance of lights reflected by real-world objects, thereby switching the NED 800 between a VR device and an AR device or between a VR device and an MR device. In some embodiments, along with switching between the AR/MR device and the VR device, the adaptive dimming element 830 may be used in the AR and/or MR device to mitigate differences in brightness of lights reflected by real-world objects and virtual image lights.

Figure 9:
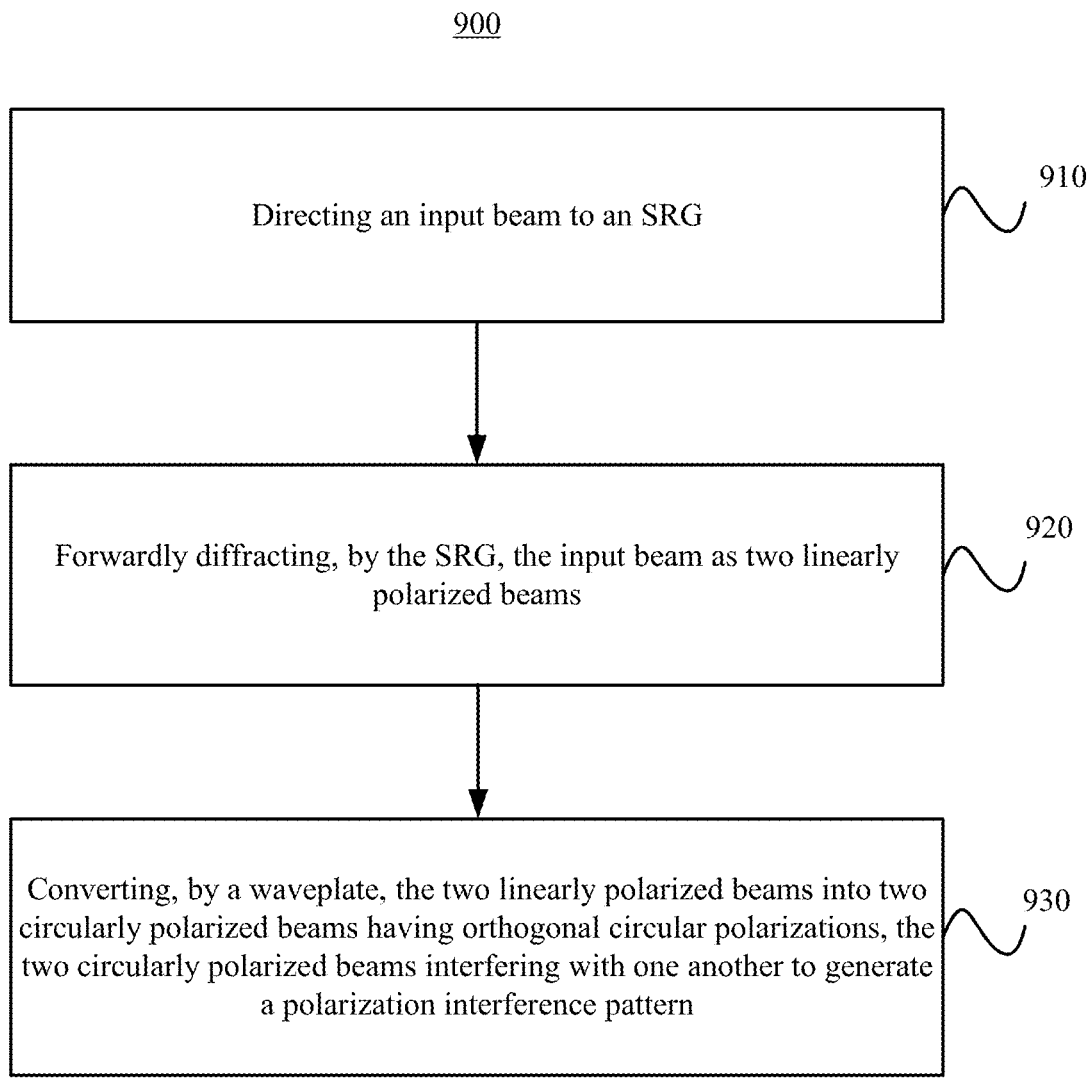
FIG. 9 illustrates a flowchart showing a method for fabricating a PSOE, according to an embodiment of the present disclosure.

The present disclosure also provides a method for fabricating a PSOE, such as a polarization selective grating. FIG. 9 illustrates a flowchart showing a method 900 for fabricating a PSOE, according to an embodiment of the present disclosure. As shown in FIG. 9, the method 900 may include directing an input beam to an SRG (Step 910). In some embodiments, the input beam may be an at least partially polarized input beam having a wavelength and an incidence angle. The method 900 may include forwardly diffracting, by the SRG, the input beam as two linearly polarized beams (Step 920). In some embodiments, the SRG may function as an optically isotropic element. In some embodiments, the SRG may function as an optically anisotropic element. In some embodiments, the SRG may be configured to operate at the Littrow configuration for the input beam with the predetermined incidence angle and the predetermined wavelength. In some embodiments, the two linearly polarized beams may include a $0^{th}$ order diffracted beam and a $-1^{st}$ order diffracted beam with orthogonal polarizations. In some embodiments, the two linearly polarized beams may include a $0^{th}$ order diffracted beam and a $-1^{st}$ order diffracted beam with a substantially same polarization. The diffraction angles of the $0^{th}$ order diffracted beam and $-1^{st}$ order diffracted beam may have a substantially same value and opposite signs. In some embodiments, the $0^{th}$ order diffracted beam and $-1^{st}$ order diffracted beam may have a substantially same light intensity.

The method 900 may include converting, by a waveplate, the two linearly polarized beams into two circularly polarized beams having orthogonal circular polarizations, the two circularly polarized beams interfering with one another to generate a polarization interference pattern (Step 930). In some embodiments, the waveplate may be indirectly optically coupled to the SRG with an intermediate optical element disposed therebetween that may or may not change at least one of the polarization or the propagating direction of the beams. In some embodiments, the waveplate may be directly optically coupled to the SRG without an optical element disposed and/or a gap therebetween. An angle formed between the two circularly polarized beams having orthogonal circular polarizations may be substantially equal to the angle formed between the $0^{th}$ order diffracted beam and the $-1^{st}$ order diffracted beam output from the SRG. In some embodiments, the two circularly polarized beams having orthogonal circular polarizations may have a substantially equal light intensity. In some embodiments, the two circularly polarized beams having orthogonal circular polarizations may have different light intensities.

In some embodiments, the method 900 may include additional steps that are not shown in FIG. 9. In some embodiments, the method 900 may include directing the two circularly polarized beams having orthogonal circular polarizations to a same surface of a polarization sensitive recording medium layer. The two circularly polarized beams having orthogonal circular polarizations may interfere with one another in a predetermined 3D space within which the polarization sensitive recording medium layer is located. The polarization sensitive recording medium layer may be exposed to the polarization interference pattern generated by the interference of the two circularly polarized beams having orthogonal circular polarizations. During the exposure process, the polarization interference pattern may be recorded at (e.g., in or on) the polarization sensitive recording medium layer to define an orientation pattern of an optic axis of the polarization sensitive recording medium layer. In some embodiments, the orientation pattern of the optic axis of the polarization sensitive recording medium layer may correspond to a grating pattern.

In some embodiments, the polarization sensitive recording medium layer may include a photo-sensitive polymer (or photo-polymer), e.g., an amorphous polymer, an LC polymer, etc. In some embodiments, after being exposed to the polarization interference pattern, the polarization sensitive recording medium layer (also referred to as "exposed polarization sensitive recording medium layer") may function as a polarization selective grating, such as a PBP grating, or a PVH grating, etc. In some embodiments, the method 900 may also include annealing the exposed polarization sensitive recording medium layer in a predetermined temperature range. For example, when the polarization sensitive recording medium layer includes LC polymer, the predetermined temperature range may correspond to a liquid crystalline state of the LC polymer.

In some embodiments, the polarization sensitive recording medium layer may include a photo-alignment material. The exposed polarization sensitive recording medium layer may function as a surface alignment layer. The method 900 may also include forming a birefringent medium layer on the polarization sensitive recording medium layer. In some embodiments, the birefringent medium layer may include a birefringent medium with or without a chirality. For example, the birefringent medium layer may include at least one of LCs or RMs with or without a chirality. In some embodiments, the exposed polarization sensitive recording medium layer may be annealed in a predetermined temperature range corresponding to a nematic phase of the LCs or RMs. In some embodiments, the method 900 may also include polymerizing the birefringent medium layer. In some embodiments, the polymerized birefringent medium layer may function as a polarization selective grating, such as a PBP grating, or a PVH grating, etc.

In some embodiments, the method may include recording a plurality of polarization interference patterns to a plurality of regions or portions in the polarization sensitive recording medium layer. For example, a first polarization interference pattern may be generated using an input beam having a first wavelength, incident onto a first SRG at a first incidence angle, which diffracts the input beam into a first group of two linearly polarized beams (e.g., the $0^{th}$ order diffracted beam and the $-1^{st}$ order diffracted beam). In some embodiments, the two linearly polarized beams (e.g., the $0^{th}$ order diffracted beam and the $-1^{st}$ order diffracted beam) of the first group may have orthogonal linear polarizations. In some embodiments, the two linearly polarized beams (e.g., the $0^{th}$ order diffracted beam and the $-1^{st}$ order diffracted beam) of the first group may have a substantially same linear polarization. A waveplate may convert the first group of two linearly polarized beams into a first group of two circularly polarized beams having orthogonal circular polarizations, which may interference with one another to generate a polarization interference pattern. One or more first recording regions or portions of the polarization sensitive recording medium layer may be exposed to the polarization interference pattern, which may be recorded in the one or more first recording regions.

In some embodiments, a second polarization interference pattern may be recorded at one or more second recording regions. The method may include replacing the first SRG with a second SRG, which may be different from the first SRG. The method may include adjusting at least one of a wavelength of the input beam, or a relative position or a relative orientation between the polarization sensitive recording medium layer and the input beam incident onto the second SRG. The method may include forwardly diffracting, by the second SRG, the input beam as a second group of two linearly polarized beams. In some embodiments, the two linearly polarized beams (e.g., the $0^{th}$ order diffracted beam and the $-1^{st}$ order diffracted beam) of the second group may have orthogonal linear polarizations. In some embodiments, the two linearly polarized beams (e.g., the $0^{th}$ order diffracted beam and the $-1^{st}$ order diffracted beam) of the second group may have a substantially same linear polarization. The method may include converting, by the waveplate, the two linearly polarized beams into a second group of two circularly polarized beams having orthogonal circular polarizations, the second group of two circularly polarized beams interfering with one another to generate a second polarization interference pattern. The method may also include recording the second polarization interference pattern in one or more second regions or portions of the polarization sensitive recording medium layer.

The present disclosure also provides an efficient and cost-effective system and method using a transmissive PVH element as a mask (also referred to as a PVH mask) for fabricating PSOEs or polarization holograms, e.g., lenses, gratings, waveplates, etc., with a large adjustment range of the in-plane pitch. For example, PSOEs or polarization holograms with a fine in-plane pitch (e.g., 200 nm to 800 nm) may be fabricated based on the disclosed system and method. The transmissive PVH mask is also a type of a PSOE, and it is used as a mask during the process of fabricating other PSOEs or polarization holograms. The PVH mask may be configured to forwardly diffract an input beam into two polarized beams propagating in two different directions. The two polarized beams may be a signal beam carrying optical information or properties of the PVH mask, and a reference beam. The two polarized beams may have the same handedness. For example, the PVH mask may forwardly diffract the input beam into two beams of different diffraction orders (e.g., $0^{th}$ order and $1^{st}$ order, etc.). Although splitting into two beams is used as an example, the present disclosure is not limited to splitting the input beam into two polarized beams propagating in different directions. In some embodiments, the PVH mask may be configured to split the input beam into more than two beams in different directions. The two or more beams may interference with one another to generate a polarization interference pattern, which may be recorded in a recording medium layer.

The present disclosure provides a system including a mask configured to forwardly diffract an input beam as a first set of two polarized beams. The system also includes a polarization conversion element configured to convert the first set of two polarized beams into a second set of two polarized beams having opposite handednesses. The two polarized beams having opposite handednesses interfere with one another to generate a polarization interference pattern. In some embodiments, the mask includes a transmissive polarization volume hologram ("PVH") element. In some embodiments, the transmissive PVH element includes a transmissive PVH grating or a PVH lens. In some embodiments, the two polarized beams in the first set include a $0^{th}$ order diffracted beam and a $1^{st}$ order diffracted beam. In some embodiments, the two polarized beams in the first set have a substantially same light intensity. In some embodiments, the two polarized beams in the first set have planar wavefronts. In some embodiments, propagation directions of the two polarized beams in the first set are symmetric or asymmetric with respect to a normal of a surface of the mask. In some embodiments, at least one of the two polarized beams in the first set has a non-planar wavefront. In some embodiments, the polarization conversion element includes an oblique compensation plate ("O-plate").

In some embodiments, the first set of two polarized beams includes a first polarized beam having a first incidence angle relative to the O-plate, and a second polarized beam having a second incidence angle relative to the O-plate. In some embodiments, the O-plate is configured to provide a half-wave retardance to the first polarized beam having the first incidence angle, and a zero or full-wave retardance to the second polarized beam having the second incidence angle. In some embodiments, the first incidence angle is within a predetermined angle range, and the second incidence angle is outside of the predetermined angle range.

In some embodiments, the system includes a light deflecting element configured to direct the input beam toward the mask. In some embodiments, the system also includes a movable stage configured to support the light deflecting element, and adjust at least one of an orientation or a position of the light deflecting element to change an incidence angle of the input beam incident onto the mask. In some embodiments, the system includes a movable stage configured to support the mask, the polarization conversion element, and a recoding medium layer. The movable stage is movable to adjust at least one of a position or an orientation of the recoding medium layer.

In some embodiments, the present disclosure also provides a method. The method may include directing an input beam to a mask. In some embodiments, the method may include forwardly diffracting, by the mask, the input beam as a first set of two polarized beams. In some embodiments, the method may include converting, by a polarization conversion element, the first set of two polarized beams into a second set of two polarized beams having opposite handednesses, the two polarized beams having opposite handednesses interfering with one another to generate a polarization interference pattern.

In some embodiments, the method may include directing the second set of two polarized beams having opposite handednesses to a same surface of a recording medium layer. In some embodiments, the method may include exposing at least one portion of the recording medium layer to the polarization interference pattern to record the polarization interference pattern in the at least one portion. In some embodiments, the polarization interference pattern recorded in the at least one portion of the recording medium layer defines an orientation pattern of an optic axis in the at least one portion of the recording medium layer.

In some embodiments, the mask is a first mask, the polarization interference pattern is a first polarization interference pattern, and the first polarization interference pattern is recorded in a first portion of the recording medium layer. The method may also include replacing the first mask with a second mask. In some embodiments, the method may include converting, by the polarization conversion element, the third set of two polarized beams into a fourth set of two polarized beams having opposite handednesses, the two polarized beams having opposite handednesses in the fourth set interfering with one another to generate a second polarization interference pattern. In some embodiments, the method may include recording the second polarization interference pattern in a second portion of the recording medium layer.

In some embodiments, the polarization interference pattern is a first polarization interference pattern, and the first polarization interference pattern is recorded in a first portion of the recording medium layer. In some embodiments, the method may also include adjusting at least one of a wavelength of the input beam, an incidence angle of the input beam with respect to the mask, or a relative position or a relative orientation between the recording medium layer and the input beam. In some embodiments, the method may also include forwardly diffracting, by the mask, the input beam as a third set of two polarized beams. In some embodiments, the method may also include converting, by the polarization conversion element, the third set of two polarized beams into a fourth set of two polarized beams having opposite handednesses, the two polarized beams having opposite handednesses in the fourth set interfering with one another to generate a second polarization interference pattern. In some embodiments, the method may also include recording the second polarization interference pattern in a second portion of the recording medium layer.

In some embodiments, the recording medium layer includes a surface photo-alignment material. In some embodiments, the method also includes forming a birefringent medium layer on the recording medium layer after the polarization interference pattern is recorded in the recording medium. In some embodiments, the recording medium layer includes a bulk photo-alignment material. In some embodiments, the two polarized beams in the first set include a $0^{th}$ order diffracted beam, and a $1^{st}$ order diffracted beam. In some embodiments, the mask includes a transmissive polarization volume hologram ("PVH") element.

Figure 11A:
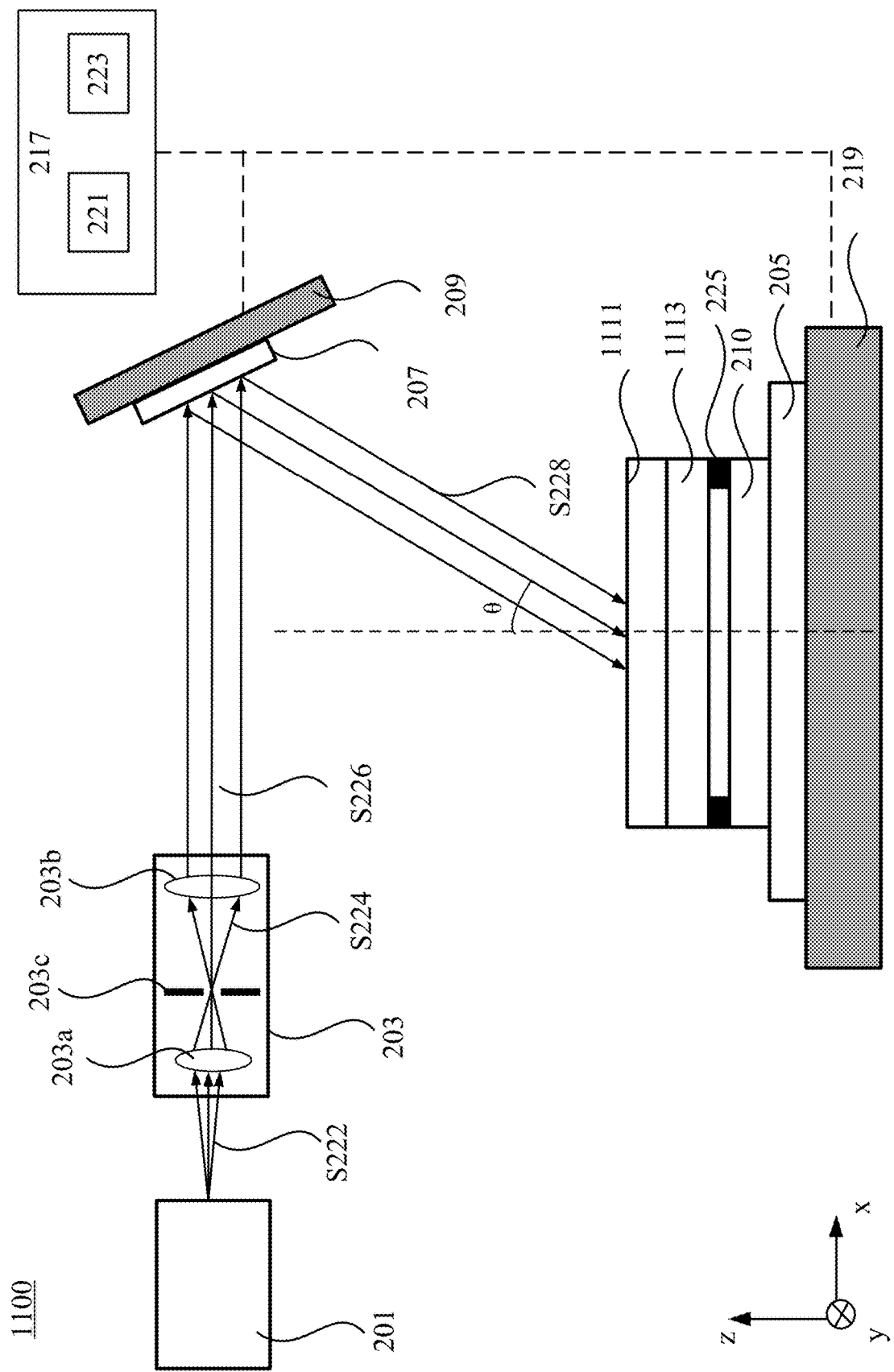
FIG. 11A schematically illustrates a system for generating a polarization interference, according to an embodiment of the present disclosure.
Figure 11B:
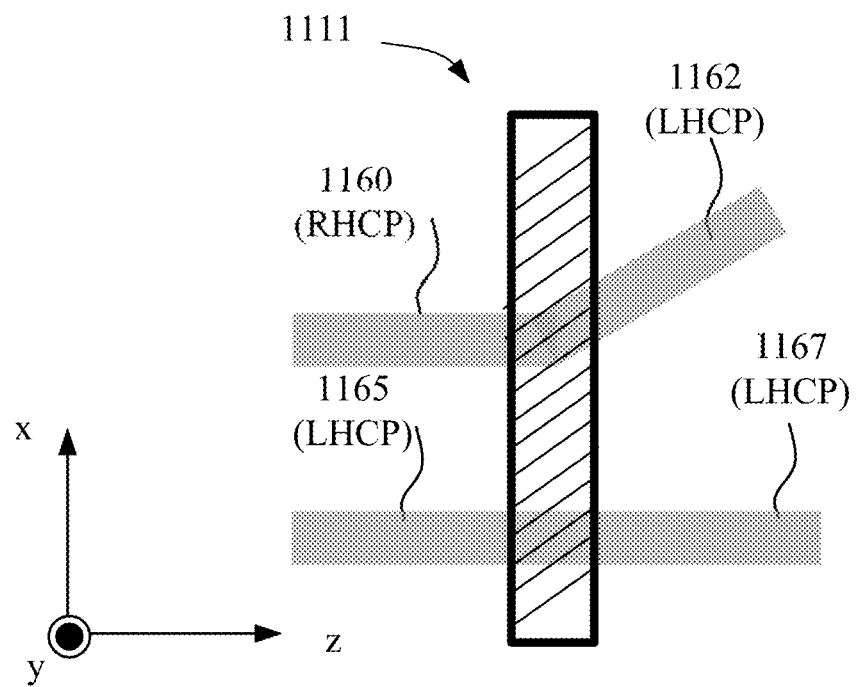
FIG. 11B schematically illustrates polarization selective diffractions of a transmissive polarization volume hologram ("PVH") element that may be included in the system shown in FIG. 11A, according to an embodiment of the present disclosure.
Figure 11C:
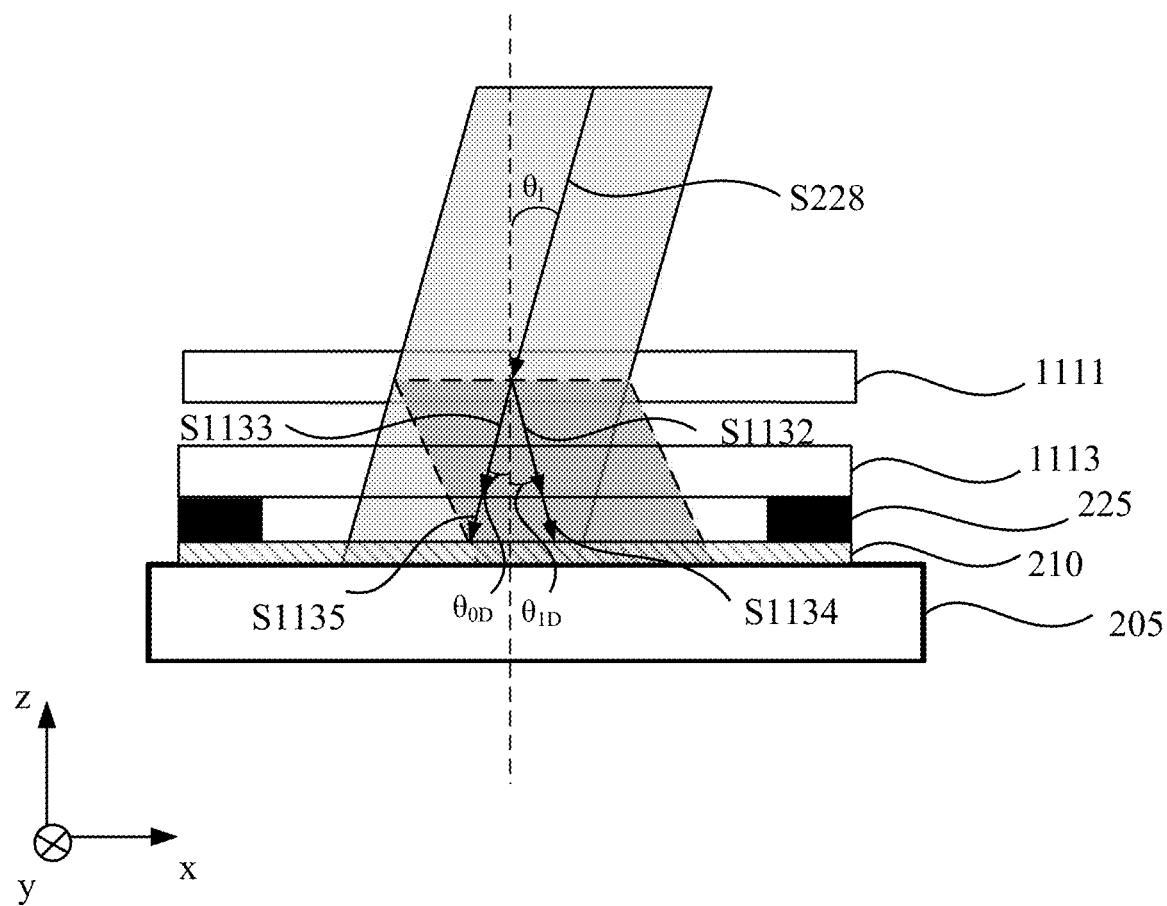
FIG. 11C schematically illustrates a diagram of a transmissive PVH element and a compensation plate, which may be included in the system shown in FIG. 11A, according to an embodiment of the present disclosure.
Figure 11D:
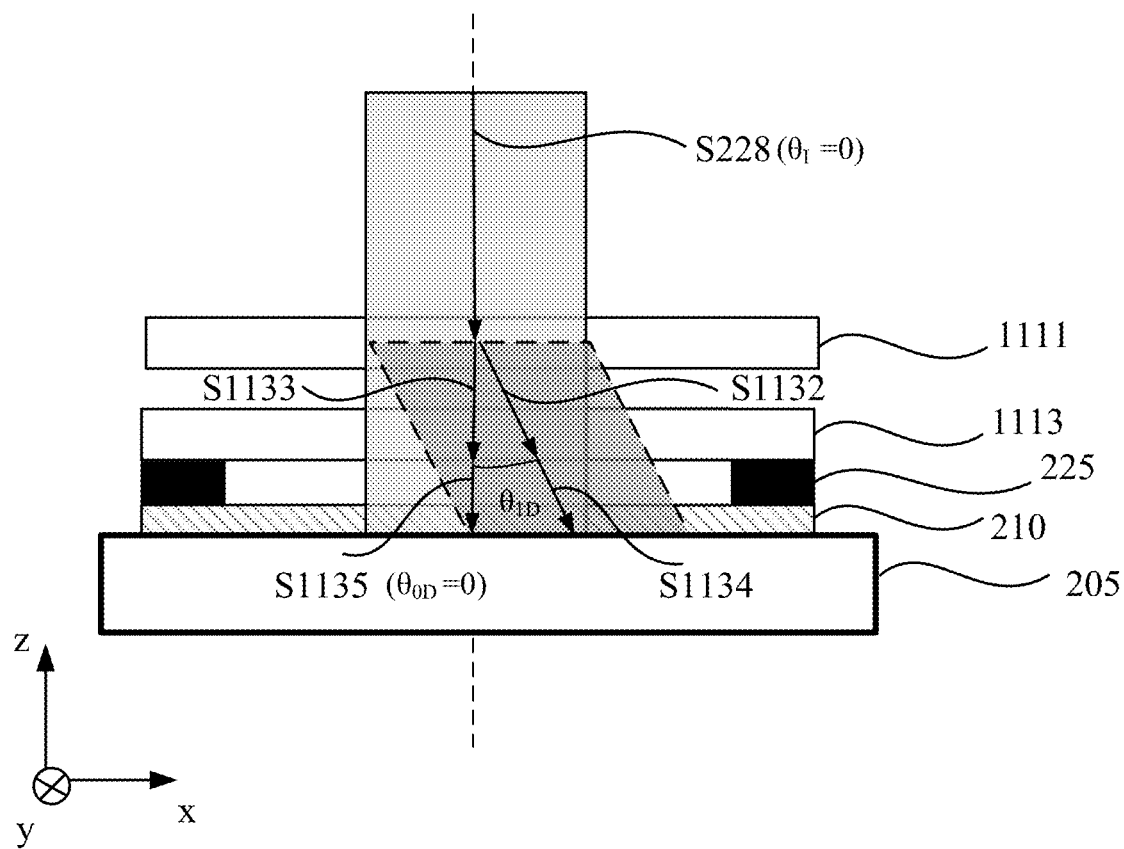
FIG. 11D schematically illustrates a diagram of a transmissive PVH element and a compensation plate, which may be included in the system shown in FIG. 11A, according to an embodiment of the present disclosure.
Figure 11E:
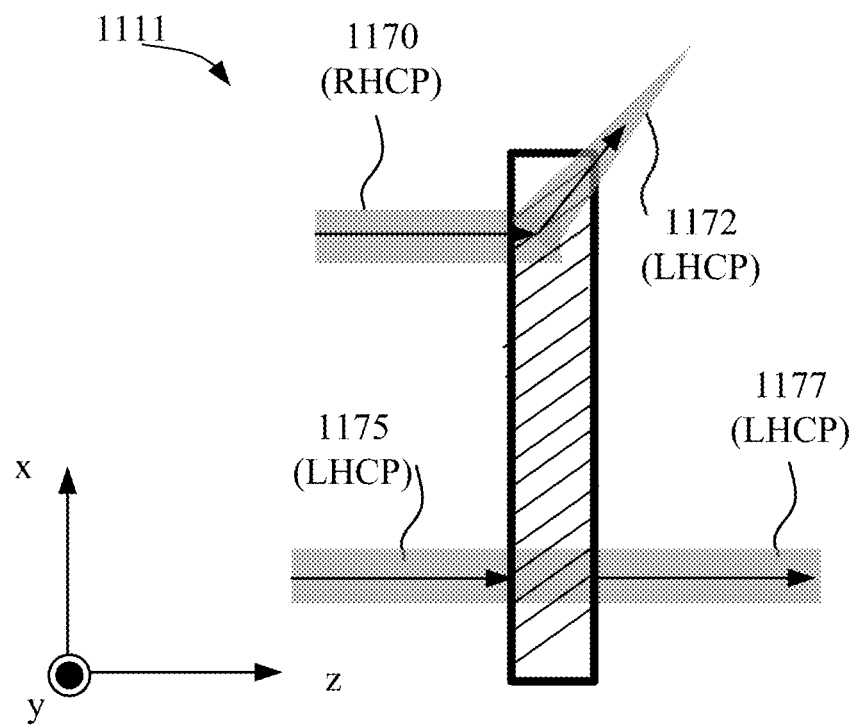
FIG. 11E schematically illustrates polarization selective diffractions of a transmissive PVH element that may be included in the system shown in FIG. 11A, according to an embodiment of the present disclosure.
Figure 11F:
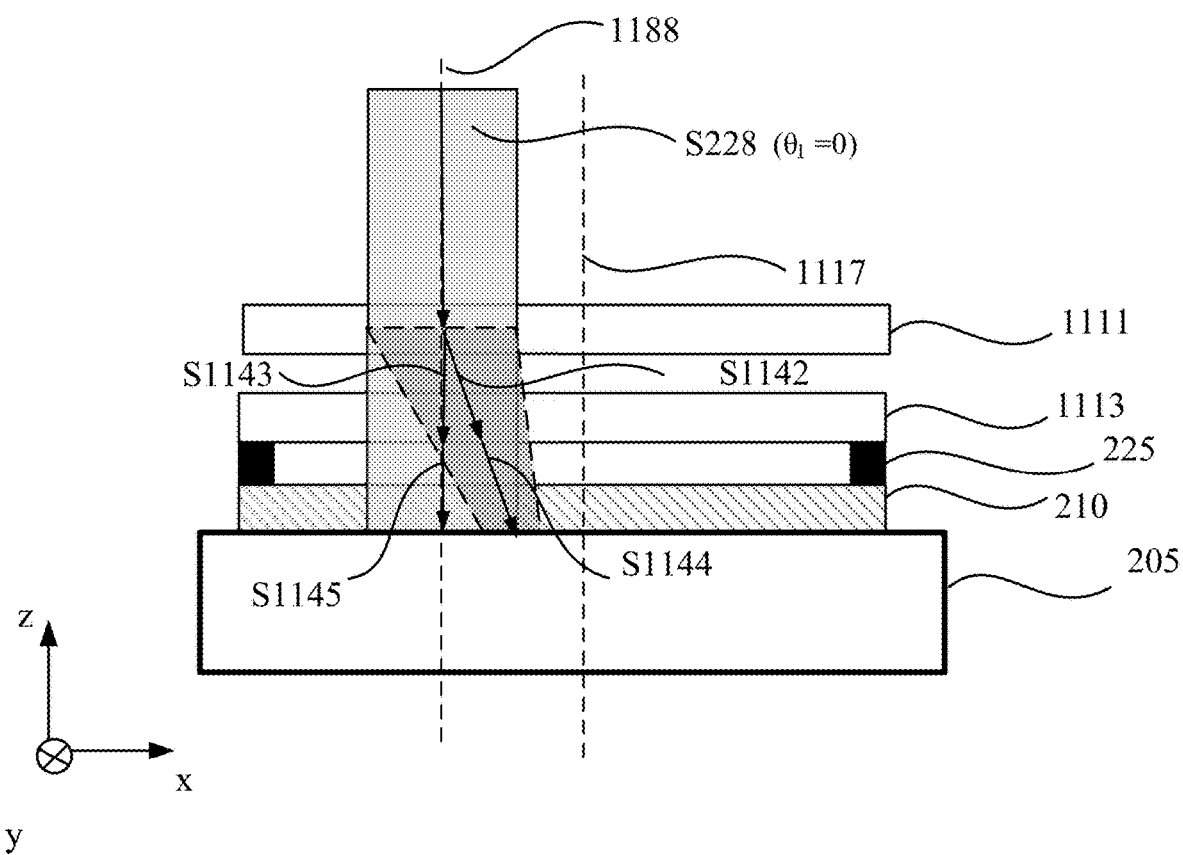
FIG. 11F schematically illustrates a diagram of a transmissive PVH element and a compensation plate, which may be included in the system shown in FIG. 11A, according to an embodiment of the present disclosure.
Figure 11G:
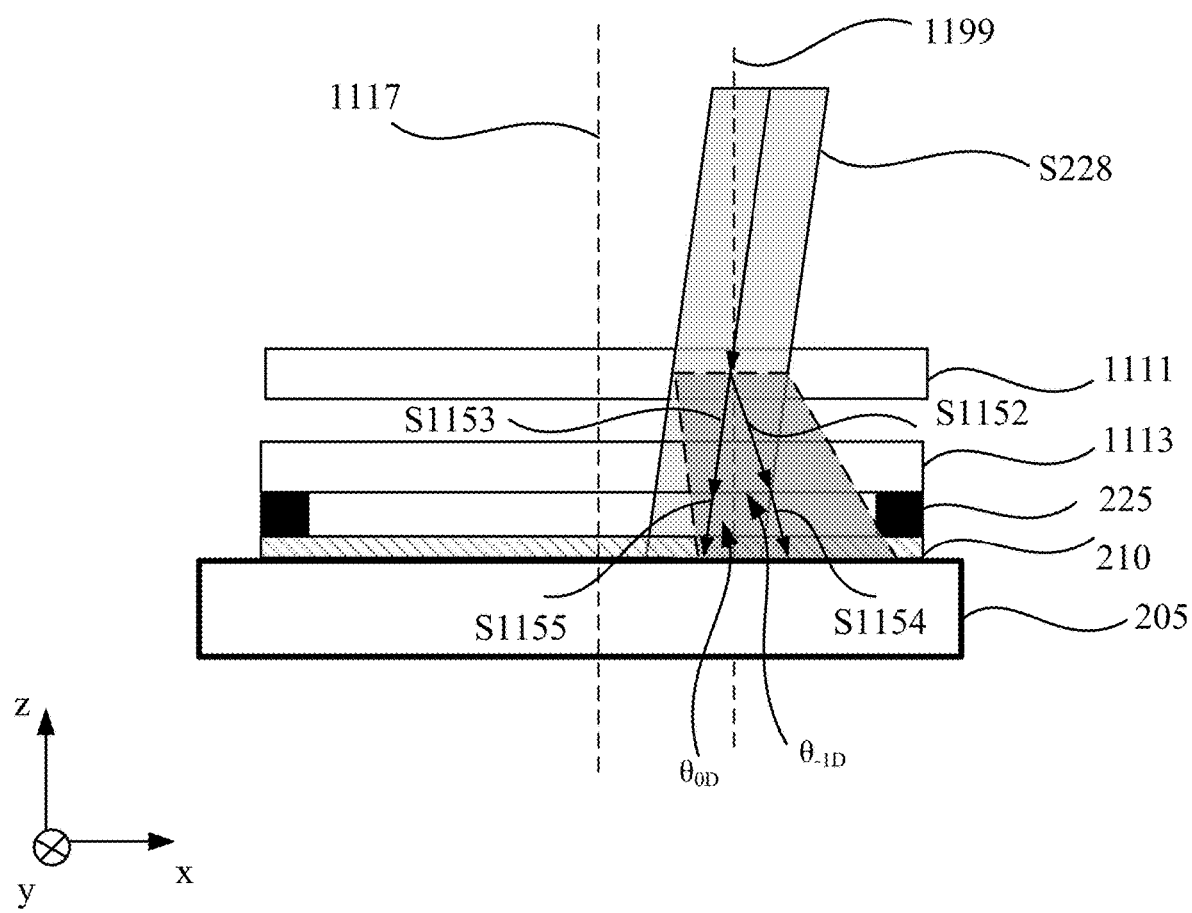
FIG. 11G schematically illustrates a diagram of a transmissive PVH element and a compensation plate, which may be included in the system shown in FIG. 11A, according to an embodiment of the present disclosure.
Figure 12:
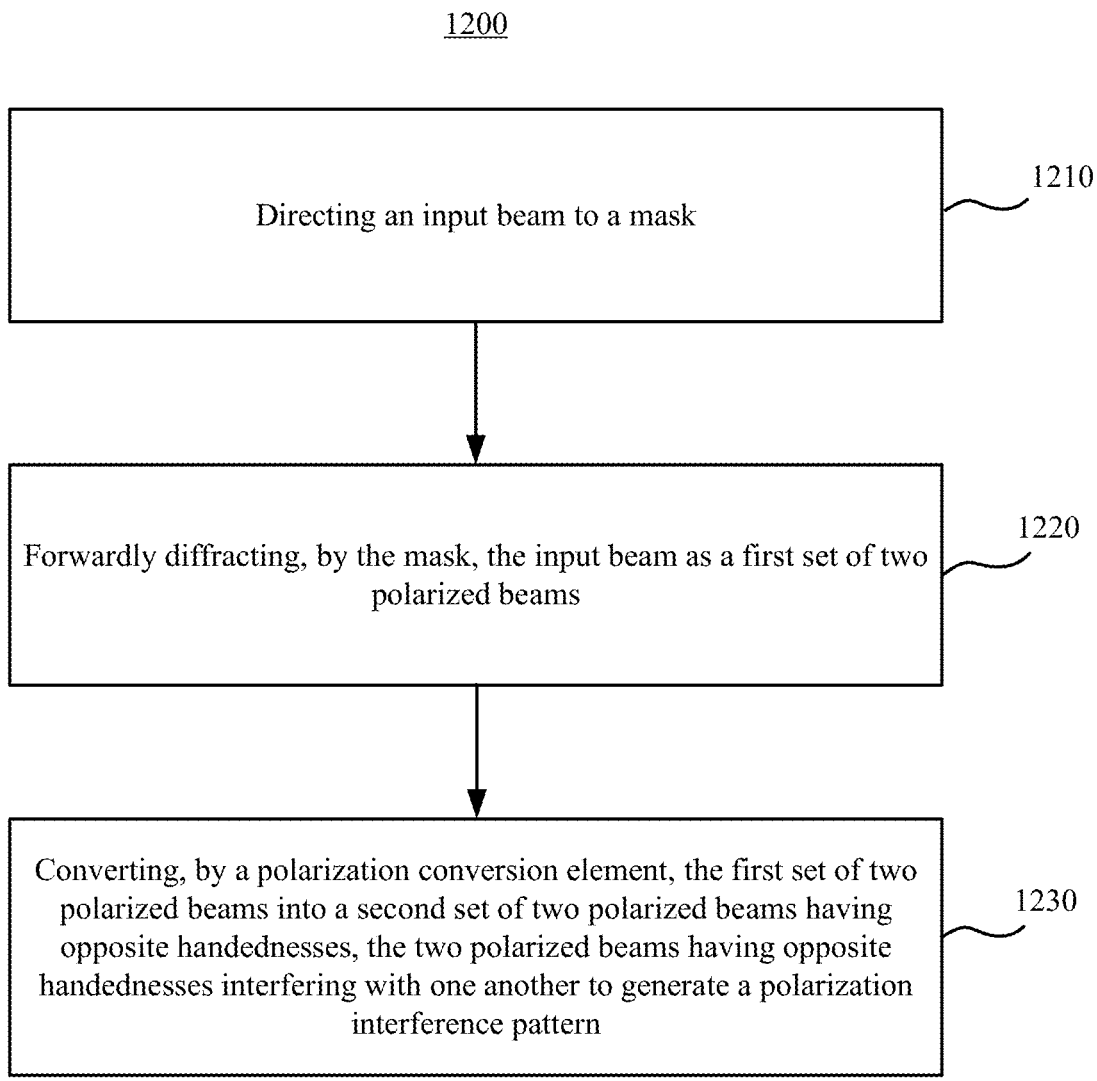
FIG. 12 illustrates a flowchart showing a method for fabricating a PSOE, according to an embodiment of the present disclosure.

It is noted that all features shown in FIGS. 1A-10 may be included in the embodiments shown in FIGS. 11A-12 in a suitable manner. Conversely, all features shown in FIGS. 11A-12 may be included in any embodiment shown in FIGS. 1A-10 in a suitable manner. That is, the features shown in FIGS. 1A-12 may be combined.

FIG. 11A schematically illustrates a system (e.g., an interference system) 1100 configured to generate a polarization interference pattern that may be recorded in the recording medium layer 210, according to an embodiment of the present disclosure. The system 1100 may include elements, structures, and/or functions that are the same as or similar to those included in the system 200 shown in FIGS. 2A-2D. Descriptions of the same or similar elements, structures, and/or functions can refer to the above descriptions rendered in connection with FIGS. 2A-2D.

As shown in FIG. 11A, the system 1100 may include the light source 201, the beam conditioning device 203, the reflector (e.g., mirror) 207 mounted on the first movable stage 209, a PVH mask 1111, and a polarization conversion element 1113. A transmissive PVH mask is used as an example of the PVH mask 1111. Hence, the PVH mask 1111 may also be referred to as a transmissive PVH element 1111 for discussion purposes. In the following discussions, a compensation plate is used as an example of the polarization conversion element 1113. For discussion purposes, the polarization conversion element 1113 may also be referred to as a compensation plate 1113. It is noted the polarization conversion element 1113 is not limited to being a compensation plate, and may be any other suitable polarization conversion elements that can convert a polarization of a beam.

The system 1100 is based on the system 200 shown in FIGS. 2A-2D. In the system 1100, the SRG 211 shown in FIGS. 2A-2D may be replaced by the transmissive PVH element 1111, and the waveplate 213 shown in FIGS. 2A-2D may be replaced by the compensation plate 1113. The recording medium layer 210 may be disposed on the substate 205. In some embodiments, the substate 205 may be mounted on the second movable stage 219. The transmissive PVH element 1111 and the compensation plate 1113 may be disposed in parallel. In the embodiment shown in FIG. 11A, the transmissive PVH element 1111 is shown as being spaced apart from the compensation plate 1113 by a gap. In some embodiments, the transmissive PVH element 1111 and the compensation plate 1113 may be stacked without a gap (e.g., through direct contact). In some embodiments, the transmissive PVH element 1111 may include at least one of sub-wavelength structures, a birefringent material, or a photo-refractive holographic material. The optic axis of the transmissive PVH element 1111 may periodically or non-periodically vary in at least one in-plane linear direction, in at least one in-plane radial direction, in at least one in-plane circumferential (e.g., azimuthal) direction, or a combination thereof. In some embodiments, the optic axis of the transmissive PVH element 1111 may also be configured with a spatially varying orientation in an out-of-plane direction. In some embodiments, the transmissive PVH element 1111 may modulate (e.g., diffract) an input beam satisfying a Bragg condition through Bragg diffraction.

In some embodiments, the transmissive PVH element 1111 may include a transmissive PVH grating (also referred to as 1111 for discussion purposes). In some embodiments, the optic axis of the transmissive PVH grating 1111 may be configured with a periodic in-plane orientation pattern with a uniform (e.g., same) in-plane pitch $P_{in}$ in a predetermined in-plane direction. In some embodiments, within a volume of the transmissive PVH grating 1111, the optic axis of the transmissive PVH grating 1111 may be twisted in a helical fashion. In some embodiments, the transmissive PVH grating 1111 may include a birefringent medium layer (e.g., an LC layer). The optically anisotropic molecules (e.g., LC molecules) of the birefringent medium layer may be configured with a periodic in-plane orientation pattern with a uniform (e.g., same) in-plane pitch $P_{in}$ in a predetermined in-plane direction, e.g., similar to that shown in FIG. 1B or FIG. 1C. In some embodiments, within a volume of the birefringent medium layer, the optically anisotropic molecules (e.g., LC molecules) may be arranged in a plurality of helical structures to form Bragg planes, e.g., similar to the that shown in FIG. 1E. The transmissive PVH grating 1111 may function as a mask for surface (or volume) recording a grating pattern into the recording medium layer 210. A PSOE fabricated based on the exposed recording medium layer 210 may be a polarization selective grating, e.g., a PBP grating, a PVH grating, etc.

FIG. 11B illustrates polarization selective diffractions of the transmissive PVH grating 1111, according to an embodiment of the present disclosure. In some embodiments, the transmissive PVH grating 1111 may be configured to substantially forwardly diffract (via Bragg diffraction) a polarized beam (e.g., circularly, or elliptical polarized beam) having a predetermined handedness, and substantially transmit (e.g., with negligible diffraction) a polarized beam (e.g., circularly, or elliptical polarized beam) having a handedness that is opposite to the predetermined handedness. In addition, the transmissive PVH grating 1111 may be configured to reverse a handedness of the diffracted beam, and substantially maintain a handedness of the transmitted beam. For example, a left-handed transmissive PVH grating may be configured to substantially forwardly diffract an LHCP beam as an RHCP beam, and substantially transmit (e.g., with negligible diffraction) an RHCP beam as an RHCP beam. A right-handed transmissive PVH grating may be configured to substantially forwardly diffract an RHCP beam as an LHCP beam, and substantially transmit (e.g., with negligible diffraction) an LHCP beam as an LHCP beam.

For discussion purposes, FIG. 11B shows the transmissive PVH grating 1111 as a right-handed transmissive PVH grating. For discussion purposes, as shown in FIG. 11B, the transmissive PVH grating 1111 may be configured to substantially forwardly diffract an RHCP beam 1160 as a diffracted beam (e.g., which is the 1st order diffracted beam) 1162, and substantially transmit (e.g., with negligible diffraction) an LHCP beam 1165 as a transmitted beam (which is the $0^{th}$ order diffracted beam) 1167. In some embodiments, the diffracted beam 1162 may be an LHCP beam, and the transmitted beam 1167 may be an LHCP beam. For a linearly polarized input beam or an unpolarized input beam including an RHCP component and an LHCP component, the transmissive PVH grating 1111 may be configured to substantially forwardly diffract the RHCP (or LHCP) component, and substantially transmit (e.g., with negligible diffraction) the LHCP (or RHCP) component. In other words, the transmissive PVH grating 1111 may be configured to forwardly diffract the input beam as a $-1^{st}$ order diffracted beam and a $0^{th}$ order diffracted beam (that is a transmitted beam without negligible diffraction), which may be two circularly polarized beams having the same handedness. Although not shown, in some embodiments, the transmissive PVH grating 1111 may also provide polarization selective diffractions to elliptically polarized beams.

FIGS. 11C and 11D schematically illustrate diagrams of the transmissive PVH grating 1111 and the compensation plate 1113, which may be included in the system 1000 shown in FIG. 11A, according to various embodiments of the present disclosure. In some embodiments, the incident beam S228 of the transmissive PVH grating 1111 may be at least partially polarized. For discussion purposes, in FIGS. 11C and 11D, the incident beam S228 may be a linearly polarized beam with an incidence angle $\theta_I$ and a wavelength $\lambda$. The transmissive PVH grating 1111 may be configured to forwardly diffract the incident beam S228 as a $1^{st}$ order diffracted beam S1132 and a $0^{th}$ order diffracted beam S1133 (that is a transmitted beam with negligible diffraction). In some embodiments, the $-1^{st}$ order diffracted beam S1132 and the $0^{th}$ order diffracted beam S1133 may be two polarized beams with the same handedness, e.g., two circularly polarized beams with the same handedness. In some embodiments, the $-1^{st}$ order diffracted beam S1132 and the $0^{th}$ order diffracted beam S1133 may have a substantially same light intensity. A diffraction angle $\theta_{1D}$ of the 1st order diffracted beam S1132 may be determined, in part, by the incidence angle $\theta_I$ of the incident beam S228, the wavelength $\lambda$ of the incident beam S228, and an in-plane pitch $P_{M-in}$ of the transmissive PVH grating 1111. In other words, the optical properties of the transmissive PVH grating 1111 (functioning as a mask) may be encoded into the $1^{st}$ order diffracted beam (e.g., LHCP beam) S1132. The $1^{st}$ order diffracted beam (e.g., LHCP beam) S1132 may be referred to as a signal beam, which may carry or may be encoded with the optical properties or optical information of the transmissive PVH grating 1111. A diffraction angle $\theta_{0D}$ of the $0^{th}$ order diffracted beam S1133 may be substantially equal to the incidence angle $\theta_I$ of the incident beam S228, i.e., $\theta_{0D}=\theta_I$. The $0^{th}$ order diffracted beam (e.g., LHCP beam) S1133 may be referred to as a reference beam, which may not carry, or may carry an insignificant amount of optical information of the transmissive PVH grating 1111. An angle between the $0^{th}$ order diffracted beam S1133 and the $-1^{st}$ order diffracted beam S1132 may be determined, in part, by the incidence angle $\theta_I$ of the incident beam S228, the wavelength $\lambda$ of the incident beam S228, and an in-plane pitch $P_{M-in}$ of the transmissive PVH grating 1111.

The compensation plate 1113 may be configured to receive the $0^{th}$ order diffracted beam S1133 and the −1st order diffracted beam S1132 (e.g., two circularly polarized beams with the same handedness) from the transmissive PVH grating 1111, and convert the $0^{th}$ order diffracted beam S1133 and the 1st order diffracted beam S1132 into two polarized beams S1135 and S1134 with opposite handednesses (e.g., (e.g., two circularly polarized beams with the same handedness). The optical anisotropy of the compensation plate 1113 may be configured to be one of a positive anisotropy, a negative anisotropy, or a biaxial anisotropy. In some embodiments, an orientation of the compensation plate 1113 and a phase retardance provided by the compensation plate 1113 at the wavelength $\lambda$ of the incident beam S228 may be configured, such that the compensation plate 1113 may be configured to provide a half-wave phase retardance (e.g., in-plane phase retardance) to a polarized beam having an incidence angle within a predetermined angle range, thereby converting a polarization of the polarized beam to an orthogonal polarization while transmitting the polarized beam. For a polarized beam having an incidence angle outside of the predetermined angle range, the compensation plate 1113 may be configured to substantially maintain a polarization of the polarized beam while transmitting the polarized beam. In some embodiments, the orientation of the compensation plate 1113 (e.g., an orientation of a predetermined principal axis of the compensation plate 1113) may be adjusted through rotating a movable stage (not shown), on which the compensation plate 1113 is mounted.

In some embodiments, the compensation plate 1113 may include an oblique compensation plate ("O-plate") (also referred to as 1113 for discussion purposes). In some embodiments, the O-plate 1113 may be configured to change a polarization of a polarized beam that is obliquely incident onto the O-plate 1113, and substantially maintain a polarization of a polarized beam that is substantially normally incident onto the O-plate 1113. In some embodiments, the O-plate 1113 may be configured to change a polarization of a polarized beam having an oblique incidence angle within a predetermined angle range, and substantially maintain a polarization of a polarized beam having an oblique incidence angle outside of the predetermined angle range. The O-plate 1113 may be configured to convert a handedness of one of the $0^{th}$ order diffracted beam S1133 or the $-1^{st}$ order diffracted beam S1132 to an opposite handedness, and substantially maintain a handedness of the other one of the $0^{th}$ order diffracted beam S1133 or the $-1^{st}$ order diffracted beam S1132, thereby converting the $0^{th}$ order diffracted beam S1133 and the −1st order diffracted beam S1132 (e.g., two circularly polarized beams with the same handedness) into two polarized beams S1135 and S1134 with opposite handednesses (e.g., two circularly polarized beams with opposite handednesses). In the disclosed embodiments, the O-plate 1113 may be configured to substantially maintain the propagation direction and the wavefront of a beam transmitted therethrough. Thus, an angle formed between the polarized beams S1135 and S1134 may be substantially equal to the angle formed between the $0^{th}$ order diffracted beam S1133 and the −1st order diffracted beam S1132.

For discussion purposes, in FIGS. 11C and 11D, the transmissive PVH grating 1111 may be a right-handed transmissive PVH grating configured to forwardly diffract an RHCP component of the incident beam (e.g., linearly polarized beam) S228 and an LHCP component of the incident beam (e.g., linearly polarized beam) S228 to the $-1^{st}$ order diffracted beam (e.g., LHCP beam) S1132 and the $0^{th}$ order diffracted beam (e.g., LHCP beam) S1133 (that is a transmitted beam with negligible diffraction), respectively. For discussion purposes, the O-plate 1113 may be configured to convert a handedness of the $-1^{st}$ order diffracted beam (e.g., LHCP beam) S1132 to an opposite handedness, and substantially maintain a handedness of the $0^{th}$ order diffracted beam (e.g., LHCP beam) S1133. Thus, the O-plate 1113 may be configured to transmit the $-1^{st}$ order diffracted beam (e.g., LHCP beam) S1132 as the polarized beam (e.g., RHCP beam) S1134 with the handedness reversed, and transmit the $0^{th}$ order diffracted beam (e.g., LHCP beam) S1133 as the polarized beam (e.g., LHCP beam) S1135 with the handedness maintained.

The polarized beam (e.g., RHCP beam) S1134 and the polarized beam (e.g., LHCP beam) S1135 with opposite handednesses may propagate toward a same surface of the recording medium layer 210. In other words, the polarized beam (e.g., RHCP beam) S1134 and the polarized beam (e.g., LHCP beam) S1135 with opposite handednesses may propagate toward the recording medium layer 210 from the same side of the recording medium layer 210. The polarized beam (e.g., RHCP beam) S1134 and the polarized beam (e.g., LHCP beam) S1135 with opposite handednesses may interfere with each other in space to generate a polarization interference pattern, to which the recording medium layer 210 may be exposed. In the embodiments shown in FIGS. 11C and 11D, the superposition of the polarized beam (e.g., RHCP beam) S1134 and the polarized beam (e.g., LHCP beam) S1135 may result in a superposed wave that has a substantially uniform intensity and a linear polarization with a spatially periodically varying orientation (or a spatially periodically varying linear polarization orientation angle). A pattern of the spatially periodically varying orientation of the linear polarization may define a grating pattern in the recording medium layer 210.

After the polarization interference pattern is recorded into the recording medium layer 210 (or after the recording medium layer 210 is optically patterned), a PSOE may be obtained according to the fabrication processes described above in connection with FIGS. 4A-4D, FIGS. 5A-5D, or FIGS. 6A and 6B. For example, in some embodiments, the recording medium layer 210 may include a surface recording material for surface-mediated photo-alignment, a passive PSOE may be obtained through disposing the birefringent medium layer 415 on the patterned recording medium layer 210 and polymerizing the birefringent medium layer 415, similar to that shown in FIGS. 4C and 4D. The obtained passive PSOE may be a PBP grating, a transmissive PVH grating, a reflective PVH grating, etc. In some embodiments, an active PSOE may be obtained through assembling two substrates, on which the patterned recording medium layers 210 are disposed, to form an LC cell, and filling active LCs into the LC cell, similar to that shown in FIGS. 5A-5D. The obtained active PSOE may be a PBP grating, a transmissive PVH grating, a reflective PVH grating, etc. In some embodiments, the recording medium layer 210 may include a volume recording material for bulk-mediated photo-alignment, the patterned recording medium layer 210 may function as a passive PSOE, similar to that shown in FIGS. 6A-6B. The obtained passive PSOE may be a transmissive PVH grating, etc.

Referring back to FIGS. 11C and 11D, the in-plane pitch (or the grating period) $P_{R-in}$ of the grating pattern defined in the recording medium layer 210 may be determined, in part, by the angle formed between the two polarized beams S1135 and S1134, and the wavelength λ of the two polarized beams S1135 and S1134 (which is also the wavelength λ of the incident beam S228). The angle formed between the propagation directions of two polarized beams S1135 and S1134 (also referred to as the angle formed between the two polarized beams S1135 and S1134) may be determined, in part, by the incidence angle $\theta_I$ of the incident beam S228, the wavelength λ of the incident beam S228, and the in-plane pitch $P_{M-in}$ of the transmissive PVH grating 1111. Thus, through adjusting at least one of the incidence angle $\theta_I$ of the incident beam S228, the wavelength λ of the incident beam S228, or the in-plane pitch $P_{M-in}$ of the transmissive PVH grating 1111, the in-plane pitch (or the grating period) $P_{R-in}$ of the grating pattern defined in the recording medium layer 210 may be adjustable. In the disclosed embodiments, the in-plane pitch (or the grating period) $P_{in}$ of PSOEs fabricated based on the pattern recording medium layer 210 is presumed to be substantially the same as the in-plane pitch (or the grating period) $P_{R-in}$ of the grating pattern defined in the recording medium layer 210. Thus, through configuring the incidence angle $\theta_I$ of the incident beam S228, the wavelength λ of the incident beam S228, and the in-plane pitch $P_{M-in}$ of the transmissive PVH grating 1111, PSOEs with any suitable in-plane pitch $P_{in}$ may be fabricated. For example, PSOEs with a fine in-plane pitch (e.g., 200 nm to 800 nm) may be fabricated.

In some embodiments, the orientation of Bragg planes formed within the volume of the PSOEs (fabricated based on the pattern recording medium layer 210) may be determined, in part, by the angle formed between the polarized beams S1135 and S1134, and the propagation directions of the polarized beams S1135 and S1134. The angle formed between the polarized beams S1135 and S1134, and the propagation directions of the polarized beams S1135 and S1134 may be determined, in part, by the incidence angle $\theta_I$ of the incident beam S228, the wavelength λ of the incident beam S228, and the in-plane pitch $P_{M-in}$ of the transmissive PVH grating 1111. Thus, through configuring the incidence angle $\theta_I$ of the incident beam S228, the wavelength λ of the incident beam S228, and the in-plane pitch $P_{M-in}$ of the transmissive PVH 1111, Bragg planes of any suitable orientation may be formed within the volume of the PSOEs (fabricated based on the pattern recording medium layer 210). In other words, PSOEs having Bragg planes of any suitable orientation within the volume may be fabricated.

For example, in the embodiment shown in FIG. 11C, the incident beam S228 may be obliquely incident onto the transmissive PVH grating 1111, or the incident beam S228 may be an off-axis incident beam of the transmissive PVH grating 1111. In some embodiments, through configuring the incidence angle $\theta_I$ of the incident beam S228, the wavelength λ of the incident beam S228, and the in-plane pitch $P_{M-in}$ of the transmissive PVH grating 1111, the diffraction angle $\theta_{1D}$ of the $1^{st}$ order diffracted beam S1132 may have a substantially same value as that of the incidence angle $\theta_I$ of the incident beam S228 and a sign opposite to that of the incidence angle $\theta_I$, i.e., $\theta_{1D}=-\theta_I$. As the diffraction angle $\theta_{0D}$ of the $0^{th}$ order diffracted beam S1133 is substantially equal to the incidence angle $\theta_I$ of the incident beam S228 (i.e., $\theta_{0D}=\theta_I$), the diffraction angles of the $0^{th}$ order diffracted beam S1133 and the $1^{st}$ order diffracted beam S1132 have a substantially equal value and opposite signs, i.e., $\theta_{1D}=-\theta_{0D}$. An angle formed between the $0^{th}$ order diffracted beam S1133 and the $1^{st}$ order diffracted beam S1132 may have a value that is two times of the value of the incidence angle $\theta_I$ of the incident beam S228. When the incidence angle $\theta_I$ of the incident beam S228 is presumed to be +θ, the diffraction angles of the $0^{th}$ order diffracted beam S1133 and the $1^{st}$ order diffracted beam S1132 may be +θ and −θ, respectively. The angle formed between the $0^{th}$ order diffracted beam S1133 and the $1^{st}$ order diffracted beam S1132 may be 2θ. In other words, the transmissive PVH grating 1111 may be configured to forwardly diffract the incident beam S228 as the $1^{st}$ order diffracted beam S1132 and the $0^{th}$ order diffracted beam S1133 having symmetric propagation directions. Accordingly, the two polarized beams S1135 and S1134 output from the O-plate 1113 may also have symmetric propagation directions. A recording of the interference pattern generated by the circularly polarized beams S1135 and S1134 with opposite handednesses and symmetric propagation directions may be referred to as a symmetric recording. In some embodiments, a PSOE fabricated based on the recording medium layer 210 subjected to the symmetric recording may have vertical Bragg planes formed within the volume of the PSOE. Although not shown, in some embodiments, the diffraction angles of the $0^{th}$ order diffracted beam S1133 and the $1^{st}$ order diffracted beam S1132 have different values and opposite signs, i.e., $\theta_{1D}\neq-\theta_{0D}$.

In the embodiment shown in FIG. 11D, the incident beam S228 may be substantially normally incident onto the transmissive PVH grating 1111, or the incident beam S228 may be an on-axis incident beam of the transmissive PVH grating 1111. Thus, the incidence angle $\theta_I$ of the incident beam S228 and the diffraction angles of the $0^{th}$ order diffracted beam S1133 may be substantially zero. The diffraction angle $\theta_{1D}$ of the $1^{st}$ order diffracted beam S1132 may have a non-zero value, which may be determined by the wavelength λ of the incident beam S228 and the in-plane pitch $P_{M-in}$ of the transmissive PVH grating 1111. In other words, the transmissive PVH grating 1111 may be configured to forwardly diffract the incident beam S228 as the $1^{st}$ order diffracted beam S1132 and the $0^{th}$ order diffracted beam S1133 having asymmetric propagation directions. Accordingly, the two polarized beams S1135 and S1134 output from the O-plate 1113 may also have asymmetric propagation directions. A recording of the interference pattern generated by the polarized beams S1135 and S1134 with opposite handednesses and asymmetric propagation directions may be referred to as an asymmetric recording. In some embodiments, a PSOE fabricated based on the recording medium layer 210 subjected to the asymmetric recording may have slanted Bragg planes formed within the volume of the PSOE.

Referring back to FIG. 11A, in some embodiments, the transmissive PVH element 1111 shown in FIG. 11A may include a transmissive PVH lens (also referred to as 1111 for discussion purposes). The transmissive PVH lens may function as a spherical lens, an aspherical lens, a cylindrical lens, or a freeform lens, etc., depending on, for example, an in-plane orientation pattern of the optic axis of the transmissive PVH lens 1111. For example, in some embodiments, the optic axis of the transmissive PVH lens 1111 may be configured with an in-plane orientation pattern, in which the orientation of the optic axis may continuously vary in at least two opposite in-plane directions from a center of the in-plane orientation pattern to the opposite peripheries of the in-plane orientation pattern with a varying (e.g., decreasing) pitch. In some embodiments, within a volume of the transmissive PVH lens 1111, the optic axis of the transmissive PVH lens 1111 may be twisted in a helical fashion. In some embodiments, the transmissive PVH lens 1111 may include a birefringent medium layer (e.g., an LC layer). The optically anisotropic molecules (e.g., LC molecules) of the birefringent medium layer may be configured with an in-plane orientation pattern. In the in-plane orientation pattern, the orientations of the optically anisotropic molecules (e.g., LC molecules) may continuously vary in at least two opposite in-plane directions. The at least two opposite in-plane directions may be opposite directions from a center of the in-plane orientation pattern to the opposite peripheries of the in-plane orientation pattern. The continuous variation of the orientations may exhibit a varying (e.g., decreasing) pitch. For example, the pitch may gradually decrease from the center to the opposite peripheries. In some embodiments, within a volume of the transmissive PVH lens 1111, the orientation of the optically anisotropic molecules (e.g., LC molecules) may be twisted in a helical fashion. In such an embodiment, the transmissive PVH lens 1111 may function as a spherical lens. The transmissive PVH lens 1111 may function as a mask for surface recording or volume recording of a lens pattern into the recording medium layer 210. The lens pattern may be a spherical lens pattern, an aspherical lens pattern, a cylindrical lens pattern, or a freeform lens pattern, etc. A PSOE fabricated based on the exposed recording medium layer 210 may be a polarization selective lens, such as, a polarization selective spherical lens, a polarization selective aspherical lens, a polarization selective cylindrical lens, or a polarization selective freeform lens, etc.

FIG. 11E illustrates polarization selective diffractions of the transmissive PVH lens (e.g., spherical lens) 1111, according to an embodiment of the present disclosure. The transmissive PVH lens 1111 may provide a polarization selective converging or diverging function via forward diffraction. The transmissive PVH lens 1111 may be considered as a transmissive PVH lens with an optical power. In some embodiments, the transmissive PVH lens 1111 may be configured to substantially forwardly diffract and converge (or diverge) a polarized beam (e.g., circularly or elliptically polarized beam) having a predetermined handedness. In some embodiments, the transmissive PVH lens 1111 may be configured to substantially transmit (e.g., with negligible diffraction) a polarized beam (e.g., circularly or elliptically polarized beam) having a handedness that is opposite to the predetermined handedness. For example, a right-handed transmissive PVH grating may be configured to substantially forwardly diffract and converge (or diverge) an RHCP beam as an LHCP beam. In other words, a right-handed transmissive PVH lens may be configured to converge (or diverge) the RHCP beam as the LHCP beam via forward diffraction. A right-handed transmissive PVH grating may also be configured to substantially transmit (e.g., with negligible diffraction) an LHCP beam as an LHCP beam. In some embodiments, a left-handed transmissive PVH lens may be configured to substantially forwardly diffract and converge (or diverge) an LHCP beam as an RHCP beam. In other words, a left-handed transmissive PVH lens may be configured to converge (or diverge) the LHCP beam as the RHCP beam via forward diffraction. A left-handed transmissive PVH lens may also be configured to substantially transmit (e.g., with negligible diffraction) an RHCP beam as an RHCP beam. Whether a transmissive PVH lens converges or diverges a polarized beam (e.g., circularly, or elliptically polarized beam) having the predetermined handedness may depend on a sign of the optical power of the transmissive PVH lens. For example, a transmissive PVH lens having a positive optical power may converge a polarized beam (e.g., circularly or elliptically polarized beam) having the predetermined handedness. A transmissive PVH lens having a negative optical power may diverge a polarized beam (e.g., circularly or elliptically polarized beam) having the predetermined handedness.

For discussion purposes, FIG. 11E shows the transmissive PVH lens 1111 as a right-handed transmissive PVH lens having a positive optical power. As shown in FIG. 11E, the transmissive PVH lens 1111 may be configured to converge an RHCP beam 1170 as an LHCP beam (e.g., the $1^{st}$ order diffracted beam) 1172, while substantially forwardly diffracting the RHCP beam 1170. The transmissive PVH lens 1111 may also be configured to substantially transmit (e.g., with negligible diffraction) an LHCP beam 1175 as an LHCP beam 1177 (e.g., the $0^{th}$ order diffracted beam) 1177. For discussion purposes, FIG. 11E shows that the RHCP beam 1170 and the LHCP beam 1175 may have planar wavefronts. The LHCP beam (e.g., the $1^{st}$ order diffracted beam) 1172 may have a non-planar wavefront, and the LHCP beam 1177 (e.g., the $0^{th}$ order diffracted beam) 1177 may have a planar wavefront.

For a linearly polarized input beam or an unpolarized input beam including an RHCP component and an LHCP component, the transmissive PVH lens 1111 having a positive optical power may be configured to converge the RHCP (or LHCP) component while substantially forwardly diffracting the RHCP (or LHCP) component, and substantially transmit (e.g., with negligible diffraction) the LHCP (or RHCP) component. The transmissive PVH lens 1111 having a negative optical power may be configured to diverge the RHCP (or LHCP) component while substantially forwardly diffracting the RHCP (or LHCP) component, and substantially transmit (e.g., with negligible diffraction) the LHCP (or RHCP) component. Thus, for a linearly polarized input beam or an unpolarized input beam having a planar wavefront, the transmissive PVH lens 1111 may be configured to output a $1^{st}$ order diffracted beam having a non-planar wavefront and a $0^{th}$ order diffracted beam having a planar wavefront. The $1^{st}$ order diffracted beam and the $0^{th}$ order diffracted beam may be polarized beam (e.g., circularly, or elliptically polarized beam) having the same handedness.

FIG. 11F schematically illustrates a diagram of the transmissive PVH element 1111 and the O-plate 1113, which may be included in the system 1100 shown in FIG. 11A, according to an embodiment of the present disclosure. The incident beam S228 may be at least partially polarized. For discussion purposes, in FIG. 11F, the incident beam S228 may be a linearly polarized beam. The transmissive PVH lens 1111 may be configured to forwardly diffract the incident beam (e.g., linearly polarized beam) S228 as a $1^{st}$ order diffracted beam S1143 and a $0^{th}$ order diffracted beam S1142 (that is a transmitted beam with negligible diffraction). The $1^{st}$ order diffracted beam S1143 and the $0^{th}$ order diffracted beam S1142 may be polarized beams having the same handedness, e.g., two circularly polarized beams having the same handedness. At least one of the $1^{st}$ order diffracted beam S1143 or the $0^{th}$ order diffracted beam S1142 may have a non-planar wavefront. The O-plate 1113 may be configured to convert the $1^{st}$ order diffracted beam S1143 and the $0^{th}$ order diffracted beam S1142 (which are polarized beams having the same handedness) to two polarized beams S1145 and S1144 having the opposite handednesses, e.g., two circularly polarized beams having opposite handednesses. The polarized beams S1145 and S1144 having the opposite handednesses may interfere with one another in space to generate a polarization interference pattern, which defines a lens pattern (e.g., a spherical lens pattern, an aspherical lens pattern, a cylindrical lens pattern, or a freeform lens pattern, etc.) in the recording medium layer 210, which is exposed to the polarization interference pattern. A PSOE fabricated based on the optically patterned recording medium layer 210, via, e.g., the fabrication processes shown in FIGS. 4A-4D, FIGS. 5A-5D, or FIGS. 6A and 6B, may be a polarization selective lens, e.g., a polarization selective spherical lens, a polarization selective aspherical lens, a polarization selective cylindrical lens, or a polarization selective freeform lens, etc. For example, the polarization selective lens may be a PBP lens, a PVH lens, etc.

For discussion purposes, in the embodiment shown in FIG. 11F, the transmissive PVH element 1111 may be a right-handed transmissive PVH lens 1111 functioning as a spherical lens having a positive optical power. The transmissive PVH element 1111 may have an optical axis 1117 that is a symmetric axis of the transmissive PVH element 1111 and perpendicular to the surface of the transmissive PVH element 1111. For discussion purposes, the incident beam S228 may be a linearly polarized beam having a planar wavefront, and substantially normally incident onto the transmissive PVH lens 1111 (e.g., the incident angle $\theta_i=0$). The incident beam S228 may be parallel to the optical axis 1117 of the transmissive PVH lens 1111, and spaced apart from the optical axis 1117 of the transmissive PVH lens 1111.

The transmissive PVH lens 1111 may be configured to forwardly diffract an RHCP component of the incident beam (e.g., linearly polarized beam) S228 as a $1^{st}$ order diffracted beam (e.g., LHCP beam) S1142, and forwardly diffract an LHCP component of the incident beam (e.g., linearly polarized beam) S228 as a $0^{th}$ order diffracted beam (e.g., LHCP beam) S1143 (that is a transmitted beam with negligible diffraction). The transmissive PVH lens 1111 may be configured to converge the RHCP component of the incident beam (e.g., linearly polarized beam) S228 as the $1^{st}$ order diffracted beam (e.g., LHCP beam) S1142. The $1^{st}$ order diffracted beam (e.g., LHCP beam) S1142 may have a non-planar wavefront (e.g., spherical converging wavefront). The convergence of the $1^{st}$ order diffracted beam (e.g., LHCP beam) S1142 may be determined, in part, by the optical power of the transmissive PVH lens 1111. In other words, the optical properties of the transmissive PVH lens 1111 (functioning as a mask) may be encoded into the $1^{st}$ order diffracted beam (e.g., LHCP beam) S1142. The $1^{st}$ order diffracted beam (e.g., LHCP beam) S1142 may be referred to as a signal beam. For discussion purposes, FIG. 11F shows diffraction angles $\theta_{1D}$ of rays included in the $1^{st}$ order diffracted beam (e.g., LHCP beam) S1142 as negative diffraction angles (e.g., counter-clockwise from a normal 1188 of a light outputting surface of the PVH lens 1111). Rays included in the $1^{st}$ order diffracted beam (e.g., LHCP beam) S1142 may have different negative diffraction angles. FIG. 11F shows a diffraction angle $\theta_{1D}$ of one ray included in the in the $1^{st}$ order diffracted beam (e.g., LHCP beam) S1142 as negative diffraction angles (counter-clockwise from a normal 1188 of the light outputting surface of the PVH lens 1111). The $0^{th}$ order diffracted beam (e.g., LHCP beam) S1143 may have a planar wavefront. The $0^{th}$ order diffracted beam (e.g., LHCP beam) S1143 may be referred to as a reference beam. A diffraction angle $\theta_{0D}$ of the $0^{th}$ order diffracted beam (e.g., LHCP beam) S1143 may be substantially zero.

For discussion purposes, the O-plate 1113 may be configured to convert a handedness of the $1^{st}$ order diffracted beam (e.g., LHCP beam) S1142 to an opposite handedness, and substantially maintain a handedness of the $0^{th}$ order diffracted beam (e.g., LHCP beam) S1143. For example, the O-plate 1113 may be configured to transmit the $1^{st}$ order diffracted beam (e.g., LHCP beam) S1142 as a polarized beam (e.g., RHCP beam) S1144 with the handedness reversed, and transmit the $0^{th}$ order diffracted beam (e.g., LHCP beam) S1143 as a polarized beam (e.g., LHCP beam) S1145 with the handedness substantially maintained. The polarized beam (e.g., RHCP beam) S1144 and the polarized beam (e.g., LHCP beam) S1145 may interfere with one another to generate a polarization interference pattern, to which the recording medium layer 210 is exposed. The polarization interference pattern may be recorded in the recording medium layer 210 to define a lens pattern (e.g., spherical lens pattern) in the recording medium layer 210. A PSOE fabricated based on the exposed recording medium layer 210 may be a polarization selective lens, e.g., a polarization selective spherical lens having a positive optical power.

FIG. 11G schematically illustrates a diagram of the transmissive PVH element 1111 and the O-plate 1113, which may be included in the system 1100 shown in FIG. 11A, according to an embodiment of the present disclosure. For discussion purposes, in the embodiment shown in FIG. 11G, the transmissive PVH element 1111 may be a right-handed transmissive PVH lens 1111 functioning as a spherical lens having a negative optical power. The transmissive PVH element 1111 may have an optical axis 1117 that is a symmetric axis of the transmissive PVH element 1111 and perpendicular to the surface of the transmissive PVH element 1111. The incident beam S228 may be at least partially polarized. For discussion purposes, the incident beam S228 may be a linearly polarized beam having a planar wavefront, obliquely incident onto the transmissive PVH lens 1111 (e.g., the incident angle $\theta_i \neq 0$). The incident beam S228 may be non-parallel to the optical axis 1117 of the transmissive PVH lens 1111. An intersection between the incident beam S228 and the transmissive PVH lens 1111 may be spaced apart from an intersection between the optical axis 1117 and the transmissive PVH lens 1111.

The transmissive PVH lens 1111 may be configured to forwardly diffract an RHCP component of the incident beam (e.g., linearly polarized beam) S228 as a $1^{st}$ order diffracted beam (e.g., an LHCP beam) S1152, and forwardly diffract an LHCP component of the incident beam (e.g., linearly polarized beam) S228 as a $0^{th}$ order diffracted beam (e.g., an LHCP beam) S1153 (that is a transmitted beam with negligible diffraction). The transmissive PVH lens 1111 may be configured to diverge the RHCP component of the incident beam (e.g., linearly polarized beam) S228 as the $1^{st}$ order diffracted beam (e.g., LHCP beam) S1152. The $1^{st}$ order diffracted beam (e.g., LHCP beam) S1152 may have a non-planar wavefront (e.g., spherical diverging wavefront). The divergence of the $1^{st}$ order diffracted beam (e.g., LHCP beam) S1152 may be determined, in part, by the optical power of the transmissive PVH lens 1111. In other words, the optical properties of the transmissive PVH lens 1111 (functioning as a mask) may be encoded into the $1^{st}$ order diffracted beam (e.g., LHCP beam) S1152. The $1^{st}$ order diffracted beam (e.g., LHCP beam) S1152 may be referred to as a signal beam. For discussion purposes, FIG. 11G shows diffraction angles $\theta_{1D}$ of rays included in the $1^{st}$ order diffracted beam (e.g., LHCP beam) S1152 as negative diffraction angles (counter-clockwise from a normal 1199 of the light outputting surface of the PVH lens 1111). FIG. 11G shows a diffraction angle $\theta_{1D}$ of one ray included in the in the $1^{st}$ order diffracted beam (e.g., LHCP beam) S1152 as negative diffraction angles (counter-clockwise from a normal 1199 of the light outputting surface of the PVH lens 1111). Rays included in the $1^{st}$ order diffracted beam (e.g., LHCP beam) S1152 may have different negative diffraction angles. The $0^{th}$ order diffracted beam (e.g., LHCP beam) S1153 may have a planar wavefront. The $0^{th}$ order diffracted beam (e.g., LHCP beam) S1153 may be referred to as a reference beam. A diffraction angle $\theta_{0D}$ of the $0^{th}$ order diffracted beam (e.g., LHCP beam) S1153 may be a positive diffraction angle.

For discussion purposes, the O-plate 1113 may be configured to convert a handedness of the $1^{st}$ order diffracted beam (e.g., LHCP beam) S1152 to an opposite handedness, and substantially maintain a handedness of the $0^{th}$ order diffracted beam (e.g., LHCP beam) S1153. Thus, the O-plate 1113 may be configured to transmit the $1^{st}$ order diffracted beam (e.g., LHCP beam) S1152 as a polarized beam (e.g., an RHCP beam) S1154 with the handedness reversed, and transmit the $0^{th}$ order diffracted beam (e.g., LHCP beam) S1153 as a polarized beam (e.g., an LHCP beam) S1155 with the handedness substantially maintained. The polarized beam (e.g., RHCP beam) S1154 and the polarized beam (e.g., LHCP beam) S1155 may interfere with one another in space to generate a polarization interference pattern, to which the recording medium layer 210 is exposed. The polarization interference pattern may be recorded in the recording medium layer 210 to define a lens pattern (e.g., spherical lens pattern) in the recording medium layer 210. A PSOE fabricated based on the exposed recording medium layer 210 may be a polarization selective lens, e.g., a polarization selective spherical lens having a negative optical power.

Referring to FIGS. 11F and 11G, for discussion purposes, the incident beam S228 of the transmissive PVH lens 1111 (functioning as a mask) is presumed to have a planar wavefront, the $0^{th}$ order diffracted beam (e.g., LHCP beam) S1143 or S1153 is presumed to have a planar wavefront, and the $1^{st}$ order diffracted beam (e.g., LHCP beam) S1142 or S1152 is presumed to have a non-planar wavefront. In some embodiments, the incident beam S228 of the transmissive PVH lens 1111 (functioning as a mask) may be configured with a non-planar wavefront. In some embodiments, the $0^{th}$ order diffracted beam (e.g., LHCP beam) S1143 or S1153 may be configured with a non-planar wavefront, and the $1^{st}$ order diffracted beam (e.g., LHCP beam) S1142 or S1152 may be configured with a planar wavefront. In some embodiments, both of the $0^{th}$ order diffracted beam (e.g., LHCP beam) S1143 or S1153 and the $-1^{st}$ order diffracted beam (e.g., LHCP beam) S1142 or S1152 may be configured with non-planar wavefronts.

For discussion purposes, FIGS. 11F and 11G show the transmissive PVH lens 1111 functioning a spherical lens, which is for the purpose of explaining the principle of recording a polarization interference pattern that defines a lens pattern using the transmissive PVH lens 1111 as a mask. The transmissive PVH lens 1111 may function as any suitable lens, such as a spherical lens, an aspherical lens, a cylindrical lens, or a freeform lens, etc. The generated polarization interference pattern may define any suitable lens pattern in the recording medium layer 210, such as a spherical lens pattern, an aspherical lens pattern, a cylindrical lens pattern, or a freeform lens pattern, etc.

Referring back to FIG. 11A, the system 1100 shown in FIG. 11A is for illustrative purposes to explain the principle of recording a polarization interference pattern in the recording medium layer 210 using the transmissive PVH element 1111 as a mask. A PSOE may be fabricated based on the exposed or patterned recording medium layer 210. The principle disclosed herein may be applicable to any suitable systems including a transmissive PVH element functioning as a mask for recording a polarization interference pattern in the recording medium layer 210, and is not limited to the system 1100 shown in FIG. 11A.

The transmissive PVH grating 1111 shown in FIGS. 11B-11D is for illustrative purposes to explain the principle of recording a polarization interference pattern that defines a lens pattern in the recording medium layer 210 using the transmissive PVH grating 1111 as a mask. A PSOE or polarization hologram fabricated based on the exposed or patterned recording medium layer 210 may be a polarization selective grating. The transmissive PVH lens 1111 shown in FIG. 11E-11G is for illustrative purposes to explain the principle of recording a polarization interference pattern that defines a lens pattern in the recording medium layer 210 using the transmissive PVH lens 1111 as a mask. A PSOE or polarization hologram fabricated based on the exposed or patterned recording medium layer 210 may be a polarization selective lens. The principle disclosed herein may be applicable to any suitable transmissive PVH masks, and is not limited to the transmissive PVH grating mask shown in FIGS. 11B-11D and the transmissive PVH lens mask shown in FIGS. 11E-11G. In addition, the transmissive PVH masks as described herein can also be fabricated based on various other methods, such as holographic interference, laser direct writing, ink-jet printing, and various other forms of lithography. Thus, a "hologram" as described herein is not limited to creation by holographic interference, or "holography."

The O-plate 1113 shown in FIGS. 11A, 11C, 11D, 11F, and 11G disclosed herein are for illustrative purposes. Any suitable compensation plate or other type of optical element may be used to convert the two polarized beams (e.g., circularly or elliptical polarized) with the same handedness output from the transmissive PVH element into two polarized beams (e.g., circularly or elliptical polarized) with the opposite handedness, following the same or similar design principles described herein with respect to the O-plate. Any suitable polarization conversion optical element, which is configured to convert the two polarized beams (e.g., circularly, or elliptical polarized) with the same handedness output from the transmissive PVH element (that functions as a mask) into two polarized beams (e.g., circularly or elliptical polarized) with the opposite handedness, may be used. The O-plate or the waveplate 213 shown in other embodiments may be referred to as a polarization conversion optical element or polarization conversion element. The two polarized beams with the opposite handednesses may interfere with one another to generate any suitable polarization interference pattern, which may be recorded in the recording medium layer, thereby defining a suitable optic axis orientation pattern (e.g., an in-plane orientation pattern and/or 3D orientation pattern) in the recording medium layer 210.

Referring to FIG. 2A, FIG. 2C, FIG. 2D, and FIG. 11A, in some embodiments, the light source 201 may be a light-emitting diode ("LED") light source, or an organic light-emitting diode ("OLED") light source. When considering cost efficiency in manufacturing, in some embodiments, LEDs may be used to replace laser sources for reducing the manufacturing cost. A laser beam may be a substantially collimated beam, and may be expanded to a plane wave propagating in a single direction. LEDs have an emitting area at which different points on the LED may act as independent point sources. The point sources may be converted to plane waves propagating in different directions by a condenser lens. Thus, the condenser lens may output a superposition of multiple plane waves. In direct duplications of PVH elements using a PVH mask, each plane wave incident on the PVH mask may be converted, by the PVH mask, into two orthogonally circularly polarized beams propagating in different directions. The two orthogonally circularly polarized beams propagating in different directions may interfere with one another to generate a polarization fringe or polarization interference pattern. When the plane wave is tilted, the polarization fringe may shift accordingly. After adding up all shifted polarization fringes, the final polarization fringe profile may be smeared or even disappeared.

Figure 13A:
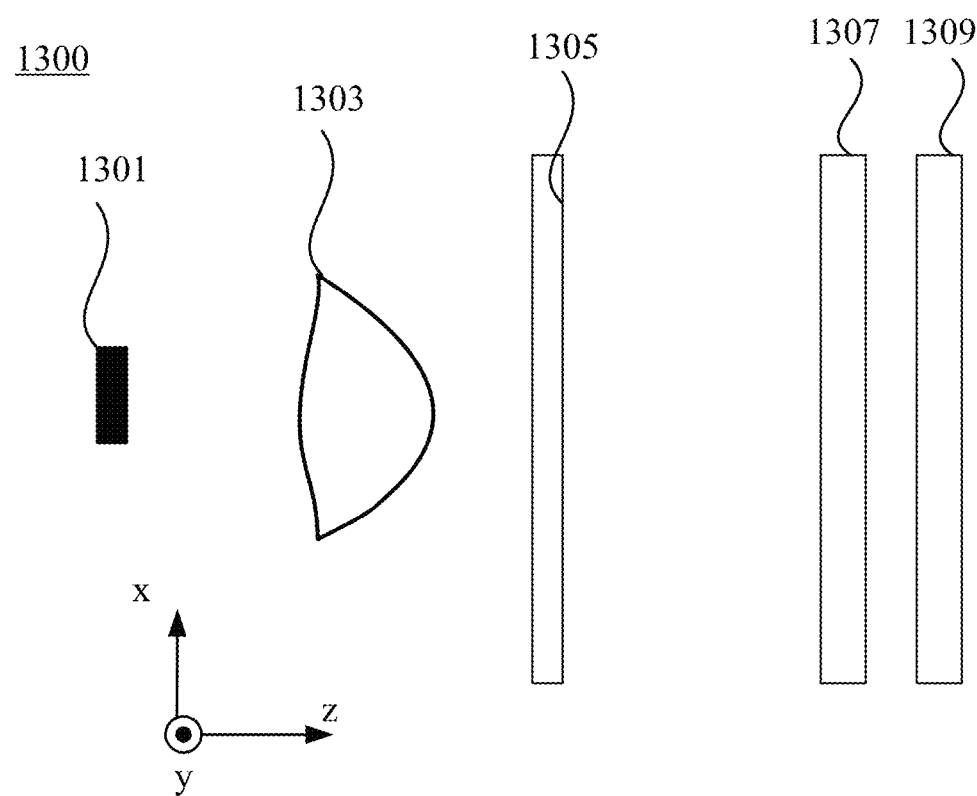
FIG. 13A schematically illustrates a diagram of an experimental setup for investigating a relationship between a duplicated polarization pitch and an allowable gap between a mask and a sample plane, according to an embodiment of the present disclosure.
Figure 13B:
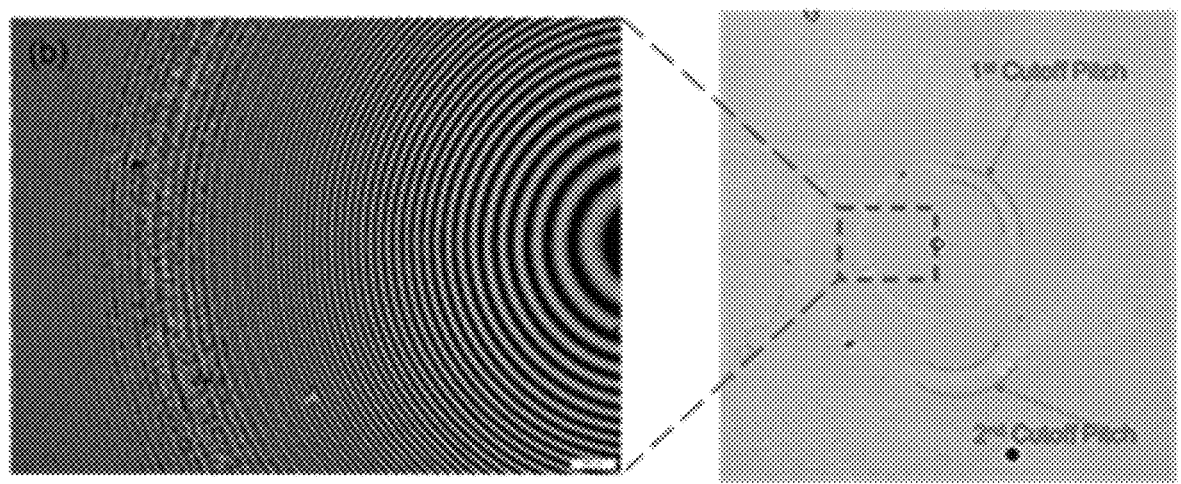
FIG. 13B illustrates a duplicated lens pattern with a reduction of a clear aperture observed under crossed polarizers, according to an embodiment of the present disclosure.

A series of experiments have been conducted to investigate the relationship between a duplicated polarization pitch and an allowable gap between the PVH mask and the substrate on which a recording medium is disposed (referred to as a sample plane), with different diameters the aperture of the LED. FIG. 13A schematically illustrates a diagram of an experimental setup 1300 for investigating the relationship between the duplicated polarization pitch and the allowable gap between a mask and a sample plane, according to an embodiment of the present disclosure. As shown in FIG. 13A, a light emitting from an LED 1301 may be collimated by an aspherical condenser lens 1303. The LED 1301 may have a 1.4 mm diameter. A linear polarizer 1305 may be disposed between the aspherical condenser lens 1303 and a PVH mask 1307, and configured to convert a light emitting from the LED 1301 as a linearly polarized light propagating toward the PVH mask 1307. The PVH mask 1307 may be a PVH lens with decreasing pitch from the lens center to the lens peripheries. As the gap between the PVH mask 1307 and a sample plane 1309 increases, a series of concentric rings that are not well-aligned may be observed under crossed polarizers, and the clear aperture of the duplicated area may decrease when observed under crossed polarizers. FIG. 13B illustrates a duplicated lens pattern with a reduction of the clear aperture observed under crossed polarizers, when the gap between the between the PVH mask 1307 and the sample plane 1309 is about 1000 μm, according to an embodiment of the present disclosure. The pitches on both sides of the first cutoff ring are measured to be around 40 μm and 54 μm.

Since each point on the LED 1301 may be regarded as an independent point source that generates a polarization pattern, the final polarization pattern on the sample plane may be the incoherent integration of the polarization patterns from the entire LED emitting area. The mathematical calculation unveils that the alignment quality may be the Fourier transform of the aperture of the LED 1301. For a circularly shaped LED, its Fourier transform may be a Sombrero function with a first zero located between the two measured pitches. The first zero is defined as the minimal duplicable pitch, which may be used to calculate the maximum allowable gap between the PVH mask 1307 and the sample plane 1309.

Table 1 shows maximum allowable gaps between the PVH mask 1307 and the sample plane 1309 with different LED diameters, at 1 μm and 310 nm polarization pitch at the sample plane 1309 through direct duplication. The focal length of the aspherical condenser lens 1303 is 32 mm. The LED 1301 has a circular profile. As the diameter of the LED 1301 decreases, the LED 1301 may exhibit an increased spatial coherence, and the maximum allowable gap for duplication may be increased. As shown in Table 1, when the LED 1301 has a 0.1 mm diameter, the maximum gap between the PVH mask 1307 and the sample plane 1309 is 390 μm, which may be tight for some applications. Such a restriction on the maximum gap between the PVH mask 1307 and the sample plane 1309 may not exist when using a laser as the light source in some applications.

TABLE 1

| Maximum gap with varied LED diameter at 1 μm and 310 nm pitch at the sample plane. | | | | | |
|---|---|---|---|---|---|
| Pitch | LED diameter | Max. gap | Pitch | LED diameter | Max. gap |
| 1 μm | 1.4 mm | 27.9 μm | 310 nm | 1.4 mm | 8.64 μm |
|  | 1 mm | 39.0 μm |  | 1 mm | 12.1 μm |
|  | 0.5 mm | 78.0 μm |  | 0.5 mm | 24.2 μm |
|  | 0.1 mm | 390 μm |  | 0.1 mm | 121 μm |

FIG. 12 illustrates a flowchart showing a method 1200 for fabricating a PSOE (e.g., a polarization hologram), according to an embodiment of the present disclosure. As shown in FIG. 12, the method 1200 may include directing an input beam to a mask (Step 1210). In some embodiments, the mask may be a transmissive PVH element. In some embodiments, the input beam may be at least partially polarized. In some embodiments, the input beam may be a linearly polarized beam. In some embodiments, the input beam may be an unpolarized polarized beam. The method 1200 may include forwardly diffracting, by the mask, the input beam as a first set of two polarized beams (Step 1220). In some embodiments, the first set of two polarized beams may include circularly and/or elliptical polarized beams. In some embodiments, the two polarized beams in the first set may have the same handedness. In some embodiments, the two polarized beams having the same handedness may include a $0^{th}$ order diffracted beam and a $1^{st}$ order diffracted beam. In some embodiments, the $0^{th}$ order diffracted beam and the $1^{st}$ order diffracted beam may have a substantially same light intensity. In some embodiments, the $0^{th}$ order diffracted beam and the $1^{st}$ order diffracted beam may have different light intensities.

In some embodiments, the transmissive PVH element functioning as a mask may include a transmissive PVH grating. The transmissive PVH element functioning as a mask may be referred to as a PVH mask or a transmissive PVH mask. In some embodiments, the $0^{th}$ order diffracted beam and the $1^{st}$ order diffracted beam may have planar wavefronts. In some embodiments, the diffraction angles of the $0^{th}$ order diffracted beam and the $1^{st}$ order diffracted beam may have a substantially same value and opposite signs. In some embodiments, the propagation directions of the $0^{th}$ order diffracted beam and the $1^{st}$ order diffracted beam may be symmetric with respect to a normal of a surface of the mask (e.g., the PVH mask). In some embodiments, the propagation directions of the $0^{th}$ order diffracted beam and the $1^{st}$ order diffracted beam may be asymmetric with respect to a normal of a surface of the mask (e.g., the PVH mask). In some embodiments, the PVH mask may include a transmissive PVH lens. In some embodiments, at least one of the $0^{th}$ order diffracted beam or the $1^{st}$ order diffracted beam may have a non-planar wavefront.

The method 1200 may include converting, by a polarization conversion element, the first set of two polarized beams into a second set of two polarized beams having opposite handednesses, the two polarized beams having opposite handednesses interfering with one another to generate a polarization interference pattern (Step 1230). In some embodiments, the polarization conversion element may include a compensation plate, such as an O-plate. The compensation plate may be indirectly optically coupled to the PVH mask with an intermediate optical element disposed therebetween. The intermediate optical element may or may not change at least one of the polarization or the propagating direction of the beams. In some embodiments, the compensation plate may be directly optically coupled to the PVH mask without an optical element disposed and/or without a gap therebetween.

In some embodiments, the two polarized beams having opposite handednesses in the second set may have planar wavefronts. In some embodiments, an angle formed between the propagation directions of the two polarized beams having opposite handedness in the second set may be substantially equal to the angle formed between the propagation direction of the $0^{th}$ order diffracted beam and the $1^{st}$ order diffracted beam (or the two polarized beams having the same handedness in the first set) output from the PVH mask. In some embodiments, the two polarized beams having opposite handednesses in the second set may have a substantially equal light intensity. In some embodiments, the two polarized beams having opposite handedness may have different light intensities. In some embodiments, the compensation plate may include an O-plate configured to provide an angular selective phase retardance to the two polarized beams having the same handedness output from the PVH mask. In some embodiments, the two polarized beams having the same handedness output from the PVH mask may include a first polarized beam (e.g., first circularly or elliptically polarized beam) having a first incidence angle relative to the O-plate, and a second polarized beam (e.g., second circularly or elliptically polarized beam) having a second incidence angle relative to the O-plate. In some embodiments, the O-plate may be configured to provide a half-wave retardance to the first polarized beam having the first incidence angle within a predetermined angle range, and provide a zero or full-wave retardance to the second polarized beam having the second incidence angle outside of the predetermined range. In some embodiments, the O-plate may be configured to convert a handedness of the first polarized beam to an opposite handedness, and substantially maintain the handedness of the second polarized beam.

In some embodiments, the method 1200 may include additional steps that are not shown in FIG. 12. In some embodiments, the method 1200 may include directing the two polarized beams (e.g., circularly or elliptically polarized beams) having opposite handednesses to a same surface of a polarization sensitive recording medium layer. The two polarized beams having opposite handednesses may interfere with one another in a predetermined space within which the polarization sensitive recording medium layer is located. The polarization sensitive recording medium layer may be exposed to the polarization interference pattern. During the exposure process, the polarization interference pattern may be recorded at (e.g., in or on) the polarization sensitive recording medium layer to define an orientation pattern of an optic axis of the polarization sensitive recording medium layer. In some embodiments, the orientation pattern of the optic axis of the polarization sensitive recording medium layer may correspond to a grating pattern. In some embodiments, the orientation pattern of the optic axis of the polarization sensitive recording medium layer may correspond to a lens pattern. In some embodiments, the orientation pattern of the optic axis of the polarization sensitive recording medium layer may correspond to a prism pattern. In some embodiments, the orientation pattern of the optic axis of the polarization sensitive recording medium layer may correspond to a waveplate pattern.

In some embodiments, the polarization sensitive recording medium layer may include a photo-sensitive polymer (or photo-polymer), e.g., an amorphous polymer, an LC polymer, etc. In some embodiments, after being exposed to the polarization interference pattern, the polarization sensitive recording medium layer (also referred to as "exposed polarization sensitive recording medium layer") may function as a polarization selective grating, such as a transmissive PVH grating, etc. In some embodiments, the method 1200 may also include annealing the exposed polarization sensitive recording medium layer in a predetermined temperature range. For example, when the polarization sensitive recording medium layer includes LC polymer, the predetermined temperature range may correspond to a liquid crystalline state of the LC polymer.

In some embodiments, the polarization sensitive recording medium layer may include a photo-alignment material. The exposed polarization sensitive recording medium layer may function as a surface alignment layer. The method 1200 may also include forming a birefringent medium layer on the polarization sensitive recording medium layer. In some embodiments, the birefringent medium layer may include a birefringent medium with or without a chirality. For example, the birefringent medium layer may include at least one of LCs or RMs with or without a chirality. In some embodiments, the exposed polarization sensitive recording medium layer may be annealed in a predetermined temperature range corresponding to a nematic phase of the LCs or RMs. In some embodiments, the method 1200 may also include polymerizing the birefringent medium layer. In some embodiments, the polymerized birefringent medium layer may function as a polarization selective grating, such as a PBP grating, or a reflective or transmissive PVH grating, etc.

In some embodiments, the method may include recording a plurality of polarization interference patterns to a plurality of regions or portions in the polarization sensitive recording medium layer. For example, a first polarization interference pattern may be generated using an input beam having a first wavelength, incident onto a first PVH mask at a first incidence angle. The first PVH mask may diffract the input beam having the first wavelength and the first incidence angle into a first set of two polarized beams (e.g., circularly or elliptically polarized beams) having the same handedness (e.g., the $0^{th}$ order diffracted beam and the $1^{st}$ order diffracted beam). The compensation plate may convert the first set of two polarized beams having the same handednesses into a second set of two polarized beams (e.g., circularly, or elliptically polarized beams) having opposite handedness, which may interference with one another to generate a first polarization interference pattern. One or more first recording regions or portions of the polarization sensitive recording medium layer may be exposed to the first polarization interference pattern, which may be recorded in the one or more first recording regions.

In some embodiments, a second polarization interference pattern may be recorded at one or more second recording regions or portions of the polarization sensitive recording medium layer. In some embodiments, the method may include adjusting at least one of a wavelength of the input beam, an incidence angle of the input beam, or a relative position or a relative orientation between the polarization sensitive recording medium layer and the input beam incident onto the first PVH mask. The method may include forwardly diffracting, by the first PVH mask, the input beam as a second set of two polarized beams (e.g., circularly or elliptically polarized beams) having the same handedness (e.g., the $0^{th}$ order diffracted beam and the $1^{st}$ order diffracted beam). In some embodiments, the method may include replacing the first PVH mask with a second PVH mask, which may be different from the first PVH mask. The method may include forwardly diffracting, by the second PVH mask, the input beam as a third set of two polarized beams (e.g., circularly or elliptically polarized beams) having the same handedness (e.g., the $0^{th}$ order diffracted beam and the $-1^{st}$ order diffracted beam). The method may include converting, by the compensation plate, the third set of two polarized beams (e.g., circularly or elliptically polarized beams) having the same handedness into a fourth set of two polarized beams (e.g., circularly or elliptically polarized beams) having opposite handednesses, which may interference with one another to generate a second polarization interference pattern. The method may also include recording the second polarization interference pattern in one or more second regions of the polarization sensitive recording medium layer.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A system, comprising:
a polarization volume hologram ("PVH") mask configured to forwardly diffract an input beam as a first set of two collimated circularly polarized beams having a same handedness, wherein the two collimated circularly polarized beams in the first set output from the PVH mask have a zero diffraction angle and a non-zero diffraction angle respectively, and have non-parallel propagation directions; and
a polarization conversion element configured to convert the first set of two collimated circularly polarized beams into a second set of two collimated circularly polarized beams having opposite handednesses and having the non-parallel propagation directions,
wherein when the two collimated circularly polarized beams in the second set are output from the polarization conversion element, the two collimated circularly polarized beams in the second set interfere with one another to generate a polarization interference pattern.

2. The system of claim 1, wherein the PVH mask includes a transmissive PVH grating.

3. The system of claim 1, wherein the two collimated circularly polarized beams in the first set include a $0^{th}$ order diffracted beam and a $1^{st}$ order diffracted beam.

4. The system of claim 1, wherein the two collimated circularly polarized beams in the first set have a substantially same light intensity.

5. The system of claim 1, wherein the two collimated circularly polarized beams in the first set have planar wavefronts.

6. The system of claim 5, wherein propagation directions of the two collimated circularly polarized beams in the first set are symmetric or asymmetric with respect to the normal of the surface of the PVH mask.

7. The system of claim 1, wherein the polarization conversion element includes an oblique compensation plate ("O-plate").

8. The system of claim 7, wherein
the first set of two collimated circularly polarized beams includes a first polarized beam having a first incidence angle relative to the O-plate, and a second polarized beam having a second incidence angle relative to the O-plate, the O-plate is configured to provide a half-wave retardance to the first polarized beam having the first incidence angle, and a zero or full-wave retardance to the second polarized beam having the second incidence angle, and the first incidence angle is within a predetermined angle range, and the second incidence angle is outside of the predetermined angle range.

9. The system of claim 1, further comprising:

a light deflecting element configured to direct the input beam toward the PVH mask; and a movable stage configured to support the light deflecting element, and adjust at least one of an orientation or a position of the light deflecting element to change an incidence angle of the input beam incident onto the PVH mask.

10. The system of claim 1, further comprising:

a movable stage configured to support the PVH mask, the polarization conversion element, and a recoding medium layer, wherein the movable stage is movable to adjust at least one of a position or an orientation of the recoding medium layer.

11. The system of claim 1, wherein the PVH mask and the polarization conversion element are stacked together and are in direct contact.

12. A method, comprising:

directing an input beam to a polarization volume hologram ("PVH") mask;

forwardly diffracting, by the PVH mask, the input beam as a first set of two collimated circularly polarized beams having a same handedness, wherein the two collimated circularly polarized beams in the first set output from the PVH mask have a zero diffraction angle and a non-zero diffraction angle, respectively, and have non-parallel propagation directions; and converting, by a polarization conversion element, the first set of two collimated circularly polarized beams into a second set of two collimated circularly polarized beams having opposite handednesses, wherein when the two collimated circularly polarized beams in the second set are output from the polarization conversion element, the two collimated circularly polarized beams in the second set interfere with one another to generate a polarization interference pattern.

13. The method of claim 12, further comprising:

directing the second set of two collimated circularly polarized beams having opposite handednesses to a same surface of a recording medium layer; and exposing at least one portion of the recording medium layer to the polarization interference pattern to record the polarization interference pattern in the at least one portion, wherein the polarization interference pattern recorded in the at least one portion of the recording medium layer defines an orientation pattern of an optic axis in the at least one portion of the recording medium layer.

14. The method of claim 13, wherein the PVH mask is a first PVH mask, the polarization interference pattern is a first polarization interference pattern, and the first polarization interference pattern is recorded in a first portion of the recording medium layer, and wherein the method further comprises:

replacing the first PVH mask with a second PVH mask;

forwardly diffracting, by the second PVH mask, the input beam as a third set of two collimated circularly polarized beams;

converting, by the polarization conversion element, the third set of two collimated circularly polarized beams into a fourth set of two collimated circularly polarized beams having opposite handednesses, the two collimated circularly polarized beams in the fourth set interfering with one another to generate a second polarization interference pattern; and recording the second polarization interference pattern in a second portion of the recording medium layer.

15. The method of claim 13, wherein the polarization interference pattern is a first polarization interference pattern, and the first polarization interference pattern is recorded in a first portion of the recording medium layer, and wherein the method further comprises:

adjusting at least one of a wavelength of the input beam, an incidence angle of the input beam with respect to the PVH mask, or a relative position or a relative orientation between the recording medium layer and the input beam;

forwardly diffracting, by the PVH mask, the input beam as a third set of two polarized beams;

converting, by the polarization conversion element, the third set of two collimated circularly polarized beams into a fourth set of two collimated circularly polarized beams having the opposite handednesses, the two collimated circularly polarized beams in the fourth set interfering with one another to generate a second polarization interference pattern; and recording the second polarization interference pattern in a second portion of the recording medium layer.

16. The method of claim 13, wherein the recording medium layer includes a surface photo-alignment material, and the method further comprises forming a birefringent medium layer on the recording medium layer after the polarization interference pattern is recorded in the recording medium.

17. The method of claim 13, wherein the recording medium layer includes a bulk photo-alignment material.

18. The method of claim 12, wherein the two collimated circularly polarized beams in the first set include a $0^{th}$ order diffracted beam, and a $1^{st}$ order diffracted beam.

19. The method of claim 12, wherein the PVH mask includes a transmissive PVH grating.

* * * * *